United States Patent
Koga

(10) Patent No.: US 10,147,398 B2
(45) Date of Patent: Dec. 4, 2018

(54) DISPLAY CONTROL METHOD AND DEVICE

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/244,244

(22) Filed: Apr. 3, 2014

(65) Prior Publication Data

US 2014/0313223 A1    Oct. 23, 2014

(30) Foreign Application Priority Data

Apr. 22, 2013   (JP) ................................ 2013-089856

(51) Int. Cl.
  *G09G 5/377*  (2006.01)
  *G06F 3/01*  (2006.01)
  *G06F 3/0481*  (2013.01)

(52) U.S. Cl.
  CPC .............. *G09G 5/377* (2013.01); *G06F 3/011* (2013.01); *G06F 3/017* (2013.01); *G06F 3/04815* (2013.01)

(58) Field of Classification Search
  CPC .......................... G09G 5/377; G06F 3/04815
  USPC ...................................................... 345/629
  See application file for complete search history.

(56) References Cited

U.S. PATENT DOCUMENTS 8,542,906 B1 * 9/2013 Persson .............. G06K 9/00671
                                                   382/103
9,269,011 B1 * 2/2016 Sikka .................. G06K 9/3233

2002/0052709 A1 * 5/2002 Akatsuka ............... G01C 11/02
                                                   702/153
2002/0191862 A1 * 12/2002 Neumann ................. G06T 7/80
                                                   382/284
2004/0008906 A1 * 1/2004 Webb .................. H04N 5/23219
                                                   382/306
2004/0109009 A1 * 6/2004 Yonezawa ............... G06T 15/20
                                                   345/632

(Continued)

FOREIGN PATENT DOCUMENTS

JP    2003-281297 A    10/2003
JP    2007-249516        9/2007

(Continued)

OTHER PUBLICATIONS

Extended European Search Report dated Sep. 4, 2014 in Patent Application No. 14163837.9.

(Continued)

*Primary Examiner* — Javid A Amini
(74) *Attorney, Agent, or Firm* — Oblon, McClelland, Maier & Neustadt, L.L.P.

(57) ABSTRACT

A display control method executed by a computer, includes: acquiring, with a processor and from a display data group associated with a plurality of work contents, at least one item of display data associated with a first work content of the plurality of work contents; and displaying the acquired at least one item of display data, using a display mode corresponding to a reference object recognized by performing image recognition on an input image, the acquired at least one item of display data being superimposed on the input image during display.

20 Claims, 53 Drawing Sheets

(56) References Cited

U.S. PATENT DOCUMENTS

| | | | |
|---|---|---|---|
| 2004/0183917 A1* | 9/2004 | von Flotow | G01C 11/025 348/208.99 |
| 2005/0004774 A1* | 1/2005 | Volk | G01N 21/9501 702/108 |
| 2005/0081161 A1 | 4/2005 | MacInnes | |
| 2006/0017832 A1* | 1/2006 | Kemppinen | H04N 1/00307 348/333.11 |
| 2007/0038944 A1 | 2/2007 | Carignano | |
| 2007/0118739 A1 | 5/2007 | Togashi et al. | |
| 2008/0024392 A1* | 1/2008 | Gustafsson | G02B 27/017 345/8 |
| 2008/0071559 A1* | 3/2008 | Arrasvuori | G06Q 30/06 705/26.1 |
| 2008/0266323 A1 | 10/2008 | Biocca | |
| 2008/0291269 A1* | 11/2008 | Hong | H04N 13/004 348/51 |
| 2008/0298688 A1 | 12/2008 | Cheong et al. | |
| 2008/0310686 A1 | 12/2008 | Kretz | |
| 2009/0014514 A1 | 1/2009 | Hatori et al. | |
| 2010/0048290 A1 | 2/2010 | Baseley | |
| 2011/0134108 A1* | 6/2011 | Hertenstein | G06T 19/006 345/419 |
| 2011/0148924 A1 | 6/2011 | Tapley | |
| 2011/0159957 A1 | 6/2011 | Kawaguchi | |
| 2011/0234631 A1 | 9/2011 | Kim | |
| 2012/0075285 A1* | 3/2012 | Oyagi | G06T 19/006 345/419 |
| 2012/0075343 A1 | 3/2012 | Chen | |
| 2012/0123828 A1* | 5/2012 | Pahls | G06Q 30/0218 705/14.2 |
| 2012/0131529 A1* | 5/2012 | Hayakawa | G01N 21/95607 716/112 |
| 2012/0162257 A1* | 6/2012 | Kim | H04L 67/38 345/633 |
| 2012/0210255 A1* | 8/2012 | Ooi | G06T 19/006 715/762 |
| 2012/0211555 A1 | 8/2012 | Rowe | |
| 2012/0224068 A1* | 9/2012 | Sweet, III | G06K 9/32 348/169 |
| 2012/0249588 A1 | 10/2012 | Tison et al. | |
| 2012/0327117 A1 | 12/2012 | Weller | |
| 2013/0002717 A1 | 1/2013 | Deffeyes et al. | |
| 2013/0038633 A1 | 2/2013 | Maggiore | |
| 2013/0038759 A1* | 2/2013 | Jo | H04N 5/2256 348/240.99 |
| 2013/0044130 A1* | 2/2013 | Geisner | G09G 5/00 345/633 |
| 2013/0076790 A1 | 3/2013 | Lefevre et al. | |
| 2013/0127906 A1* | 5/2013 | Sugita | G06T 7/001 345/633 |
| 2013/0147839 A1 | 6/2013 | Fukushima et al. | |
| 2013/0195340 A1* | 8/2013 | Iwase | G06K 9/00617 382/131 |
| 2013/0208005 A1* | 8/2013 | Kasahara | G06T 19/006 345/633 |
| 2013/0278635 A1 | 10/2013 | Maggiore | |
| 2013/0291079 A1* | 10/2013 | Lowe | G06F 21/00 726/7 |
| 2013/0314407 A1* | 11/2013 | Meehan | G06T 19/006 345/419 |
| 2014/0002443 A1 | 1/2014 | Cunningham | |
| 2014/0022281 A1 | 1/2014 | Georgeson et al. | |
| 2014/0028716 A1* | 1/2014 | Yeh | G06T 19/006 345/633 |
| 2014/0123507 A1 | 5/2014 | Gupta | |
| 2014/0183254 A1 | 7/2014 | Htay et al. | |
| 2014/0210856 A1 | 7/2014 | Finn et al. | |
| 2014/0225919 A1 | 8/2014 | Kaino | |
| 2014/0247278 A1* | 9/2014 | Samara | G06T 11/00 345/633 |
| 2014/0279242 A1* | 9/2014 | Staicut | G06Q 30/0643 705/26.61 |
| 2015/0009285 A1* | 1/2015 | Morishima | B60R 1/00 348/36 |
| 2015/0187108 A1 | 7/2015 | Mullins | |
| 2015/0235425 A1* | 8/2015 | Koga | G06T 19/006 345/633 |
| 2015/0277686 A1* | 10/2015 | LaForge | G06F 3/0484 715/723 |

FOREIGN PATENT DOCUMENTS

| | | |
|---|---|---|
| JP | 2009-259127 A | 11/2009 |
| JP | 2010-219879 A | 9/2010 |
| JP | 2010-531089 | 9/2010 |
| JP | 2012-146300 | 8/2012 |
| JP | 2012-168798 A | 9/2012 |
| JP | 2012-187236 | 10/2012 |
| JP | 2012-215989 | 11/2012 |
| JP | 2013-105258 A | 5/2013 |
| JP | 2013-141049 A | 7/2013 |
| WO | WO 2005/119539 A1 | 12/2005 |

OTHER PUBLICATIONS

Tapio Salonen, et al., "Demonstration of Assembly Work Using Augmented Reality" 6$^{th}$ ACM International Conference on Image and Video Retrieval, XP055136773, Jul. 2007, 4 pages.

Michael Rohs, "Marker-Based Interaction Techniques for Camera-Phones" 2$^{nd}$ Workshop on Multi-User and Ubiquitous User Interfaces, XP002534869, Jan. 2005, 2 Pages.

Michael Rohs, "Marker-Based Embodied Interaction for Handheld Augmented Reality Games" Journal of Virtual Reality and Broadcasting, vol. 4, No. 5, XP055136655, May 2007, 12 pages.

Gun A. Lee, et al., "Occlusion based Interaction Methods for Tangible Augmented Reality Environments" Proceedings of the 2004 ACM Siggraph International Conference on Virtual Reality Continuum and its Applications in Industry, XP055005457, Jan. 2004, pp. 419-426.

U.S. Office Action dated Mar. 16, 2016, in U.S. Appl. No. 14/601,624.

Japanese Office Action dated Oct. 18, 2016 in Patent Application No. 2013-089856 (with unedited computer generated English translation).

U.S. Office Action dated Sep. 20, 2016 in U.S. Appl. No. 14/601,624 (40 pages).

U.S. Office Action dated Nov. 4, 2016 in U.S. Appl. No. 14/600,530 (22 pages).

Office Action dated Dec. 23, 2016 in European Patent Application No. 14 163 837.9.

Chinese Office Action dated Sep. 5, 2016 in Chinese Application No. 2014-10162979.2 with English Translation (21 pages).

U.S. Office Action dated May 11, 2016 in U.S. Appl. No. 14/600,530 (13 pages).

U.S. Advisory Action dated Mar. 20, 2017, issued in related U.S. Appl. No. 14/600,530.

U.S. Office Action dated Apr. 21, 2017, issued in related U.S. Appl. No. 14/600,530.

Notification of Reasons for Refusal issued in corresponding Japanese Application No. 2016-243523 dated Dec. 5, 2017 (with English translation).

Office Action dated Aug. 15, 2017 in Japanese Patent Application No. 2014-021589 (with computer generated English translation).

Office Action dated Apr. 18, 2017 in Japanese Patent Application No. 2013-089856 (with machine generated English translation).

Office Action dated Nov. 2, 2017 issued in related U.S. Appl. No. 14/600,530.

Summons to Attend Oral Proceedings issued in corresponding in European Application No. 14163837.9 dated Feb. 6, 2018.

\* cited by examiner

FIG. 3

$$E = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 20

| NUMBER OF SCENARIOS: Ns | - |
|---|---|
| SCENARIO ID: 001 | POINTER TO N11 |
| SCENARIO ID: 002 | POINTER TO N12 |
| ⋮ | ⋮ |

| | N13 |
|---|---|
| NUMBER OF STEPS: 5 | POINTER TO N |
| STEP NUMBER: 001 | POINTER TO N21 |
| STEP NUMBER: 002 | POINTER TO N22 |
| STEP NUMBER: 003 | POINTER TO N23 |
| STEP NUMBER: 004 | POINTER TO N24 |
| STEP NUMBER: 005 | POINTER TO N25 |
| NUMBER OF MARKERS: 1 | – |
| MARKER ID: 001 | POINTER TO N316 |

FIG. 27

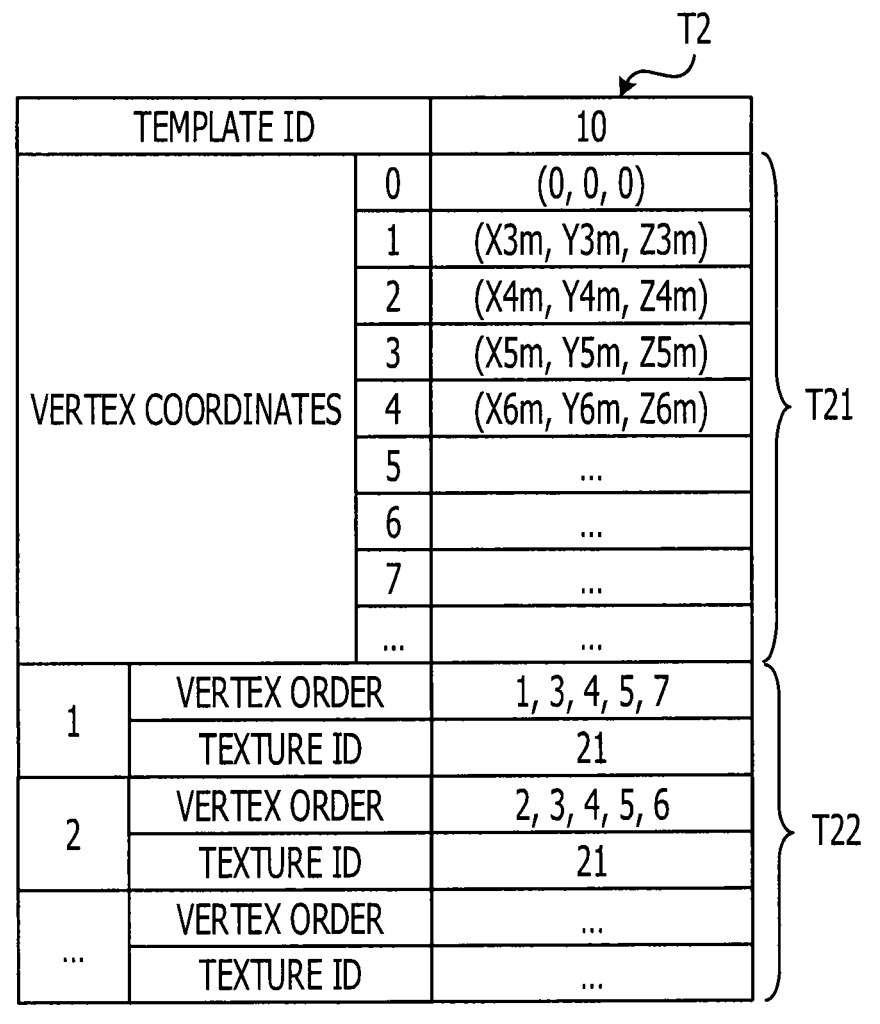

| TEMPLATE ID | | 10 | |
|---|---|---|---|
| VERTEX COORDINATES | 0 | (0, 0, 0) | T21 |
| | 1 | (X3m, Y3m, Z3m) | |
| | 2 | (X4m, Y4m, Z4m) | |
| | 3 | (X5m, Y5m, Z5m) | |
| | 4 | (X6m, Y6m, Z6m) | |
| | 5 | ... | |
| | 6 | ... | |
| | 7 | ... | |
| | ... | ... | |
| 1 | VERTEX ORDER | 1, 3, 4, 5, 7 | T22 |
| | TEXTURE ID | 21 | |
| 2 | VERTEX ORDER | 2, 3, 4, 5, 6 | |
| | TEXTURE ID | 21 | |
| ... | VERTEX ORDER | ... | |
| | TEXTURE ID | ... | |

T2

FIG. 31
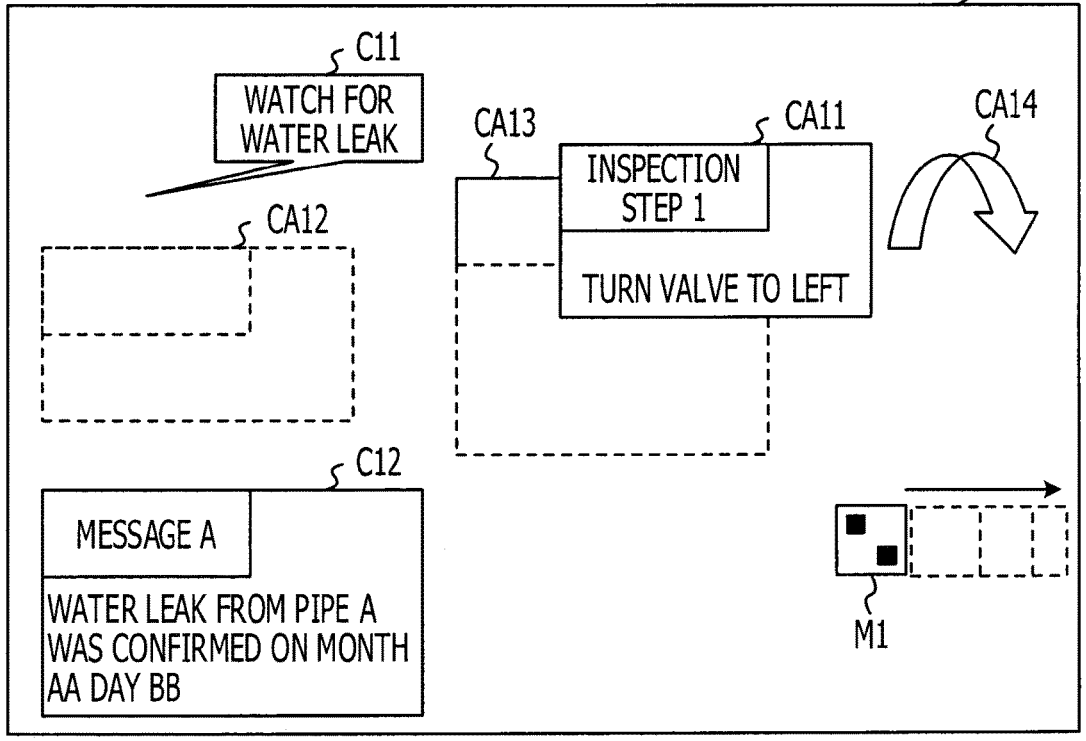
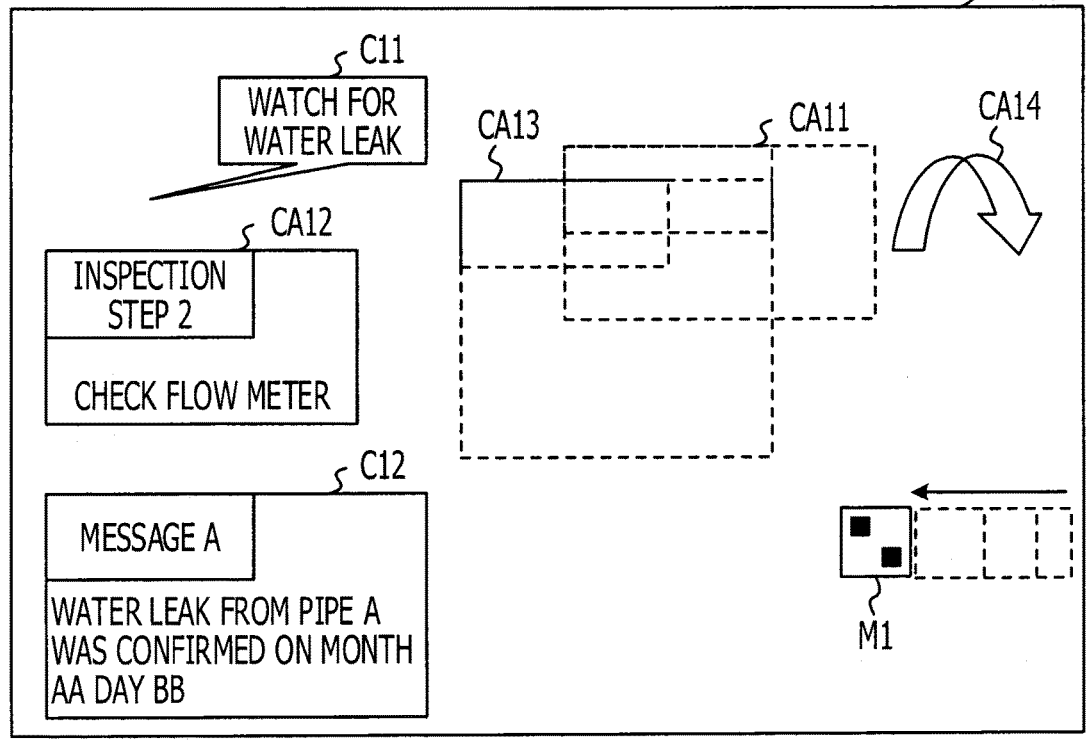

| NUMBER OF STEPS: 5 | POINTER TO N |
| STEP NUMBER: 001 | POINTER TO N21 |
| STEP NUMBER: 002 | POINTER TO N22 |
| STEP NUMBER: 003 | POINTER TO N23 |
| STEP NUMBER: 004 | POINTER TO N24 |
| STEP NUMBER: 005 | POINTER TO N25 |
| NUMBER OF MARKERS: 1 | - |
| MARKER ID: 001 | POINTER TO N316 |
| NUMBER OF SCENARIO TRANSITIONS: 2 | - |
| SCENARIO ID: 002 | TRANSITION CONDITIONS |
| SCENARIO ID: 000 | TRANSITION CONDITIONS |

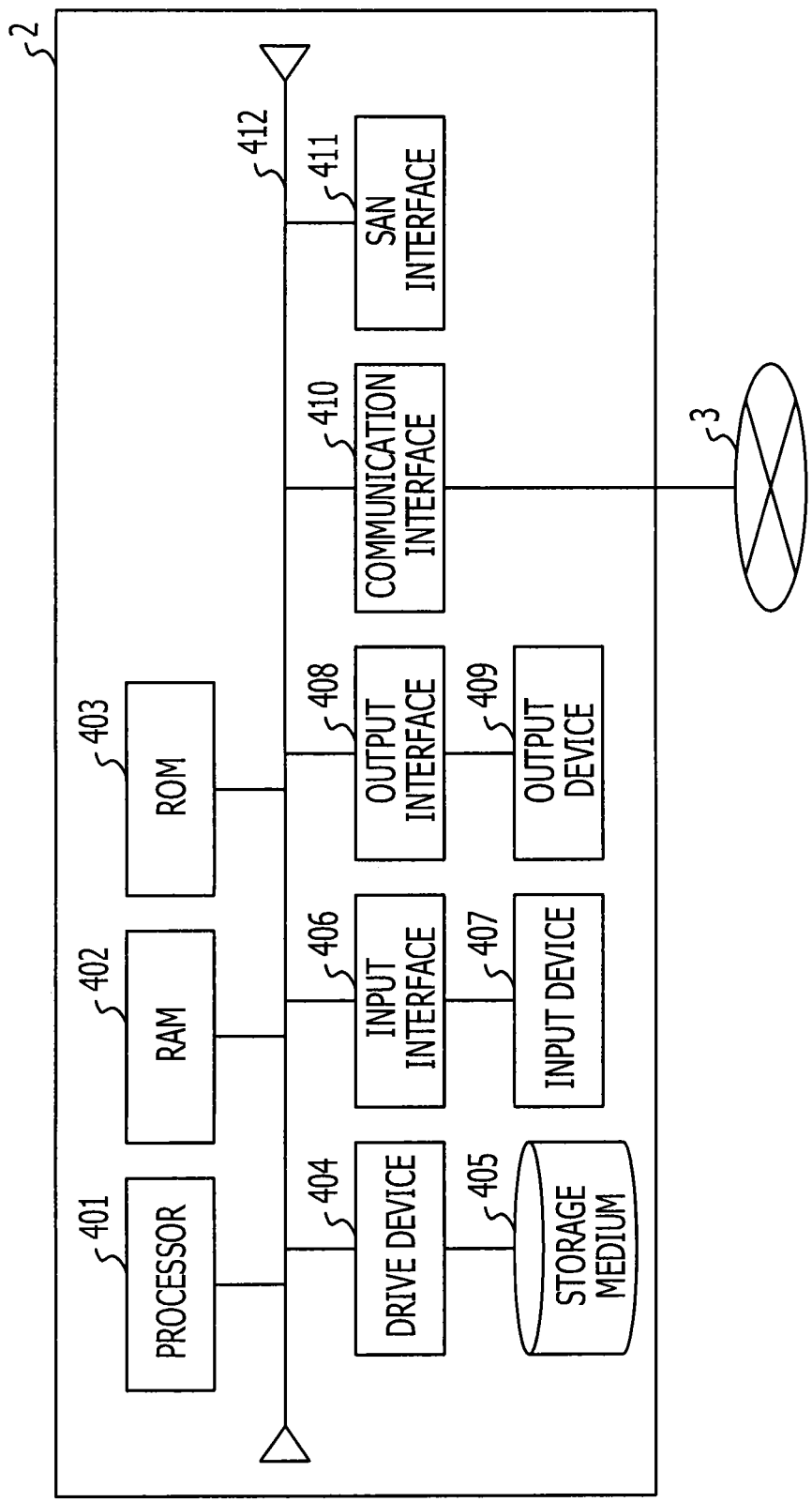

DISPLAY CONTROL METHOD AND DEVICE

CROSS-REFERENCE TO RELATED APPLICATION

This application is based upon and claims the benefit of priority from the prior Japanese Patent Application No. 2013-089856 filed on Apr. 22, 2013, the entire contents of which are incorporated herein by reference.

FIELD

The embodiments discussed herein are related to technology for providing information by displaying.

BACKGROUND

Model data of a three-dimensional object disposed on three-dimensional virtual space corresponding to real space is displayed in a manner superimposed on an imaged image. This technology augments information collected by human perception (such as vision), and is accordingly referred to as augmented reality (AR) or the like. The model data of a three-dimensional object to be used for AR is referred to as an AR content or the like.

Position coordinates on virtual space with a reference object (for example, AR marker or the like) existing in real space as a reference are set to an AR content. Also, a position relationship between an imaging apparatus and the reference object is determined based on the image of the reference object reflected in an imaged image. The position of the AR content with the imaging apparatus as a reference is obtained depending on the position coordinates set with the reference object of the AR content as a reference, and the position relationship between the imaging apparatus and the reference object. A projection image of the AR content is generated based on the position of the AR content as to the imaging apparatus, and the generated projection image is displayed in a manner superimposed on the imaged image. The project image is fitted with an image of real space reflected in the imaged image, whereby a three-dimensional object indicated in the AR content is displayed so as to exist in real space.

Also, according to a certain technique, conditions such as a providable period and a providable region and so forth are set to each of AR contents correlated with one reference object. AR contents to which conditions to be satisfied by time or a position at the time of recognizing the reference object are set are displayed (for example, Japanese Laid-open Patent Publication No. 2012-215989).

SUMMARY

According to an aspect of the invention, a display control method executed by a computer, includes: acquiring, with a processor and from a display data group associated with a plurality of work contents, at least one item of display data associated with a first work content of the plurality of work contents; and displaying the acquired at least one item of display data, using a display mode corresponding to a reference object recognized by performing image recognition on an input image, the acquired at least one item of display data being superimposed on the input image during display.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a transform matrix E from the marker coordinate system to the camera coordinate system, and a rotation matrix R within the transform matrix E;

FIG. 4 illustrates rotation matrices R1, R2, and R3;

FIG. 20 illustrates a data structure example of root definitions;

FIG. 22 illustrates a data structure example of scenario definitions;

FIG. 27 illustrates a data structure example of AR templates;

FIG. 31 illustrates an example of markers displayed on a screen;

FIG. 53 illustrates a hardware configuration example of the computer 2.

DESCRIPTION OF EMBODIMENTS

Figure 1:
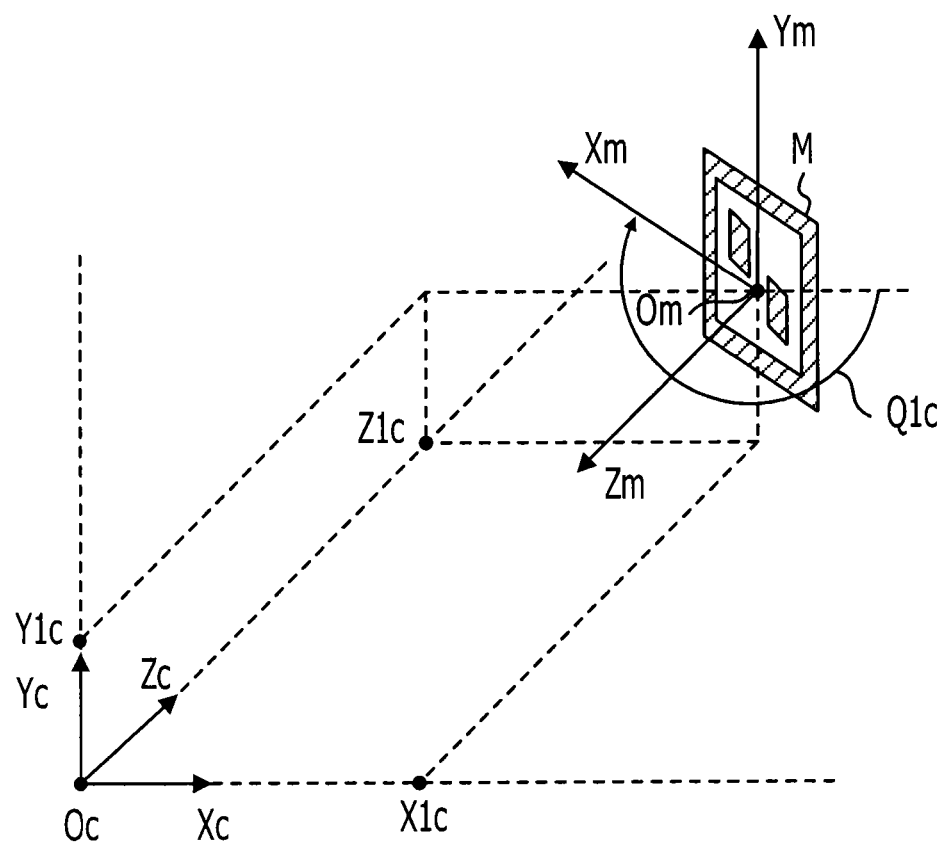
FIG. 1 illustrates a relation between a camera coordinate system and a marker coordinate system.

Technology to display AR contents is utilized for execution and support of business processes, and so forth. The business processes are a series of operations performed at an organization such as a company or the like. An AR content indicating an operation guide or report items included in a business process is displayed, whereby operational aid is provided to a user, and execution of the business process by the user is supported.

Multiple business processes (or tasks) are executed at activity by an organization. For example, a backbone business process which is the main business of an organization (for example, manufacturing process at a manufacturing company, or the like) is performed, and also, a support business process which supports the backbone business process (for example, inspection process of a manufacturing device, or the like) is also performed at the organization. Also, in the case of an IT system configured to perform execution and support of business processes, the same business process is defined as different business processes by users who execute the business process. This is because the contents of execution and support differ between an inspection process executed by a skilled worker and a inspection process executed by a beginning worker, for example.

As first recognized by the present inventors, upon execution and support of multiple business processes using display of AR contents being performed, AR contents regarding the entirety of the multiple business processes are provided, and assistance regarding work of a business processes other than the business process being executed by the user are undesirably displayed as well. Also the present inventors were also the first to recognize that, according to the above technology, even if the AR content to be displayed is determined with a position and time as conditions, the same AR content is provided to multiple users who execute mutually different business processes in parallel, and consequently, the AR content corresponding to each individual business process is not provided.

It is an object of an exemplary aspect of the technology disclosed in the present embodiment to provide an individual AR content corresponding to a business process to be executed.

[Display of AR Content]

First, description will be made regarding AR technology to display an AR content which is model data of a three-dimensional object in a manner superimposed on an imaged image imaged by a camera which is an example of an imaging apparatus.

The AR contents are model data configured of multiple point coordinates, for example. A pattern (texture) and an image are set for every multiple surfaces obtained by interpolating multiple points using a straight line or curve, and multiple surfaces are composed, whereby a three-dimensional model is formed. The placement of each of the AR contents is determined by the coordinates of each point making up the AR content being determined with a reference object existing in real space as a reference.

On the other hand, based on the appearance (image) of the reference object reflected in an imaged image imaged by the camera, a position relation in real space between the camera and the reference object is obtained. The reference object is an object of which the shape, pattern, and so forth are well established, it is distinguished what kind of position the reference object is situated in as to the camera by collation between the image of the reference object within the imaged image, and the well-established shape and pattern of the reference object, for example.

A position relation between the camera and the coordinates of each point of the AR content is obtained from coordinates with the reference object as a reference, and a position relationship between the camera and the reference object. (Though the position relation between the camera and AR content has been mentioned here, the AR content is virtually disposed, and an object called an AR content does not exist in real space. Simply, information of a position with the camera as a reference is generated.) Based on these position relationships, an image (projection image) of the AR content obtained in the case that the camera tentatively images the AR content existing on virtual space is generated. Computation for generating the projection image of the AR content will further be described based on FIG. 1 to FIG. 4.

FIG. 1 illustrates a relation between the camera coordinate system and marker coordinate system. The AR marker M illustrated in FIG. 1 is an example of a reference object to be used for display of an AR content. The AR marker M exemplified in FIG. 1 has a square shape of which the size is determined beforehand (for example, the length of one side is 10 cm or the like). Though the AR marker M illustrated in FIG. 1 has a square shape, another reference object having a shape of which the relative position and direction from the camera are distinguishable may be employed, based on an image obtained by imaging from any viewpoint. Another example of a reference object is a feature point generated from an imaged image.

The camera coordinate system is configured of three dimensions of (Xc, Yc, Zc). For example, let us say that the focal point of the camera is the origin (origin Oc). For example, the Xc-Yc plane of the camera coordinate system is a surface in parallel with the imaging device surface of the camera, and the Zc axis is an axis perpendicular to the imaging device surface.

The marker coordinate system is configured of three dimensions of (Xm, Ym, Zm). For example, let us say that the center of the AR marker M is the origin (origin Om). For example, the Xm-Ym plane of the marker coordinate system is a surface in parallel with the printed surface of the pattern of the AR marker M, and the Zm axis is an axis perpendicular to the printed surface of the AR marker M. The origin Om is indicated with position coordinates V1c (X1c, Y1c, Z1c) in the camera coordinate system. Also, a rotation angle of the marker coordinate system as to the camera coordinate system is indicated with rotational coordinates G1c (P1c, Q1c, R1c). P1c is a rotation angle of the circumference of the Xc axis, Q1c is a rotation angle of the circumference of the Yc axis, and R1c is a rotation angle of the circumference of the Zc axis. The AR marker M exemplified in FIG. 1 rotates in the circumference of the Yc axis alone, and accordingly, P1c and R1c are 0.

Figure 2:
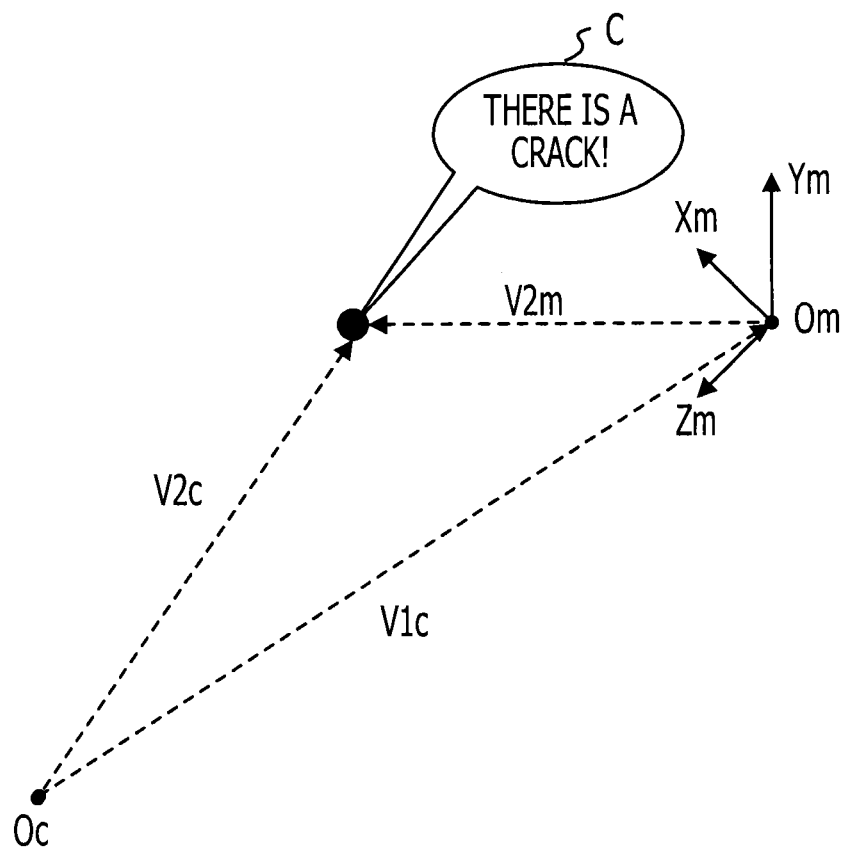
FIG. 2 illustrates an example of AR contents in the camera coordinate system and marker coordinate system.

FIG. 2 illustrates an example of an AR content C in the camera coordinate system and marker coordinate system. The AR content C exemplified in FIG. 2 is model data with a speech balloon shape containing text data of "There is a crack!". A black circle of the tip of the speech balloon of the AR content C is taken as a reference point of the AR content C. Coordinates in the marker coordinate system of the reference point of the AR content C are taken as V2m (X2m, Y2m, Z2m). Further, the direction of the AR content C is determined with rotation coordinates G2m (P2m, Q2m, R2m), and the size of the AR content C is determined with a scale factor D (Jx, Jy, Jz).

The coordinates of each point making up the AR content C are coordinates with the coordinates of each point defined in the AR template of the AR content C being adjusted based on the coordinates V2m, rotation coordinates G2m, and scale factor D of the reference point. An example of the coordinates of the reference point defined in the AR template is (0, 0, 0). Each of the coordinates included in the AR template are adjusted by being rotated based on the rotation coordinates G2m that have been set, expanded or reduced based on the scale factor D, and further moved in parallel based on the coordinates V2m of the reference point. The AR content C in FIG. 2 is in a state in which each point defined in the AR template is configured based on a point adjusted based on the coordinates V2m, rotation coordinates G2m, and scale factor D of the reference point in the marker coordinate system of the AR marker M.

The coordinates in the marker coordinate system of each point of the AR content C are transformed to coordinates in the camera coordinate system, and further transformed to a position in a display screen (coordinates in the screen coordinate system) based on the coordinates in the camera coordinate system. Based on the transformed coordinates, a projection image of the AR content C is generated. The coordinates in the camera coordinate system are calculated by performing coordinate transform (model-view transform) based on the coordinates V1c and rotation coordinates G1c on the coordinates in the marker coordinate system. For example, upon model-view transform being performed on the coordinates V2m, coordinates V2c (X2c, Y2c, Z2c) in the camera coordinate system of the reference point are obtained.

FIG. 3 illustrates a transform matrix E from the marker coordinate system to the camera coordinate system, and a rotation matrix R within the transform matrix E. The transform matrix E is a 4×4 matrix. A column vector (Xc, Yc, Zc, 1) is obtained by product between the transform matrix E and a column vector (Xm, Ym, Zm, 1). The transform matrix E is calculated based on the position coordinates V1c (X1c, Y1c, Z1c) and rotation coordinates G1c (P1c, Q1c, R1c) of the AR marker M in the camera coordinate system.

The column vector (Xc, Yc, Zc, 1) including the point coordinates of the camera coordinate system is obtained by substituting the point coordinates of the marker coordinate system to be subjected to coordinate transform (model-view transform) for the column vector (Xm, Ym, Zm, 1) to perform matrix calculation. A partial matrix (rotation matrix R) in the first to third rows and also in the first to third columns of the transform matrix E is applied to the coordinates in the marker coordinate system, whereby a rotation operation for matching the direction of the marker coordinate system and the direction of the camera coordinate system is performed. A partial matrix in the first to third rows and also in the fourth column of the transform matrix E is applied to the coordinates in the marker coordinate system, a translational operation for matching the direction of the marker coordinate system and the direction of the camera coordinate system is performed.

FIG. 4 illustrates rotation matrices R1, R2, and R3. The rotation matrix R illustrated in FIG. 3 is calculated by product (R1·R2·R3) of the rotation matrices R1, R2, and R3.

The coordinates (Xm, Ym, Zm) in the marker coordinate system of each point making up the AR content C are transformed to the coordinates (Xc, Yc, Zc) in the camera coordinate system by model-view transform based on the transform matrix E. The position coordinates V2m exemplified in FIG. 2 are transformed to the position coordinates V2c by model-view transform.

The screen coordinate system is configured of two dimensions of (Xs, Ys). For example, the center of an imaged image obtained by imaging processing of the camera is taken as the origin (origin Os). The coordinates in the camera coordinate system of each point of the AR content C are transformed to coordinates in the screen coordinate system by transparent transform. Based on the coordinates of the screen coordinate system of each point obtained by transparent transform, the projection image of the AR content C is generated.

Coordinate transform (transparent transform) from the camera coordinate system to the screen coordinate system is performed based on focal length f of the camera, for example. The Xs coordinates in the screen coordinate system corresponding to the coordinates (Xc, Yc, Zc) in the camera coordinate system is obtained by Xs=f·Xc/Zc. Similarly, the Ys coordinates in the screen coordinate system corresponding to the coordinates (Xc, Yc, Zc) in the camera coordinate system is obtained by Ys=f·Yc/Zc.

Based on the position coordinates (screen coordinate system) obtained by the position coordinates (camera coordinate system) of each point making up the AR content C being subjected to transparent transform, the projection image of the AR content C is generated. There are defined in the AR template serving as the source of the AR content C, which point is interpolated to form a surface, and which texture (or image) is mapped in which surface. The projection image of the AR content C is generated by a texture and an image being mapped on a surface obtained by interpolating each position coordinate (screen coordinate system) in accordance with the definition of the AR template.

According to the above model-view transform and transparent transform, coordinates on the imaged image corresponding to the coordinates of the marker coordinate system are calculated, and the projection image of the AR content C corresponding to the viewpoint of the camera is generated using the coordinates thereof. Upon the projection image of the AR content C being composed with the imaged image, the composed image is displayed on the screen as if a three-dimensional object existed, and accordingly, visual information to be provided to the user is augmented.

Also, the projection image of the AR content C may be displayed on a transparent-type display as another example of AR content display. An image in real space obtained by the user passing through the display, and the projection image of the AR content are fitted together in this mode as well, and accordingly, visual information to be provided to the user is augmented. Processing for composing and displaying the projection image of the AR content according to the present embodiment and the imaged image, or the like may be taken as processing for displaying the AR content in the case of employing a transparent display.

Figure 5:
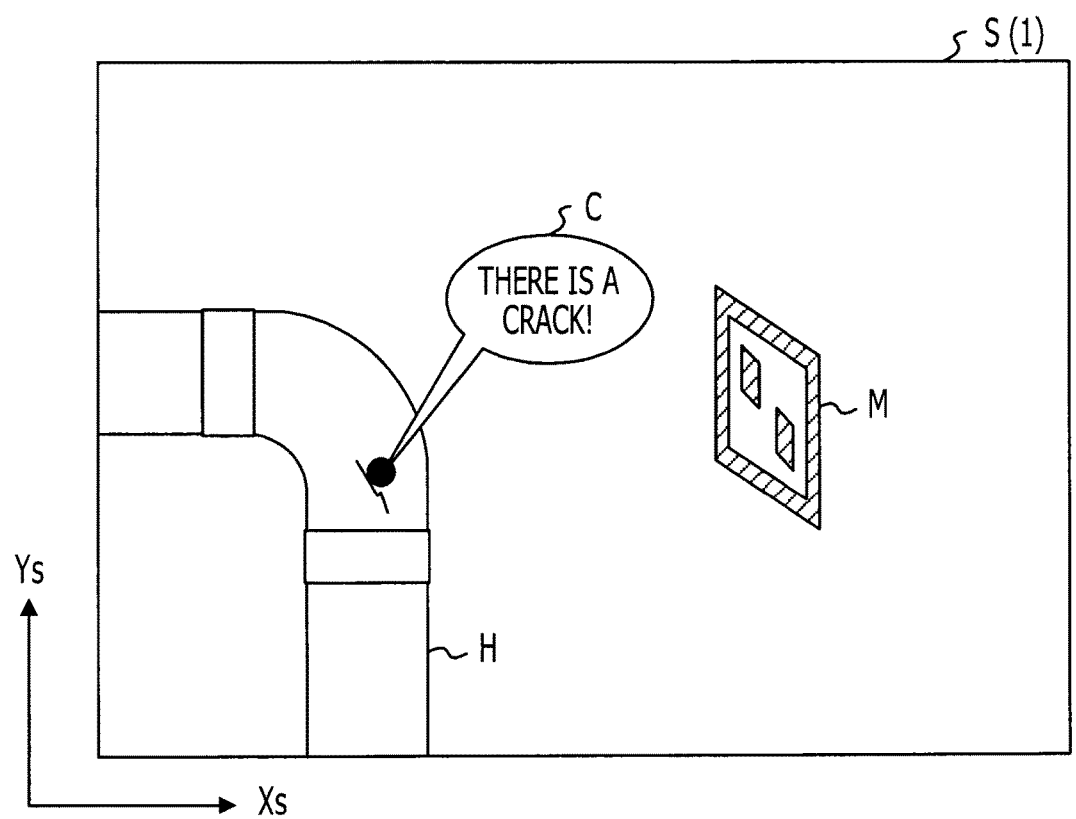
FIG. 5 illustrates a display example of AR contents.

FIG. 5 illustrates a display example of AR contents. The image of the AR marker M, the image of an object H (a pipe installed in a factory is illustrated), and the projection image of the AR content C are displayed on a display screen S(1) exemplified in FIG. 5. The AR content C is defined in the marker coordinate system with the AR marker M as a reference, and each of the defined coordinates is subjected to model-view transform and transparent transform, whereby the projection image of the AR content C is generated. The AR marker M and object M exist in real space. Upon the coordinates of the AR content C being set in accordance with a particular position in real space, information regarding the particular position is provided by the AR content C. The tip of the speech balloon of the AR content C is set in the display screen S(1) so as to specify the position of the crack of the object H, and accordingly, provision of this AR content C allows the user to readily determine the position of the crack of the object H.

[Download of AR Content]

Upon a client device (computer 1) configured to display AR contents holding all kinds of AR contents in a system configured to provide multiple kinds of AR contents, load on the storage capacity of the computer 1 increases. For example, in the case that the computer 1 is a movable terminal, the computer 1 may have storage capacity insufficient for holding AR contents due to restriction of the physical size of the computer 1.

Therefore, a system configuration is employed in which an administrative server (computer 2) configured to summarize and store provided AR contents is employed, and the computer 1 downloads AR contents from the computer 2. In this case, for example, the computer 1 downloads, of all kinds of AR contents, the AR content to be displayed. In the case that there are multiple client devices, AR contents are summarized and stored to the computer 2, and accordingly, storage capacity for continually holding AR contents is suppressed as the whole system.

Also, according to imaging of a reference object, not only the position and direction of the reference object but also identification information of the reference object are obtained. For example, in the case of an AR marker, identification information (marker ID) of the AR marker is distinguished based on a pattern printed on the AR marker. In the case of a method employing a feature point of an image as a reference object, based on a database configured to correlate the coordinates of a feature point with identification information, the identification information is distinguished.

The AR content to be displayed may individually be set to each of multiple AR markers. Accordingly, the AR content displayed is switched according to the AR marker recognized. In this case, of all kinds of AR contents, which AR content is an object to be displayed is determined after recognition of an AR marker. For example, in the case of a system configuration in which the AR content to be displayed is downloaded from the computer 2, the computer 1 downloads the AR content to be displayed after recognition of an AR marker.

Figure 6:
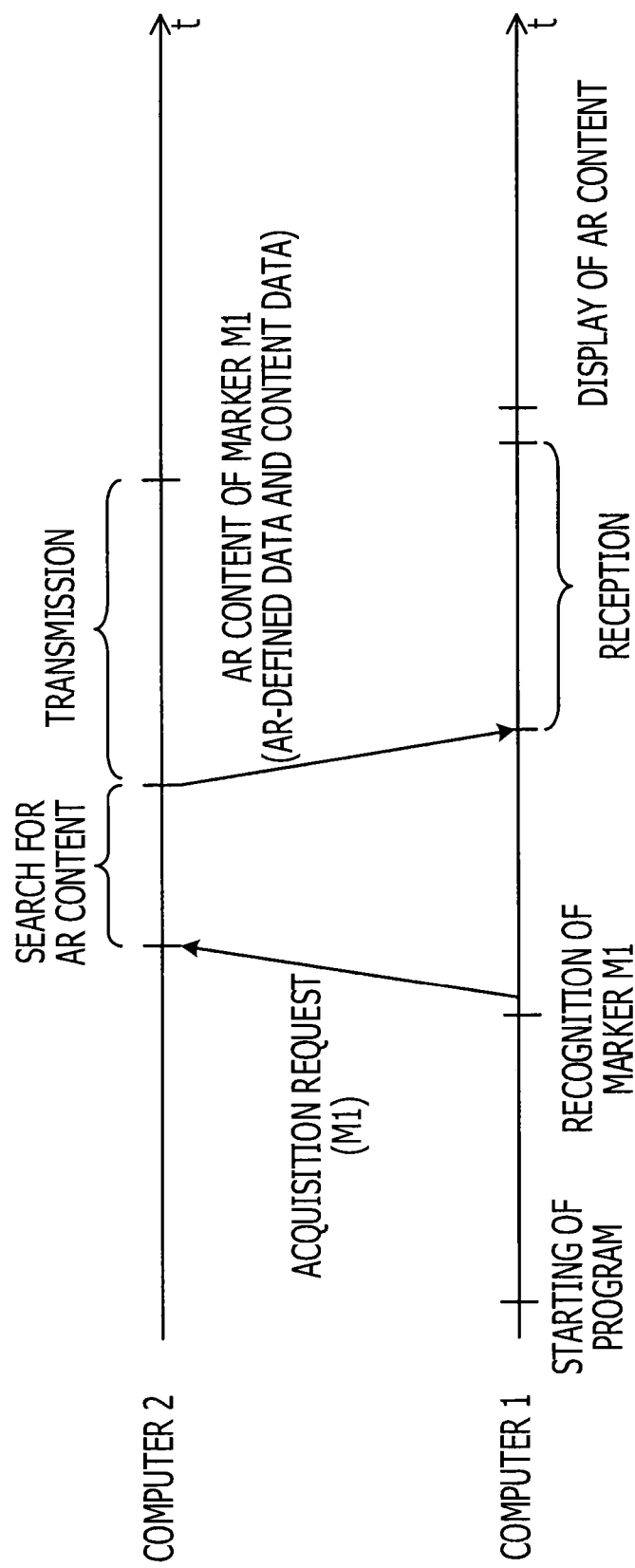
FIG. 6 illustrates an AR content providing sequence example.

FIG. 6 illustrates an AR content providing sequence. The sequence example illustrated in FIG. 6 illustrates the processing sequences of the computer 1 and computer 2. At the computer 1, an AR content display program is activated, an AR marker M1 is recognized, and AR content acquisition request corresponding to the AR marker M1 is performed. For example, the marker ID of the AR marker M1 is informed in this acquisition request. Upon receiving the acquisition request, the computer 2 searches for the AR content corresponding to the AR marker M1, and transmits the AR content corresponding to the marker M1 to the computer 1. After receiving the AR content from the computer 2, the computer 1 displays the AR content corresponding to the AR marker M1.

According to the sequence illustrated in FIG. 6, from the AR marker being recognized until the AR content display processing being started, request and download of the AR content corresponding to the AR marker are performed. Therefore, according to imaging of the AR marker, substantial time lag occurs from recognition of the AR marker until the AR content is displayed.

Upon time lag occurring substantially after the AR marker is reflected in the imaged image until the AR content is displayed, gap between the perception of the user himself/herself who visually recognizes the AR marker and perception augmented by the AR content being visually recognized increases. Therefore, the feature of AR which is to augment a user's perception, is diminished.

Figure 7:
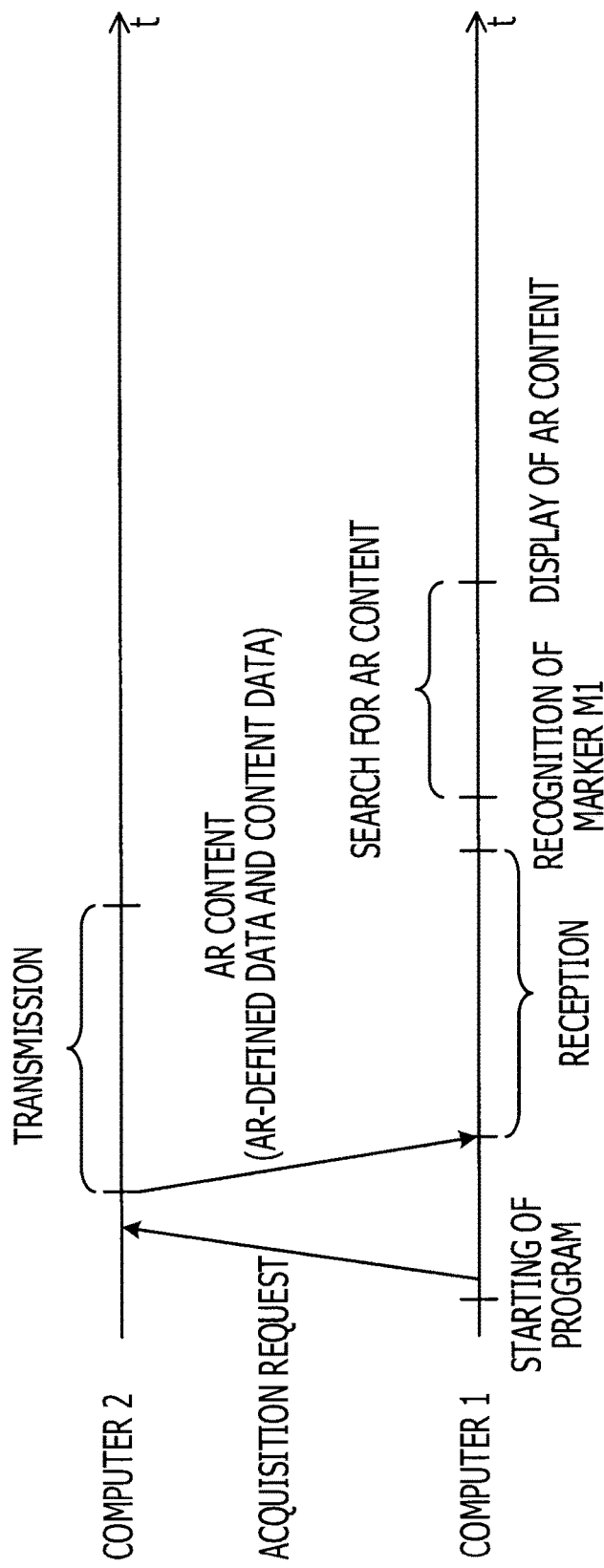
FIG. 7 illustrates an AR content providing sequence example.

FIG. 7 illustrates an AR content providing sequence example. The sequence example illustrated in FIG. 7 illustrates, in the same way as with FIG. 6, the processing sequences of the computer 1 and computer 2. Upon the AR content display program being activated, the computer 1 performs an AR content acquisition request prior to recognition of the AR marker M1. In the case of the sequence example in FIG. 7, the computer 1 displays the AR content corresponding to AR marker recognition after receiving the AR content from the computer 2.

Request and download of the AR content is not performed after recognition of the AR marker until display of the AR content in the sequence in FIG. 7, and accordingly, time lag after recognition of the AR marker until display of the AR content decreases. Therefore, the gap between the perception of the user who visually recognizes the AR marker and the perception of the user who visually recognizes the AR content decreases.

On the other hand, the AR content corresponding to the AR marker is displayed regardless of which AR marker is recognized in the sequence example in FIG. 7, and consequently, all kinds of AR contents are downloaded to the computer 1. Consequently, all kinds of AR contents are held at the computer 1, and accordingly, the load on the storage capacity of the computer 1 increases.

Downloading the AR content from the computer 2 to the computer 1 in the sequences illustrated in FIG. 6 and FIG. 7 causes situations such as increase of time lag, load increase to the storage capacity, and so forth, respectively.

[Selective Provision According to Scenario]

Technology to display AR contents is employed for execution and support of a business process, and so forth. As described above, multiple business processes are executed at an organization such as a company. Each of the business processes is often a combination of multiple sets of work. This combination of sets of work is taken as one unit, and is referred to as a scenario in the present embodiment. Note that a case where a business process is made up of one set of work will be referred to as a scenario, as well. Also, a different scenario may be set for the same business process, with a different user as an object. For example, a different scenario is provided depending on whether or not the user who executes a business process is a skilled worker or beginning worker. The contents of the AR content corresponding to a business process differ according to the contents of work included in a scenario. That is to say, upon an AR content group being set to multiple business processes having a different scenario, an individual AR content to be applied to a single scenario alone is included in the AR content group thereof.

Figure 8:
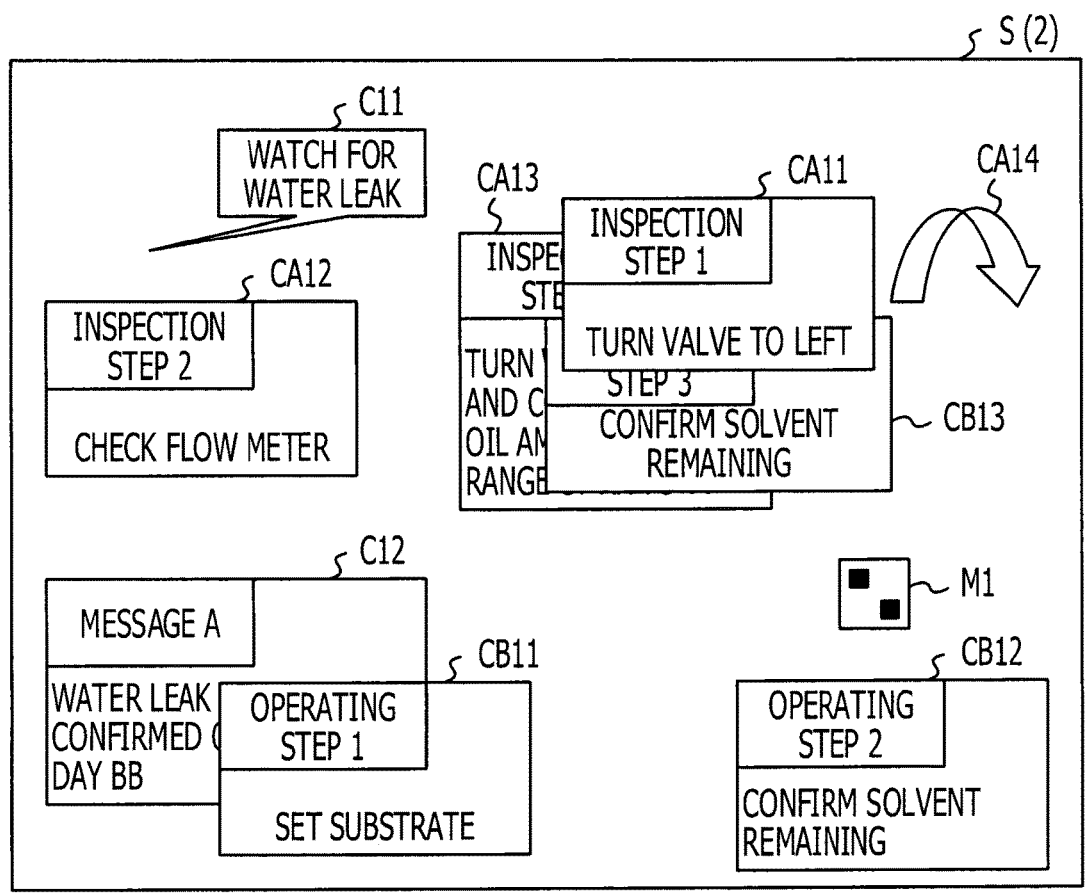
FIG. 8 illustrates a display example of AR contents.

FIG. 8 illustrates a display example of AR contents. The display example illustrated in FIG. 8 illustrates a screen S(2) where the AR content correlated with the AR marker M1 is displayed. The screen S(2) includes the image of the AR marker M1, and further illustrates the projection images of the AR contents CA11 to CA14, CB11 to CB13, C11, and C12, generated based on the AR marker M1.

The AR contents CA11 to CA14 are AR contents specific to a scenario of inspection work. The AR contents CA11, CA12, and CA13 indicate the work contents of inspection work. The AR content CA11 indicates an instruction for work contents to "TURN VALVE TO LEFT". The AR content CA12 indicates an instruction for work contents to "CHECK FLOW METER". The AR content CA13 indicates an instruction for work contents to "TURN VALVE TO RIGHT, AND CONFIRM THAT OIL AMOUNT IS IN RANGE OF XX TO YY". The AR content CA14 indicates the work contents indicated in the AR content CA13.

On the other hand, the AR contents CB11 to CB13 are an AR content group specific to a scenario of manufacturing work. The AR contents CB11, CB12, and CB13 indicate the work contents of manufacturing work. The AR content CB11 indicates an instruction for work contents to "SET SUBSTRATE". The AR content CB12 indicates an instruction for work contents to "CONFIRM SOLVENT REMAINING". The AR content CB13 indicates an instruction for work contents to "PRESS EXEC BUTTON".

The AR contents C11 and C12 are not information relating to a particular scenario but information for a user who works in the vicinity of the AR marker M1. The AR content C11 is a message for reminder to "WATCH FOR WATER LEAK", and further indicates the position of water leak. Also, the AR content C12 indicates a message to the effect that "WATER LEAK FROM PIPE WAS CONFIRMED ON MONTH AA DAY BB".

As a result of control for displaying the AR content corresponding to the recognized AR marker M1, both of the AR content specific to the business process of inspection work, and the AR content specific to the scenario of manufacturing work are displayed on the screen S2). In the case that the user executes the business process of inspection work as well, the AR content specific to the scenario of manufacturing work is displayed as to the user. Conversely, in the case that the user executes the business process of manufacturing work as well, the AR content specific to the scenario of inspection work is displayed as to the user. That is to say, simply displaying an AR content in response to the recognized AR marker results in display of AR contents irrelevant to the business process that the user executes.

The screen S(2) includes many AR contents to be displayed. For example, The AR contents CA11, CB13, and CA13 are displayed in a superimposed manner. Even if the amount of contents is great in a common web page or the like, each of the contents is browsable by scroll operations or the like by increasing the region of the web page. However, an AR content display region is restricted to the inside of an imaged image. Therefore, if there are many AR contents, the contents are readily displayed in a mutually superimposed manner.

Further, in the case that the user executes the business process of inspection work as well, the AR content specific to the business process of manufacturing work is downloaded from the computer 2 to the computer 1. That is to say, AR contents which do not aid the user's work are also downloaded to the computer 1 as well. Downloading AR contents which do not aid the user's work increases time lag after AR marker recognition until AR content display, or increases load on the storage capacity of the computer 1.

Figure 9:
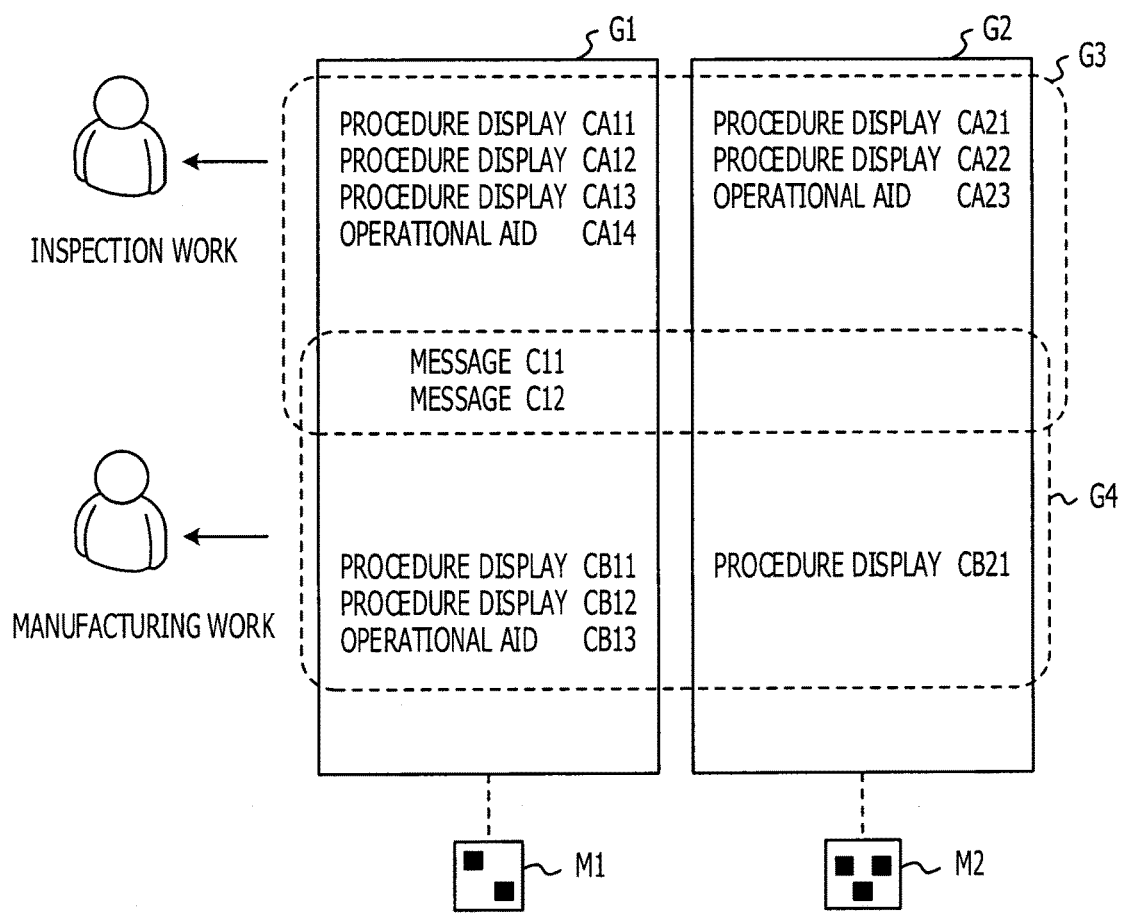
FIG. 9 illustrates groups of AR contents.

FIG. 9 illustrates a group of AR contents. A group of AR contents to be displayed in the case that the AR marker M1 has been recognized is an AR content group G1. The AR content group G1 includes the AR contents CA11 to CA13 for procedure display, AR content CA14 for operational aid, AR contents C11 and C12 illustrating a message, and AR contents CB11 to CB13 for procedure display. Also, a group of AR contents to be displayed in the case that the AR marker M2 has been recognized is an AR content group G2. The AR content group G2 includes AR contents CA21 to CA23 for procedure display, and AR content CB21 for procedure display.

In the case of simply only control for displaying the AR content corresponding to the recognized AR marker, upon the AR marker M1being recognized, the AR content group G1 is displayed, and upon the AR marker M2 being recognized, the AR content group G2 is displayed. According to this control, as illustrated in FIG. 8, the entire AR content group G1 relating to multiple business processes is displayed in response to recognition of the AR marker M1, and AR contents which do not aid the business process that the user executes are also displayed. Also, which of the AR content group G1 and AR content group G2 has to be downloaded is determined by recognition of an AR marker in the sequence illustrated in FIG. 6. Therefore, downloading of AR contents is performed from recognition of an AR marker until display of an AR content, and consequently, time lag occurs from recognition of an AR marker until display of an AR content. Further, upon downloading of AR contents being performed in the sequence illustrated in FIG. 7, all of the AR contents illustrated in FIG. 9 are downloaded to the computer 1, which increases the load on the storage capacity of the computer 1.

Therefore, for example, management and provision of AR contents is performed in increments of scenarios. Specifically, a group (AR content group G3) is formed of the AR contents CA11 to CA14 and CA21 to CA23 specific to a scenario of inspection work, and AR contents C11 and C12 common to each scenario. Also, a group (AR content group G4) is formed of the AR contents CB11, CB13, and CB21 specific to a scenario of manufacturing work, and AR contents C11 and C12 common to each scenario. Providing AR contents in increments of scenarios suppresses an AR content specific to a scenario irrelevant to a business process that the user executes from being displayed. For example, while the AR content group G3 is selectively provided to the user who executes the business process of inspection work, no AR contents CB11 to CB13, or the like, are provided to the user.

AR contents are managed with the AR content group G3 and AR content group G4, whereby AR contents are individually provided to the user according to a scenario. In this case, the AR contents are not uniformly restricted so as not to perform provision itself of some AR contents according to conditions of a position, time, and so forth, so each of the AR content groups G3 and G4 of which the AR marker serving as a reference of display is common may be provided to a different user who executes the corresponding business process in parallel. Specifically, an arrangement may be made in which, while the AR content group G3 is provided to a certain user, the AR content group G4 is provided to another user.

The user may determine before starting a series of work (business process) which scenario is to be performed. That is to say, the scenario is selected before an AR marker is recognized. Also, the AR content group (G3 or G4) to be provided in increments of scenarios is a part of all kinds of AR contents. An AR content group according to a scenario is selectively downloaded in comparison with the sequence example illustrated in FIG. 7, and accordingly, the data amount of AR contents held at the computer 1 is suppressed. Therefore, if the computer 1 holds an AR content group according to a scenario before recognition of an AR marker, the computer 1 may display an AR content in response to recognition of an AR marker using the AR contents held at the computer 1. Downloading of an AR content is avoided from recognition of an AR marker until display of the AR content, whereby occurrence of time lag from recognition of an AR marker until display of the AR content is suppressed.

Figure 10:
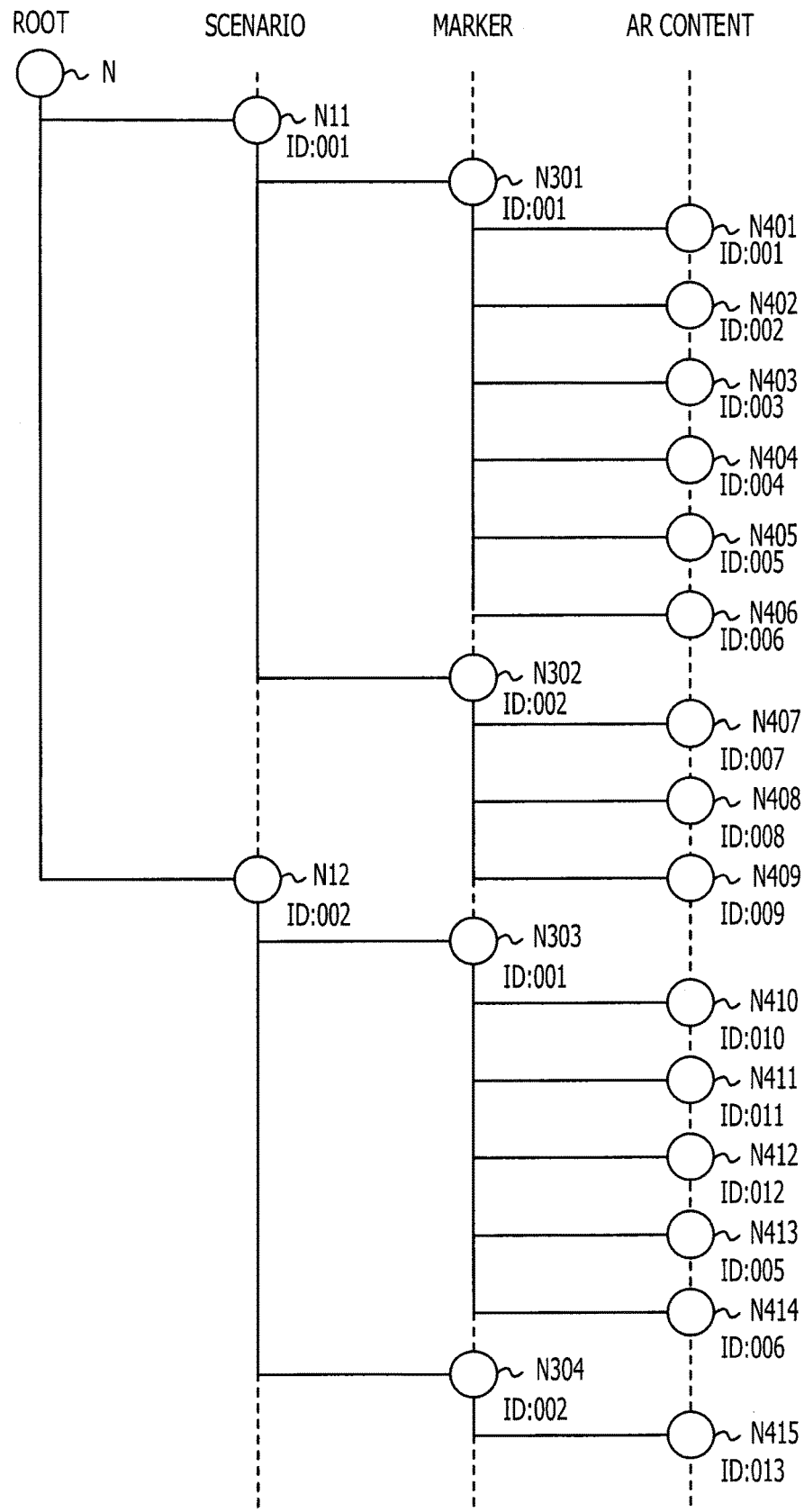
FIG. 10 illustrates a data structure example of AR-defined data.

FIG. 10 illustrates a data structure example of AR-defined data. According to the data structure illustrated in FIG. 10, management and provision of AR contents is performed in increments of scenarios. The data structure example illustrated in FIG. 10 has a tree structure.

A root definition N of a tree structure illustrates multiple scenarios which are objects to which an AR content is provided. According to the example in FIG. 10, identification information of the scenario of inspection work (scenario ID) is 001, and the scenario ID of the scenario of manufacturing work is 002. The root definition N includes information in which the scenario ID: 001 and a pointer indicating a storage destination of information relating to the scenario ID: 001 are correlated. Also, the root definition N includes information in which the scenario ID: 002 and a pointer indicating a storage destination of information relating to the scenario ID: 002(scenario definition) are correlated. Thus, upon a scenario ID being selected, information relating to the scenario is browsable according to the selected scenario ID.

A scenario definition N11 is information relating to the scenario of the scenario ID: 001. The scenario definition N11 indicates multiple AR markers to be used for display of AR contents in the scenario of the scenario ID: 001. For example, the identification information (marker ID) of the AR marker M1 is 001, the marker ID of the AR marker M2 is 002. The scenario definition N11 includes information in which the marker ID of each marker to be used at the scenario with the scenario ID: 001, and a pointer indicating a storage destination of information regarding each marker (marker definition) are correlated. Thus, upon a marker ID being selected, information relating to the AR marker is browsable according to the selected marker ID. A scenario definition N12 is also, in the same way as with the scenario definition N11, the marker definition of the AR marker to be used for the scenario ID: 002 is browsable according to the selected marker ID.

A marker definition N301 is information relating to the AR marker M1 with the marker ID: 001. The marker definition N301 indicates the AR content to be displayed in response to recognition of the AR marker M1. For example, the corresponding identification information (content IDs) of the AR contents CA11 to CA14 are 001 to 004, the corresponding content IDs of the AR contents C11 and C12 are 005 and 006. Also, for example, the corresponding content IDs of the AR contents CB11 and CB13 are 007 to 009. The marker definition N301 includes information in which the content ID of each AR content to be displayed in the case that the AR marker with the marker ID: 001 has been recognized in the scenario with the scenario ID: 001, and a pointer indicating a storage destination of information regarding each AR content (content definition) are correlated. Thus, upon a content ID being selected, information regarding the AR content is browsable according to the selected content ID. A marker definition N302 also enables, in the same way as with the marker definition N301, the definition of the AR content to be displayed in the case that the AR marker with the marker ID: 002 has been recognized in the scenario with the scenario ID: 001, to be referenced according to selection of a content ID. Marker definitions N303 and N 304 also enable, in the same way as with the marker definitions N 301 and N302, the definition of the AR content to be displayed in the case that each marker has been recognized in the scenario with the scenario ID: 002, to be referenced according to selection of a content ID.

A content definition N401 is information regarding the AR content with the content ID: 001. The content definition N401 includes definitions of the position, direction, and size of the AR content with the content ID: 001 with the marker ID: 001 as a reference. The content definition N401 further includes identification information of an AR template (template ID) where the shape and pattern of the AR content with the content ID: 001 are defined. Content definitions N402 to N406 also include, in the same way as with the content definition N401, definitions of the positions, directions, and sizes of AR contents with the content IDs: 002 to 006 with the marker ID: 001 as a reference respectively, and the template ID of an AR template. Content definitions N407 to N409 also include definitions of the positions, directions, and sizes of AR contents with the content IDs: 007 to 009 with the marker ID: 002 as a reference respectively, and the template ID of an AR template. Content definitions N410 to N412 also include, in the same way as with the content definition N401, definitions of the positions, directions, and sizes of AR contents with the content IDs: 010 to 012 with the marker ID: 001 as a reference respectively, and the template ID of an AR template. Content definitions N413 and N414 also include, in the same way as with the content definition N401, definitions of the positions, directions, and sizes of AR contents with the content IDs: 005 to 006 with the marker ID: 001 as a reference respectively, and the template ID of an AR template. A content definition N415 also includes definitions of the position, direction, and size of the AR content with the content ID: 013 with the marker ID: 002 as a reference, and the template ID of an AR template.

The content definitions N405 and N413 are content definitions regarding the same AR content. The content definitions N405 and N413 may be separate data, or may be single. In the case that redundant content definitions are taken as single data, the same value is stored as a pointer to reference a content definition. For example, a pointer to reference the content definition N405 included in the marker definition N301, and a pointer to reference the content definition N413 included in the marker definition N303 have the same value.

In order to selectively provide an AR content group regarding a particular scenario, it is sufficient for the particular scenario be selected in the root definition N. An AR content group regarding the particular scenario exists under the scenario definition with the selected scenario ID. According to the data structure illustrated in FIG. 10, AR contents are managed and provided in increments of scenarios.

Figure 11:
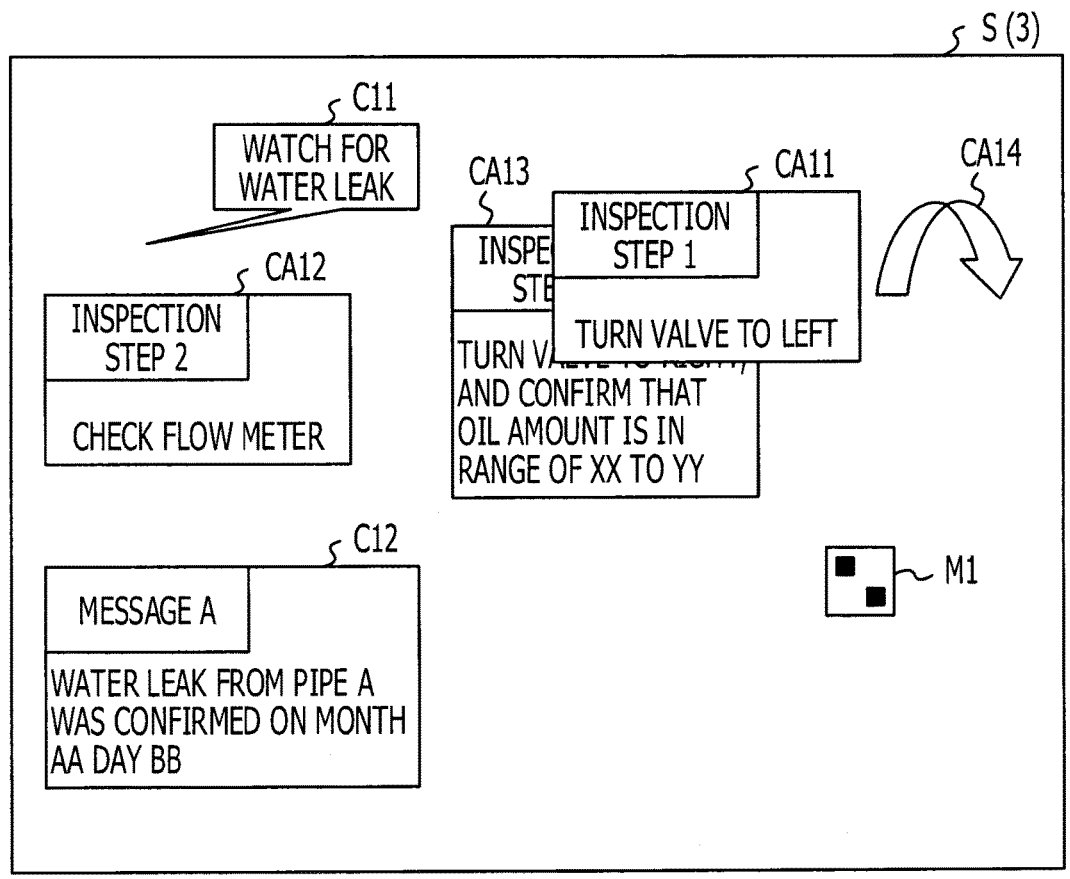
FIG. 11 illustrates a display example of AR contents.

FIG. 11 illustrates a display example of AR contents. The display example illustrated in FIG. 11 illustrates a screen S(3) where the AR content correlated with the AR marker M1 recognized regarding a scenario of inspection work (scenario with the scenario ID: 001) is displayed. The image of the AR marker M1 is included in the screen S(3), and the projection images of the AR contents CA11 to CA14, C11, and C12 generated based on the image of the marker M1 are displayed. The AR contents CA11 to CA14, C11, and C12 are defined under the scenario definition with the scenario ID: 001, and accordingly become objects to be displayed. While the AR contents CB11 to CB13 are displayed on the screen S(2) illustrated in FIG. 8, the AR contents CB11 to CB13 are not displayed on the screen S(3). This is because the AR contents CB11 to CB13 are defined under the scenario definition with the scenario ID: 002. As illustrated in FIG. 10, AR contents are defined under a scenario, whereby AR contents according to the scenario are individually provided for each scenario, as in screen S(3 ).

[Selective Provision According to Step]

As described above, a scenario is configured of multiple sets of work, but multiple sets of work may be configured in an orderly sequence as a series of steps. If we say that multiple steps are executed in an orderly sequence in a scenario, providing the user with an AR content regarding a step not being executed by the user, does not help when consulting on a step being executed by the user. For example, in the case of a step for the user performing confirmation of oil amount, it is sufficient for the AR content CA13 for procedure display to be displayed on the screen S3 ) in FIG. 11. Displaying the AR contents CA11 and CA12 for procedure display does not aid. Further, there may also be a situation in which an AR content (CA11 or CA12 ) with a step different from the current step as an object is displayed in a manner superimposed on the AR content to be displayed in the current step. For example, the operation instruction according to the AR content CA13 to the effect that the valve for confirming oil amount is turned to the right is less visible by the AR content CA11 on the screen S(3). Also, according to display of the AR contents CA11 and CA12, the field of view to be reserved is blocked by the user viewing the imaged image.

Therefore, for example, management of AR contents in increments of steps is performed. Of a group of AR contents regarding a particular scenario, a group regarding each step included in a scenario is further formed.

Figure 12:
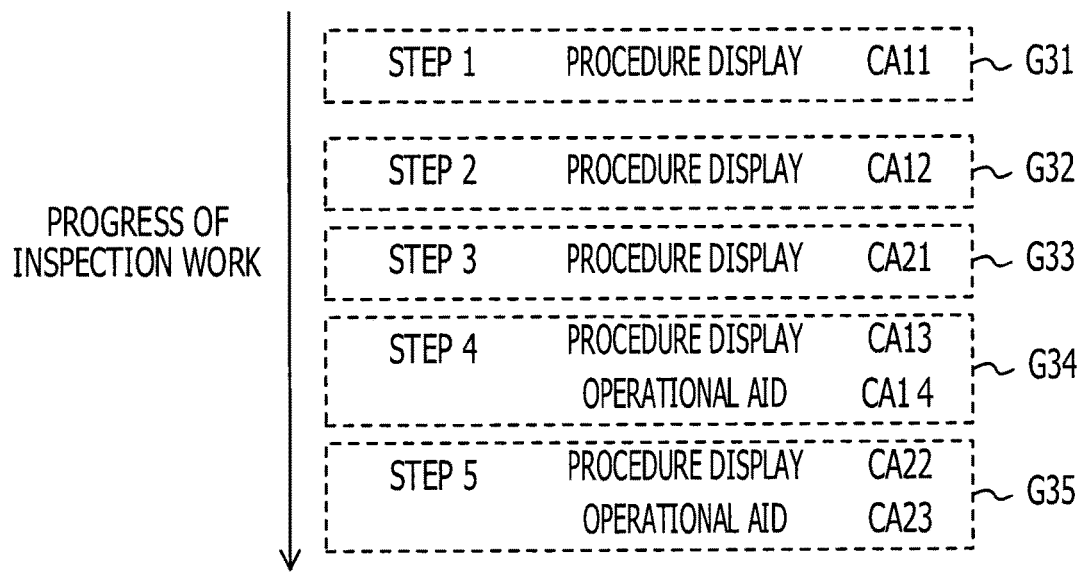
FIG. 12 illustrates groups of AR contents.

FIG. 12 illustrates a group of AR contents. The AR content groups G31 to G35 illustrated in FIG. 12 are an example of a group of AR contents corresponding to each step included in the scenario with the scenario ID: 001.

The scenario with the scenario ID: 001 in the example illustrated in FIG. 12 is configured of five steps of steps 1to 5. In step 1, the user performs work based on the AR content CA11 for procedure display. In step 2, the user performs work based on the AR content CA12 for procedure display. The AR contents CA11 and CA12 are displayed with the AR marker M1 as a reference. In step 3, the user performs work based on the AR content CA21 for procedure display. The AR content CA21 is displayed with the AR marker M2 as a reference. In step 4, the user performs work based on the AR content CA13 for procedure display and the AR content CA14 for operational aid. The AR contents CA13 and CA14are displayed with the AR marker M1 as a reference. In step 5, the user performs work based on the AR content CA22 for procedure display and the AR content CA23 for operational aid. The AR contents CA22 and CA23 are displayed with the AR marker M2 as a reference.

In the case of display control with a group for each step illustrated in FIG. 12, the status of the current step is managed, and control for displaying the AR content in the current step is performed, for example. At this time, AR contents regarding other steps are hidden.

Figure 13:
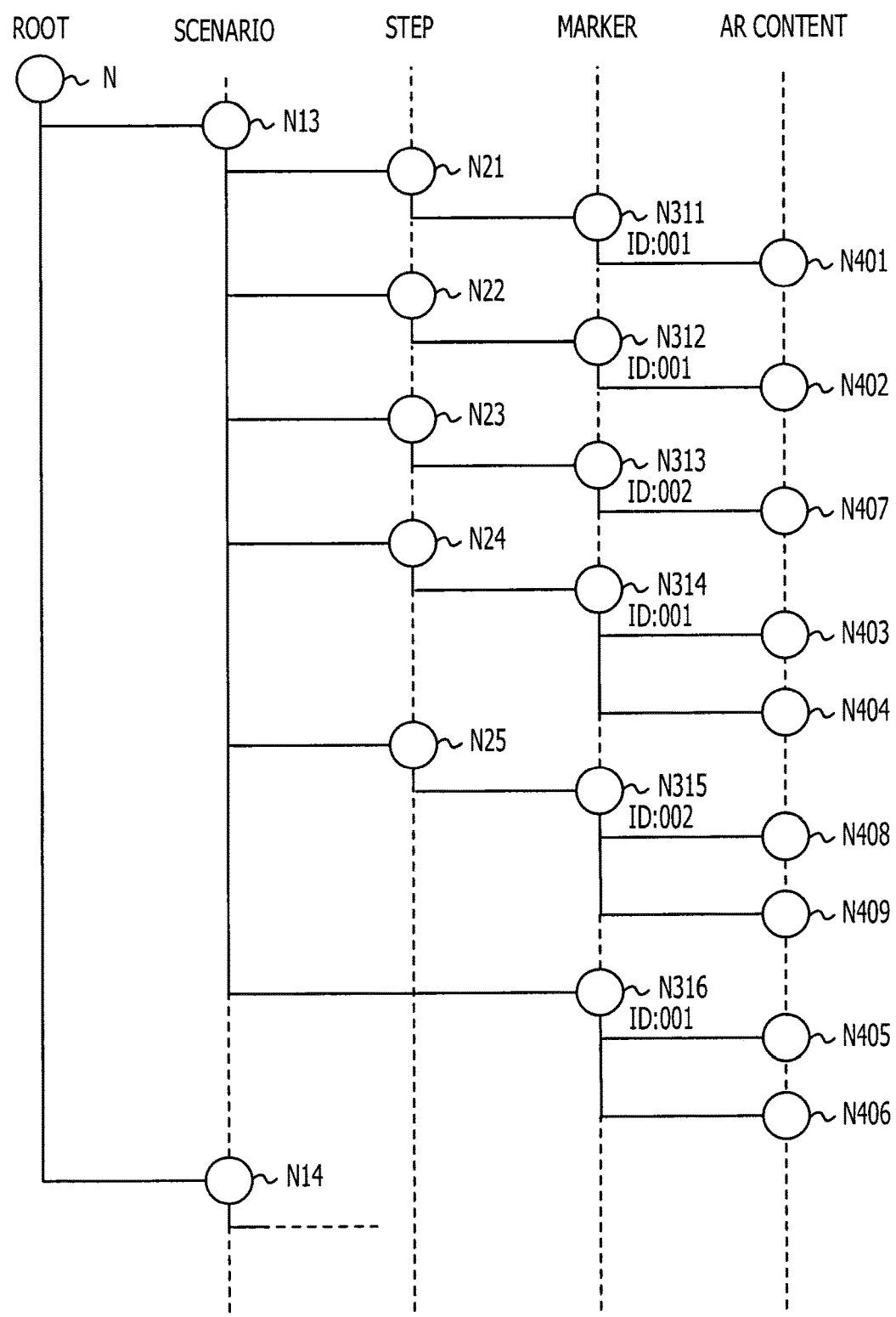
FIG. 13 illustrates a data structure example of AR-defined data.

FIG. 13 illustrates a data structure example of AR-defined data. According to the data structure illustrated in FIG. 13, AR contents are managed and provided in increments of steps. The data structure illustrated in FIG. 13 has, in the same way as with the data structure exemplarily illustrated in FIG. 10, a tree structure. Steps are components included in a scenario. Thus, steps are defined with data elements lower than a scenario and also upper than AR contents in the tree structure.

The root definition N with a tree structure in FIG. 13 is similar to the root definition N illustrated in FIG. 10, information regarding a scenario is browsable according to the selected scenario ID with reference to the root definition N.

Each scenario definition illustrated in FIG. 13 includes a reference destination of information regarding each step (step definition) included in each scenario. A scenario definition N13 is information regarding a scenario with the scenario ID: 001, and includes a pointer to a step definition regarding each of steps 1 to 5 included in the scenario. Upon referencing the scenario definition N13, the corresponding step definition is browsable according to the number of a step.

The step definitions illustrated in FIG. 13 include a reference destination of the marker definition of an AR marker serving as a reference of AR content display in a step. For example, a step definition N21 includes a pointer to a marker definition N311 of an AR marker with the marker ID: 001. Upon referencing the step definition N311 , the corresponding marker definition is browsable according to the marker ID.

The marker definitions illustrated in FIG. 13 include a pointer to the content definition of the AR content to be displayed according to recognition of an AR marker in a step defined in a step definition upper than a marker definition. For example, a marker definition N311 includes a pointer to the content definition of the AR content to be displayed in the case that the AR marker M1with the marker ID: 001 has been recognized in step 1.

According to the data structure illustrated in FIG. 13, in order to perform AR content display in increments of steps, it is sufficient for steps to be selected sequentially in a scenario definition N13. An AR content group to be displayed in each step is defined under step definitions to be sequentially selected.

Figure 14:
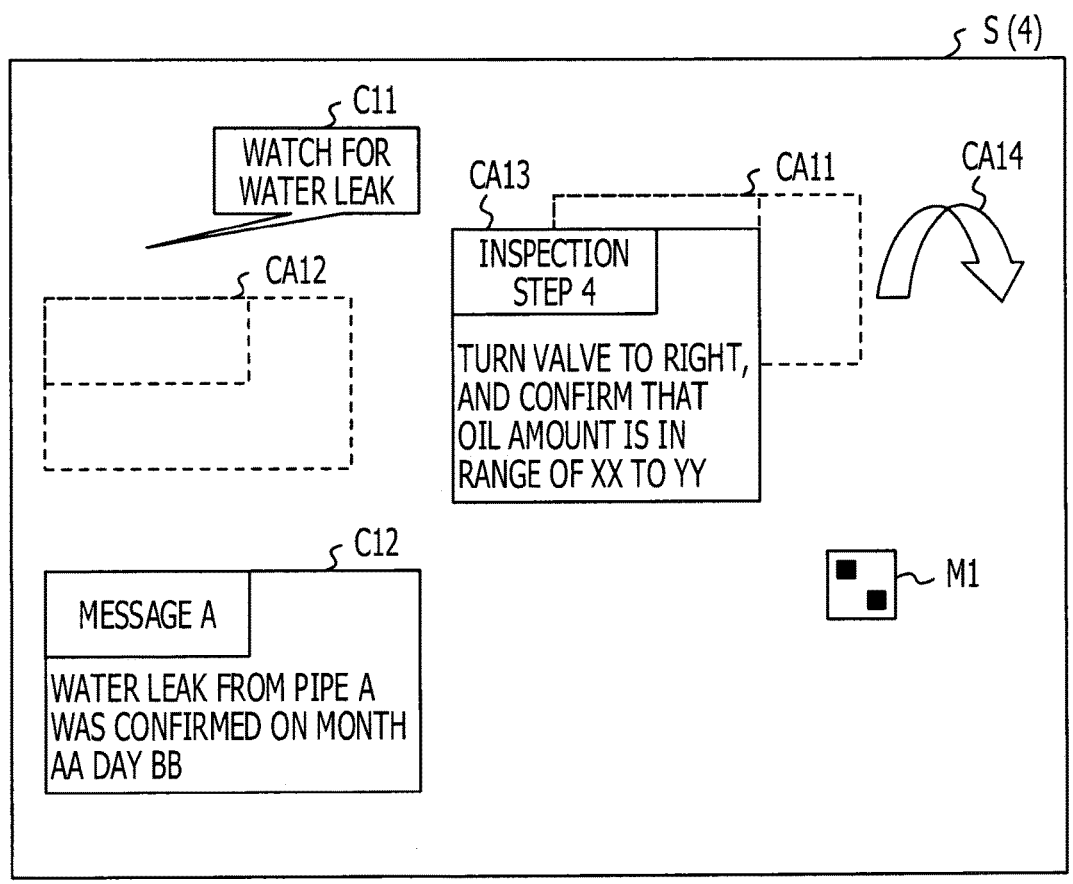
FIG. 14 illustrates a display example of AR contents.

FIG. 14 illustrates a display example of AR contents. The screen S4) illustrated in FIG. 14 is a screen example in the case that display of an AR content group under the selected step definition in the data structure illustrated in FIG. 13 has been performed. AR contents defined in the content definitions N403 and N404 under the step definition N24 (corresponding to step 4 in FIG. 12) are displayed in the screen S4). In the same way as with the AR contents CA13 and CA14 (corresponding to the content definitions N403 and 404), the AR contents CA11 and CA12(corresponding to the content definitions N401 and N402) with the AR marker M1 as a reference of display are not displayed. In FIG. 14, it is indicated by dotted-line display of AR contents that the AR contents CA11 and CA12 are not displayed. This is because the contents N401 and N402 do not exist under the step definition N24. That is to say, the data structure in which AR contents are managed in increments of steps is employed, whereby display of an AR content regarding a process different from the current process is suppressed.

Alternatively, an arrangement may be made as another display control example in which an AR content relating to a process different from the current process is not completely hidden, of which the texture is not mapped, and the wireframes alone is displayed. For example, along with display of an AR content group under the step definition N24 of the current step, display of the wireframes alone may be performed regarding AR content groups under the step definitions N21 to N23, and 25 of other steps without texture mapping. Thus, it is suppressed that the AR content in the current process is difficult to see caused by an AR content relating to a process different from the current process being displayed. Also, control may be performed in which an AR content with wireframes alone regarding a process different from the current process is displayed on the back, and an AR content in the current process subjected to texture mapping is displayed on the front.

Figure 15:
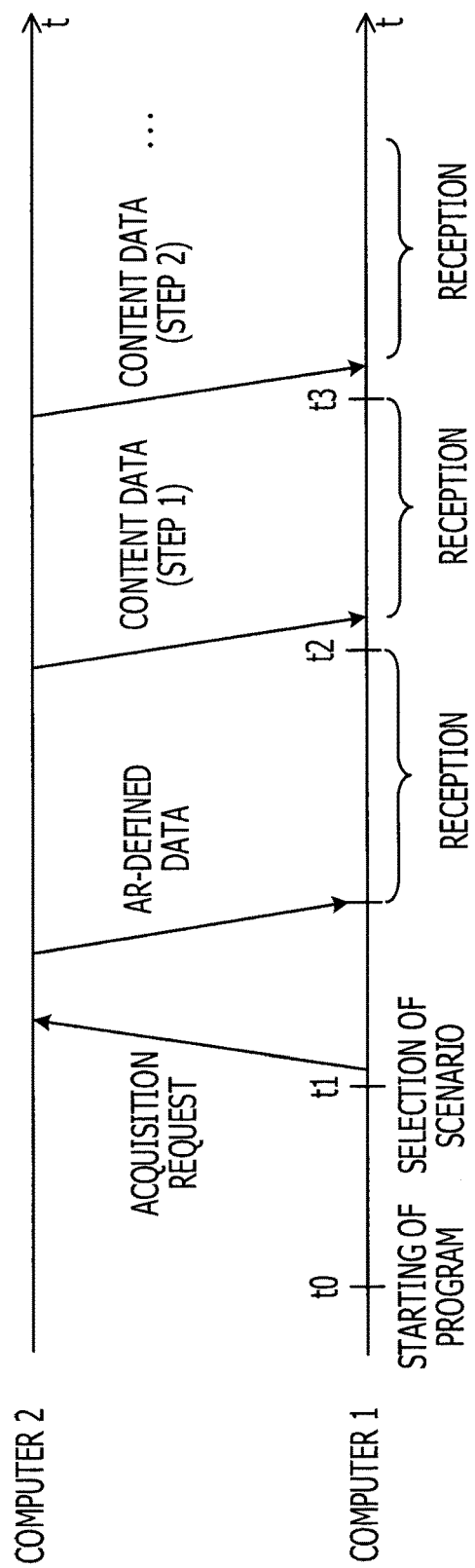
FIG. 15 illustrates an AR content providing sequence example.

FIG. 15 illustrates an AR content providing sequence example. Management of AR contents in increments of steps enables gradual implementation of download of AR contents. After activation of a program, upon a scenario being selected at the computer 1 (t1), the selected scenario definition, and AR-defined data (scenario definition, step definition, marker definition, and content definition) under the scenario definition are downloaded. Display of an AR content is performed using the data of an AR template indicated in the content definition, and accordingly, after download completion of the AR-defined data (t2), download of AR templates is sequentially performed. At this time, an AR template to be used at the first step is preferentially downloaded in the selected scenario, thereby enabling start timing of AR content display to be accelerated in comparison with a download complete point of all of AR contents included in the scenario. AR content display regarding step 1 may be started at least at a point-in-time when the AR template regarding step 1 is downloaded (t3).

[Function Configuration of Present Embodiment]

Figure 16:
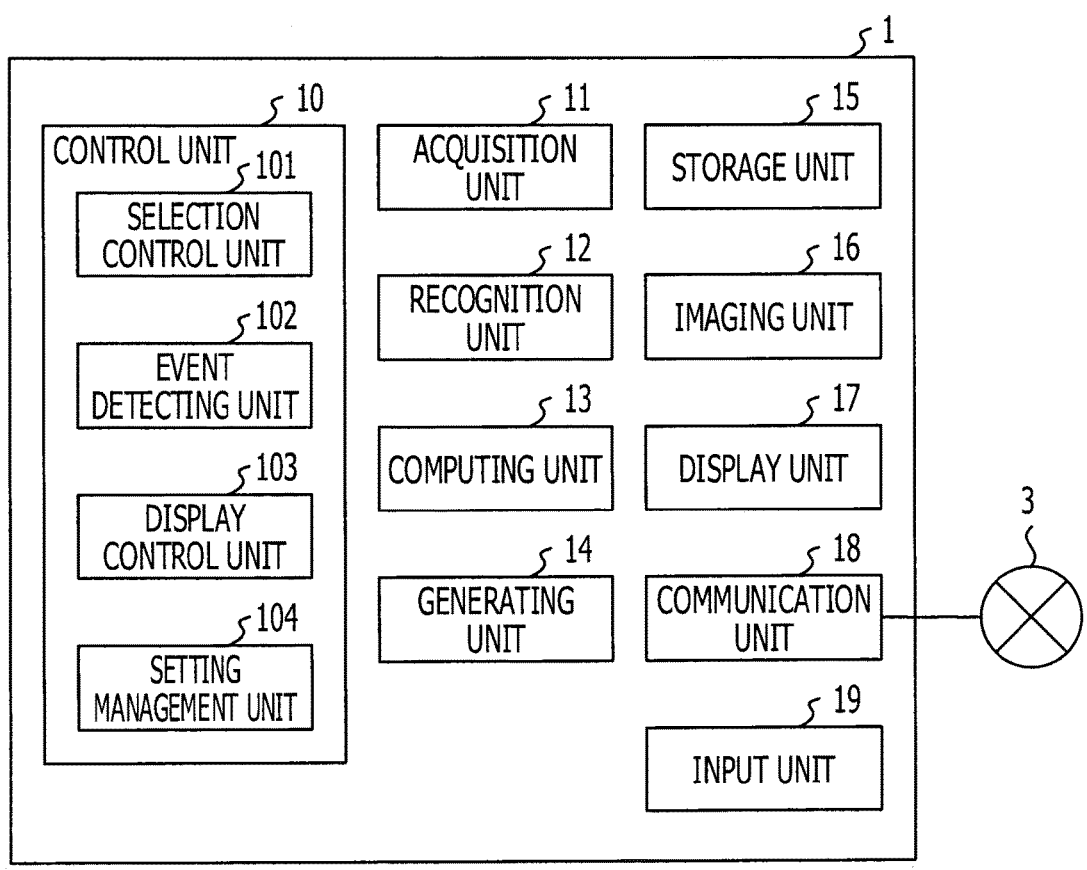
FIG. 16 illustrates a function block configuration example of a computer 1.

FIG. 16 illustrates a function block configuration example of the computer 1. The computer 1 includes a control unit 10, an acquisition unit 11, a recognition unit 12, a computing unit 13, a generating unit 14, a storage unit 15, an imaging unit 16, a display unit 17, a communication unit 18, and an input unit 19. The control unit 10 includes a selection control unit 101, an event detecting unit 102, a display control unit 103, and a setting management unit 104.

The control unit 10 controls other function blocks to execute provision of an AR content and edit of an AR content. The acquisition unit 11 downloads an AR content from the computer 2. The recognition unit 12 performs recognition of an AR marker based on an imaged image imaged by the imaging unit 16. At the time recognition of an AR marker, the recognition unit 12 reads a marker ID for identifying the AR marker, and calculates the coordinates of the AR marker in the camera coordinate system. The computing unit 13 converts position information (marker coordinate system) of the AR content into position information (screen coordinate system). Also, the computing unit 13 computes the position of the marker coordinate system corresponding to a position on the screen based on the coordinates of the AR marker calculated by the recognition unit 12. The generating unit 14 generates a projection image of the AR content based on the position information computed by the computing unit 13.

The storage unit 15 stores information to be used at other function blocks. For example, the storage unit 15 stores the AR content downloaded by the acquisition unit 11, management information to be used for display and edit of AR contents, and so forth. The imaging unit 16 performs imaging processing. An imaged image obtained by imaging processing of the imaging unit 16 is also stored in the storage unit 15. The display unit 17 displays images. The communication unit 18 performs data communication with another device (for example, computer 2) via a network 3. The input unit 19 detects an operation of an operator of the computer 1, and transmits a signal corresponding to the detection to the control unit 10.

The selection control unit 101, event detecting unit 102, display control unit 103, and setting management unit 104 are function blocks to execute part of the processing procedure of AR content display and edit processing which is executed by the control unit 10. The selection control unit 101 generates a display event of a scenario list, and generates an acquisition event of an AR content in response to selection within the scenario list. The scenario list will be described later. The event detecting unit 102 generates a switching event based on the recognition result of the recognition unit 12. The display control unit 103 makes the transition of a screen to be displayed on the display unit 17 along a status transition definition. Screen transition by the display control unit 103 is performed in response to generation of a display event. The control unit 10 generates a display event of a projection image upon a projection image being generated by the generating unit 14. Upon a display event of a projection image being generated, the display control unit 103 controls the display unit 17 to display a projection image in a superimposed manner within an imaged image imaged by the imaging unit 16. The setting management unit 104 manages setting of calculation information generated by the computing unit 13.

[Processing Procedure of AR Content Display]

Figure 17:
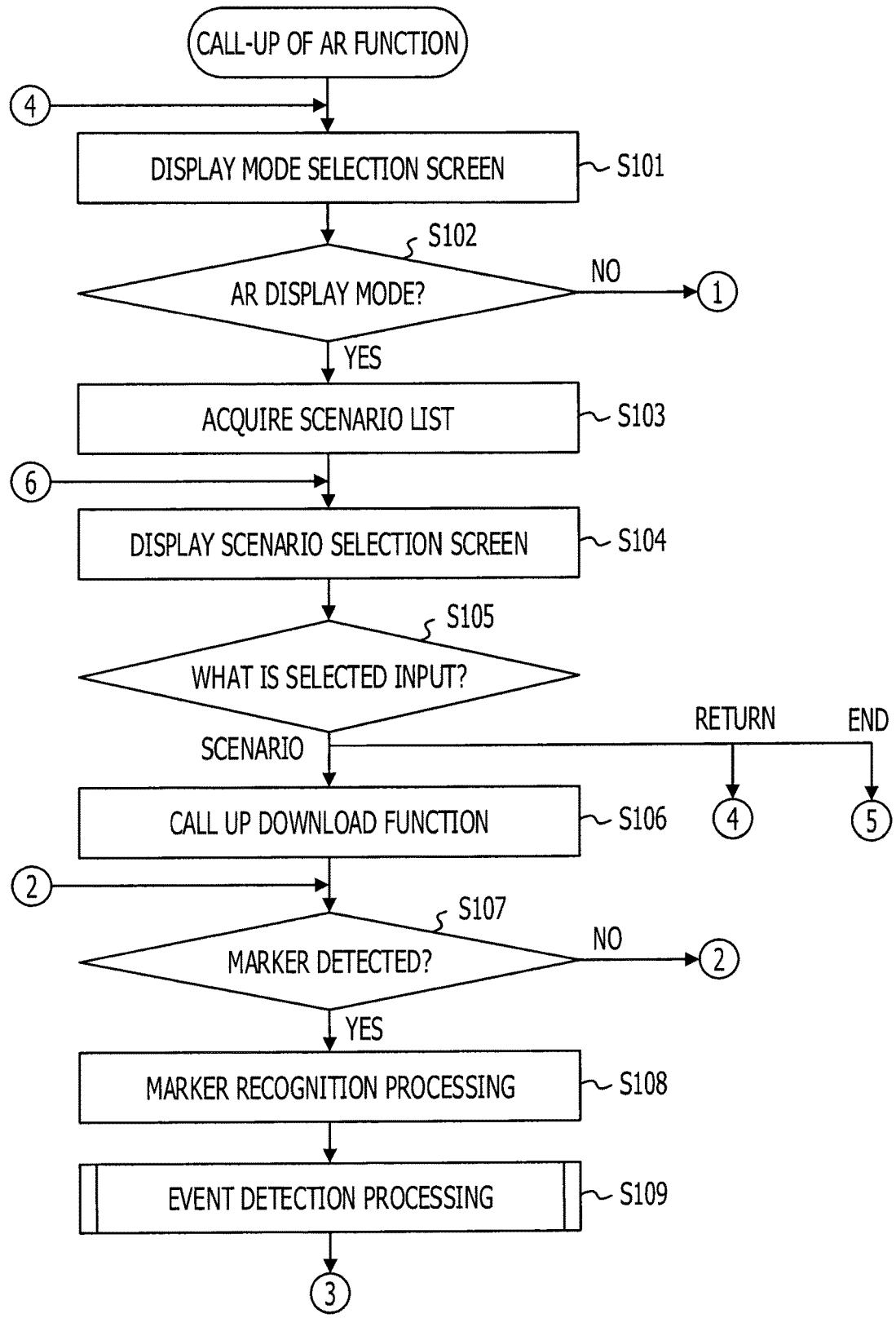
FIG. 17 illustrates a processing procedure example of an AR function.
Figure 18:
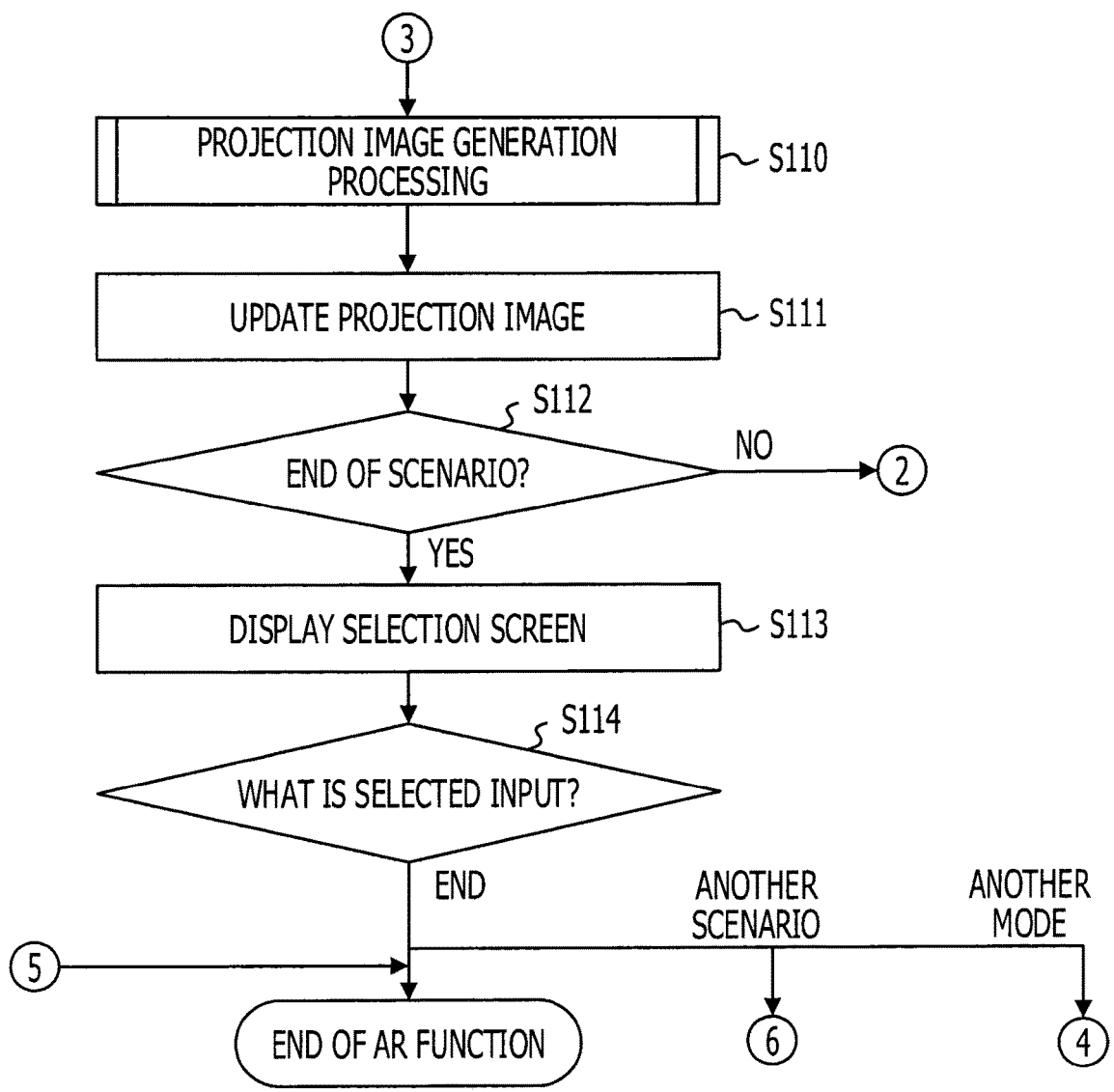
FIG. 18 illustrates a processing procedure example of the AR function.

FIG. 17 and FIG. 18 illustrate the processing procedure of an AR function. The AR function illustrated of which the processing procedure is illustrated in FIG. 17 and FIG. 18 provides two modes of an AR display mode and an AR edit mode. The AR function is called up by a program activation instruction being provided according to the user's input, for example. Upon the AR function being called up, the control unit 10 generates a display event of a mode selection screen S(5), and the display unit 17 displays the mode selection screen S(5) in response to generation of the display event (S101).

Figure 19:
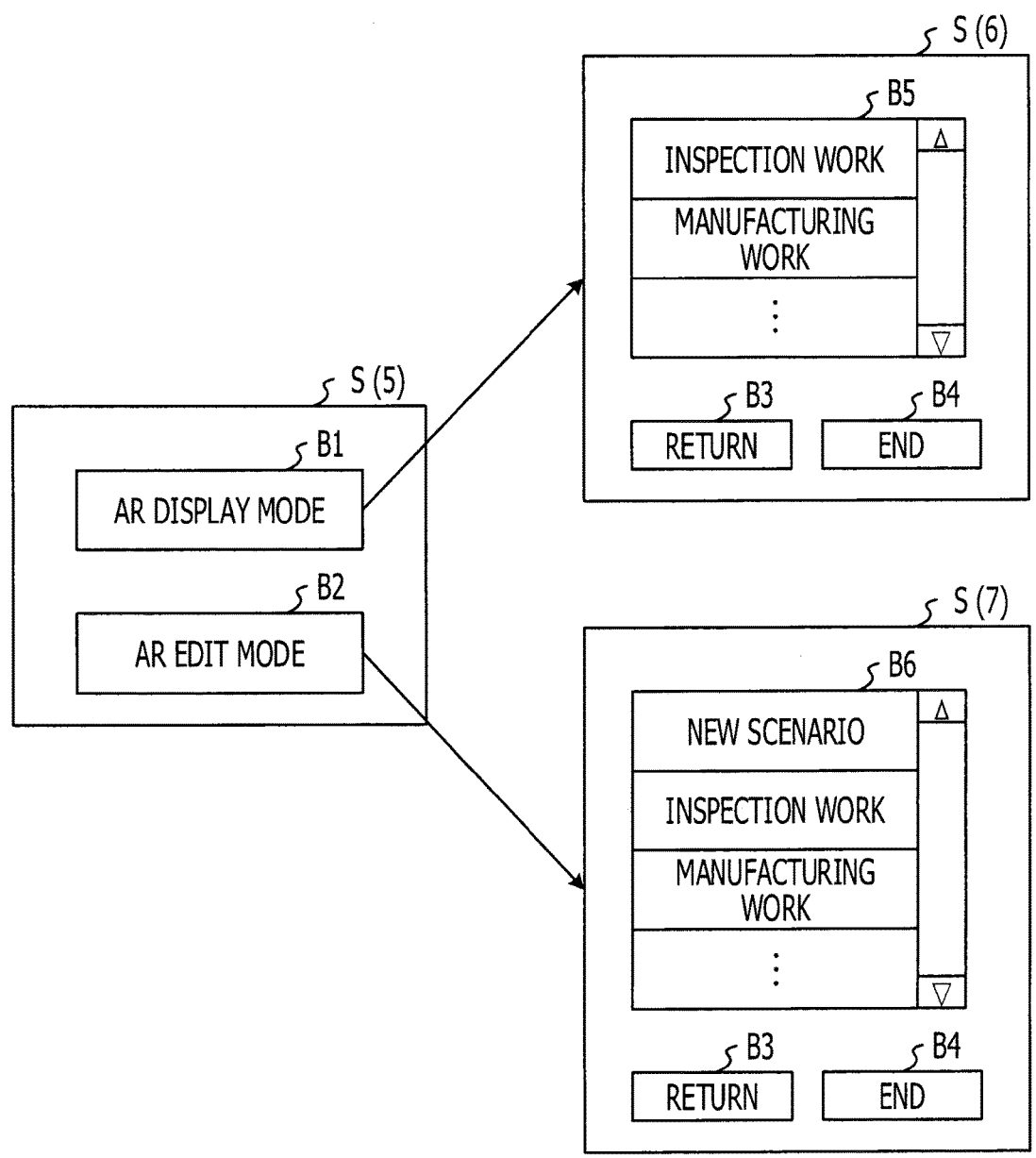
FIG. 19 illustrates an example of a mode selection screen and a scenario selection screen.

FIG. 19 illustrates an example of a mode selection screen and a scenario selection screen. The mode selection screen S(5) includes a button B1 and a button B2. A region within the screen is allocated to each of the button B1 and button B2. Display indicating the AR display mode is performed in the region allocated to the button B1, and the AR display mode is selected by input to the region allocated to the button B1. In the same way as with the button B1, display indicating the AR edit mode is performed in the region allocated to the button B2, and the AR edit mode is selected by input to the region allocated to the button B2.

A scenario selection screen S6) is a screen including a button B3 and a button B4, and a button group B5. Upon the AR display mode being selected on the mode selection screen S(5), the scenario selection screen S(6) is displayed. A region within the screen is allocated to the button B3, and display to the effect that display returns to the mode selection screen S(5) is performed within the allocated region. Also, the mode selection screen S(5) is displayed by input to the region allocated to the button B3. A region within the screen is allocated to the button B4, and display to the effect that the AR function is ended is performed within the allocated region. Also, end processing of the AR function is executed by input to the region allocated to the button B4. A region within the screen is allocated to each button of the button group B5, and a scenario name labeled with a scenario is displayed in each allocated region. A scenario is selected in response to input to the region where the scenario name is displayed.

A scenario selection screen S(7) also includes the button B3 and B4, and further includes a button group B6. The button group B6 includes the same buttons as with the button group B5, and a button corresponding to a new scenario. Upon the new scenario button being selected, a scenario is newly created.

Upon the input unit 19 detecting an input operation in a state in which the mode selection screen is displayed, in S101 in FIG. 17, the input unit 19 transmits the user's input in the mode selection screen to the control unit 10, and the control unit 10 determines whether or not the AR display mode has been selected by the user's input (S102). Upon the AR display mode being selected in the mode selection screen, display processing of an AR content according to a scenario is executed, and on the other hand, upon the AR edit mode being selected, edit processing of the AR content is executed.

Upon the AR display mode being selected in the mode selection screen, the selection control unit 101 generates a scenario list acquisition event, and the acquisition unit 11 acquires a scenario list from the computer 2 via the communication unit 18 in response to generation of an acquisition event. The scenario list is generated based on the root definition N and so forth included in the AR-defined data illustrated in FIG. 10 and FIG. 13.

Also, an arrangement may be made in which multiple kinds of scenario lists are prepared, and a scenario list to be provided is switched according to information relating to the user who is work execution subject (for example, account). For example, a login operation based on input such as the user's account information or password or the like is performed before S101, a scenario list corresponding to the user's account information input at the time of login is provided. Thus, scenario provision according to the user's privileges to be allocated at an organization handling multiple business processes is enabled.

FIG. 20 illustrates a data structure example of a root definition. Each data included in AR-defined data is configured of, for example, list (information unit 1 and information unit group 2) of information (information unit) with predetermined data length (for example, four bytes) as a unit. The number Ns of scenarios existing under the root is illustrated in the first information unit (information unit 1) of the root definition N. The root definition N includes Ns information units following the information unit indicating the number Ns of scenarios. The second information unit (information unit group 2) and thereafter include a scenario ID for identifying a scenario under the root, and a pointer indicating a storage destination of a scenario definition.

The scenario list that the acquisition unit 11 acquires may be the root definition itself, or may be the root definition from which the pointers to a scenario definition under the root are removed. Also, information in which the corresponding scenario name is correlated with each scenario ID under the root may be employed as a scenario list. Also, for example, in the case of a configuration in which multiple kinds of scenario lists are switched according to the user's account, a plurality of the entire AR-defined data are prepared.

Upon a scenario list being acquired in S103 in FIG. 17, the selection control unit 101 generates a display event for the scenario selection screen S(6), the display control unit 103 controls the display unit 17 to display the scenario selection screen S(6) in response to generation of a display event (S104). Upon detecting an input operation in a state in which the scenario selection screen is displayed, the input unit 19 transmits the user's input in the scenario selection screen to the control unit 10, and the control unit 10 determines contents selected by the user's input (S105).

Upon the button B3 where a message indicating returning to the mode selection screen S(5) ("return") is displayed being selected in S105 ("return" in S105), the processing in S101 is performed again. Also, upon the button B4 where a message indicating ending the AR function ("end") is displayed being selected in S105 ("end" in S105), the AR function is ended. Also, upon one of the scenarios indicated in the button group B5 being selected in S105 ("scenario" in S105), the control unit 10 controls the acquisition unit 11 to start download processing of the AR content group provided from the scenario selected in S105 (S106).

Figure 21:
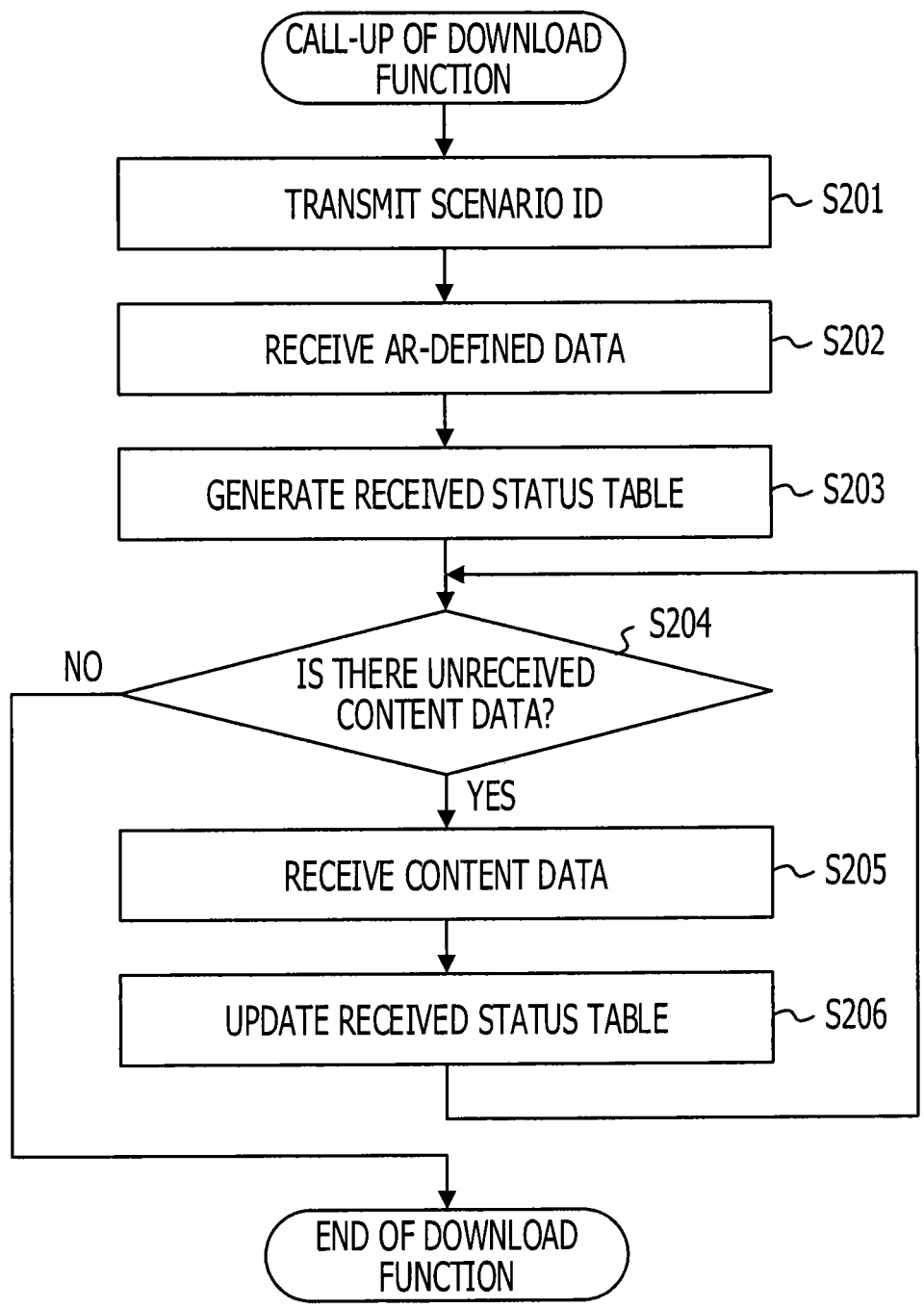
FIG. 21 illustrates a processing procedure example of a download function.

FIG. 21 illustrates a processing procedure example of the download function. The acquisition unit 11 transmits the scenario ID of the selected scenario to the computer 2 via the communication unit 18 (S201). The computer 2 transmits the AR-defined data corresponding to the scenario ID transmitted by the acquisition unit 11 to the computer 1. The processing procedure of the computer 2 will be described in FIG. 52. The acquisition unit 11 receives the AR-defined data transmitted from the computer 2 via the communication unit 18 (S202).

A data structure example of AR-defined data is illustrated in FIG. 10 or FIG. 13. The root definition N which is part of AR-defined data is illustrated in FIG. 20. The data structure examples of the scenario definition, step definition, marker definition, and content definition in the data structure example illustrated in FIG. 13 are illustrated in FIG. 22 to FIG. 25, respectively.

FIG. 22 illustrates a data structure example of scenario definitions. The storage position of the scenario definition N13 illustrated in FIG. 22 is indicated by a pointer included in the root definition N. The scenario definitions are configured of information units (information unit 1, information unit group 2, information unit 3, and information unit group 4) with predetermined data length. The first information unit of the scenario definition N13 (information unit 1) includes the number of step definitions under the scenario definition N13 (5 at the scenario definition 13), and a pointer indicating the storage position of the root definition N. The information units equivalent to the number of step definitions indicated in the first information unit (information unit group 2) are included in the scenario definition N13 following the first information unit. These information units include the step number of a step definition under the scenario definition N13 and a pointer indicating the storage position of the step definition. Further, the information unit following information regarding step definitions under the scenario definition N13 (information unit 3) indicates the number of marker definitions under the scenario definition N13 (1 in the scenario definition N13). Further, the information units equivalent to the number of marker definitions under the scenario definition N13 (information unit group 4) are subsequently included in the scenario definition N13. These information units include the marker ID of a marker definition under the scenario definition N13 and a pointer indicating the storage position of the marker definition.

Figure 23:
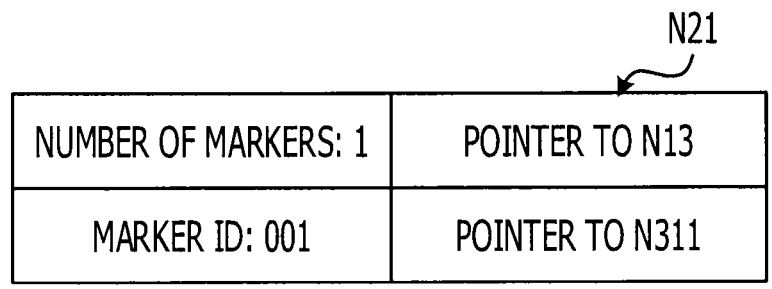
FIG. 23 illustrates a data structure example of step definitions.

FIG. 23 illustrates a data structure example of step definitions. The storage position of the step definition N21 illustrated in FIG. 23 is indicated by a pointer included in the scenario definition N13. The step definitions are configured of information units (information unit 1 and information unit group 2) with predetermined data length. The first information unit of the step definition N21 (information unit 1) includes the number of marker definitions under the step definition N21 (1 at the step definition 21), and a pointer indicating the storage position of the scenario definition N13. Information units equivalent to the number of marker definitions indicated in the information unit 1 (information unit group 2) are included in the step definition N21 following the first information unit. These information units include the marker ID of a marker definition under the step definition N21 and a pointer indicating the storage position of the marker definition.

Figure 24:
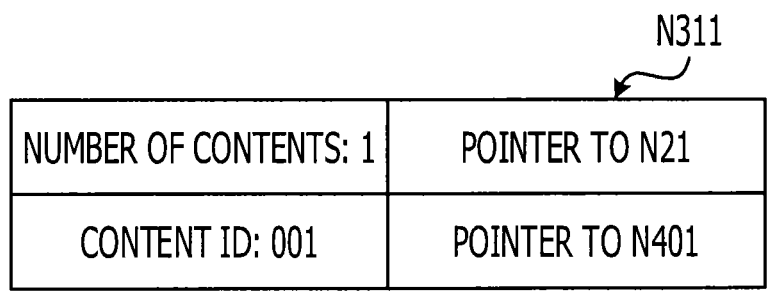
FIG. 24 illustrates a data structure example of marker definitions.

FIG. 24 illustrates a data structure example of marker definitions. The storage position of the marker definition N311 illustrated in FIG. 24 is indicated by a pointer included in the step definition N21. The marker definitions are configured of information units (information unit 1 and information unit group 2) with predetermined data length. The first information unit of the marker definition 311 (information unit 1) includes the number of content definitions under the marker definition N311 (1 at the marker definition N311), and a pointer indicating the storage position of the step definition N21. Information units equivalent to the number of content definitions indicated in the first information unit (information unit group 2) are included in the marker definition N311 following the first information unit. These information units include the content ID of a content definition under the marker definition N311 and a pointer indicating the storage position of the content definition.

Figure 25:
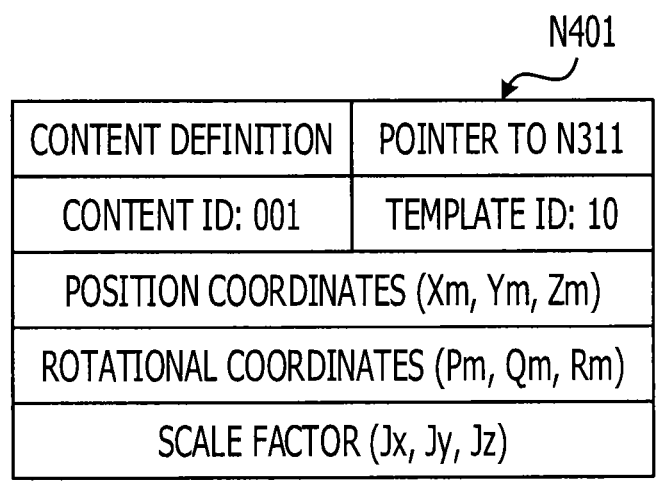
FIG. 25 illustrates a data structure example of content definitions.

FIG. 25 illustrates a data structure example of content definitions. The storage position of the content definition N401 illustrated in FIG. 25 is indicated by a pointer included in the marker definition N311. The content definitions are configured of information units (information units 1 to 5) with predetermined data length. The first information unit of the content definition N401 (information unit 1) includes information to the effect that this is a content definition, and a pointer to the marker definition N401. Also, the second information unit of the content definition N401 (information unit 2) indicates the content ID of the content definition N401, and the template ID of an AR template to be used for the AR content defined by the content definition N401. The third information unit of the content definition N401 (information unit 3) indicates position coordinates (Xm, Ym, Zm) in the marker coordinate system. A reference point of the AR content is set to the position coordinates thereof. The fourth information unit of the content definition N401 (information unit 4) indicates rotation coordinates (Pm, Qm, Rm) in the marker coordinate system. Further, the fifth information unit of the content definition N401 (information unit 5) indicates a scale factor (Jx, Jy, Jz) of the AR content.

Upon AR-defined data under the selected scenario being acquired, the acquisition unit 11 generates a received status table T 1 in a work area of the storage unit 15 (S203).

Figure 26:
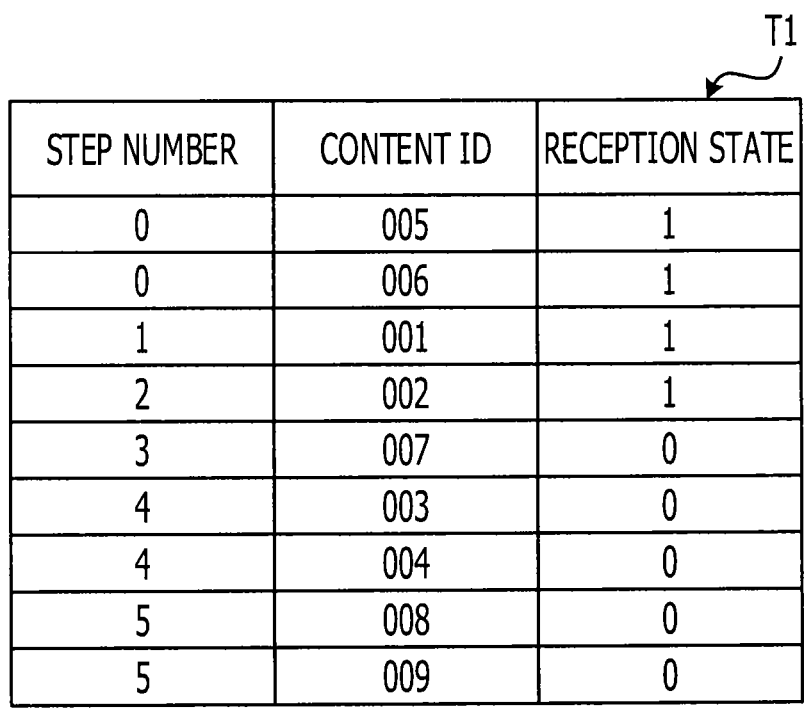
FIG. 26 illustrates an example of a received status table.

FIG. 26 illustrates an example of the received status table T 1. The received status table T 1 is a table configured to correlate, regarding each AR content included in the selected scenario, the step number of a step in which the AR content is displayed, content ID, and information indicating a reception state of whether or not the AR content has been received. The reception state is indicated by its value; a value "0" indicates reception of content data incomplete, and a value "1" indicates reception of content data complete. The example of the received status table illustrated in FIG. 26 is an example in the case that the scenario ID: 001 has been selected. In the case that reception of content data (AR template and image file) of an AR content has been completed, the reception state is changed from "0" to "1".

Upon the received status table T 1 being generated, the acquisition unit 11 references the received status table T 1 to determine whether or not there is unreceived content data (S204). In the case that there is unreceived content data (YES in S204), the acquisition unit 11 performs reception of content data (S205). Though description will be made later with reference to FIG. 25, the computer 2 sequentially transmits the content data of an AR content included in the selected scenario for each step.

The content data is information indicating the shape and pattern of an AR content of which the position, direction, and size are defined by a content definition. The content data includes an AR template and an image file indicated in the AR template.

FIG. 27 illustrates a data structure example of AR templates. An AR template T 2 includes the template ID of the AR template, coordinate data T 21 of each vertex making up the AR template, and face configuration data T 22 of each face making up the AR template. Information of each face included in the face configuration data includes a vertex order that is the order of vertexes making up a face, and specification of a texture ID. The texture ID indicates identification information of texture to be mapped on a face (identification information of an image file). A reference point of an AR template is, for example, the O'th vertex.

Upon a predetermined amount of time elapsing after execution of S205, the acquisition unit 11 updates the received status table T 1 (S206). The acquisition unit 11 changes, regarding an AR content of which the content data has completely been received, the reception state of the received status table T 1 from "0" to "1". Upon all of the AR template T 2 corresponding to the AR content, and an image filed specified in the AR template T 2 being downloaded, determination is made that reception of the AR content has been completed. Upon the processing in S206 having been performed, the acquisition unit 11 performs determination in S204 again.

In the case that there is determined to be no unreceived content data with reference to the received status table T 1 (No in S204), the acquisition unit 11 completes the download function.

After causing the acquisition unit 11 to start the download processing, the control unit 10 controls the recognition unit 12 to determine whether or not an AR marker has been detected (S107). In the case that the image of an AR marker is included in an imaged image imaged by the imaging unit 16, the recognition unit 12 determines that an AR marker has been detected. Whether or not the image of an AR marker is included is determined based on whether or not an image with a parallelogram shape is included in the imaged image, for example. In the case of receiving a determination result to the effect that no AR marker has been detected, from the recognition unit 12 (No in S107), the processing in S107 is executed again after elapse of a predetermined amount of time. The imaging unit 16 periodically performs imaging processing. When the recognition unit 12 performs the processing in S107 again, determination is made based on another imaged image.

In the case of receiving a determination result to the effect that an AR marker has been detected, from the recognition unit 12 (YES in S107), the control unit 10 controls the recognition unit 12 to execute the marker recognition processing (S108). The recognition unit 12 executes the marker recognition processing to calculate, regarding the AR marker detected in S107, the coordinates (position coordinates and rotation coordinates) of the AR marker in the camera coordinate system, and to perform reading of the marker ID of the AR marker. Based on the calculated coordinates of the AR marker, and the read marker ID, recognized marker information D 1 and marker movement information D 2 are updated. Updating of the recognized marker information D 1 and marker movement information D 2 is performed in the event detection processing in S109.

Figure 28:
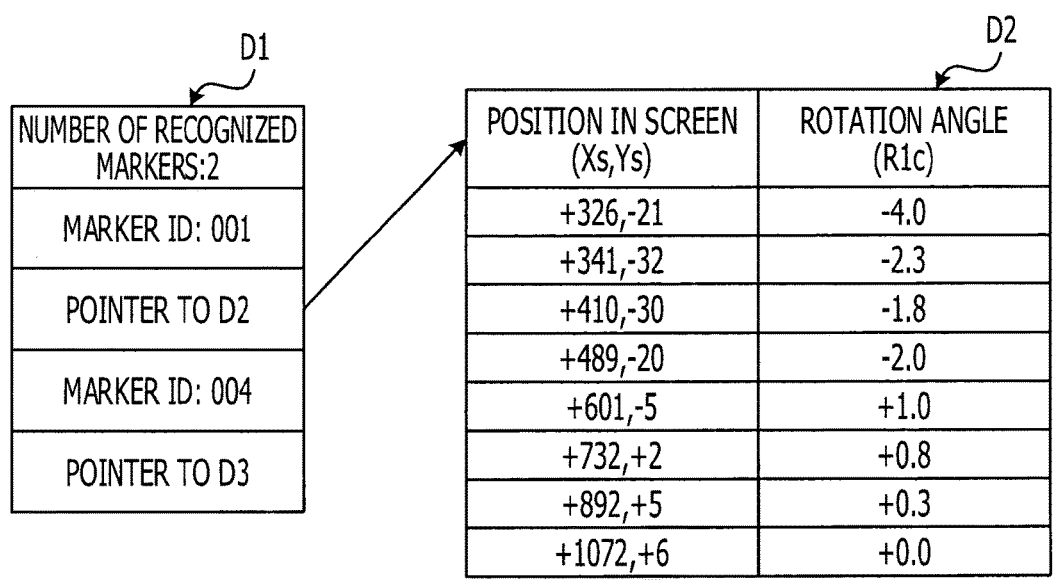
FIG. 28 illustrates an example of recognized marker information and marker movement information.

FIG. 28 illustrates an example of the recognized marker information and marker movement information. The recognized marker information D 1 illustrated in FIG. 28 indicates the number of AR markers recognized by the marker recognition processing in S108, the marker ID and a pointer to movement information regarding each of the recognized AR markers. The marker movement information D 2 pointed by a pointer included in the recognized marker information D 1 indicates the position coordinates (Xs, Ys) and rotation coordinates (R1c) of the image of the AR marker calculated by marker recognition of the latest predetermined number of times. The marker movement information D 2 indicates, for example, the position coordinates (Xs, Ys) and rotation coordinates (R1c) of the image of the AR marker up to the marker recognition processing of eight times before. The unit of position coordinates is, for example, pixels, and the unit of rotation coordinates is, for example, degrees. The recognized marker information D1 and marker movement information D2 are stored in a register or the like.

Upon the marker recognition processing being performed, the control unit 10 executes event detection processing (S109). The step in the selected scenario advances or retreats according to detection of an event by the event detection processing.

Figure 29:
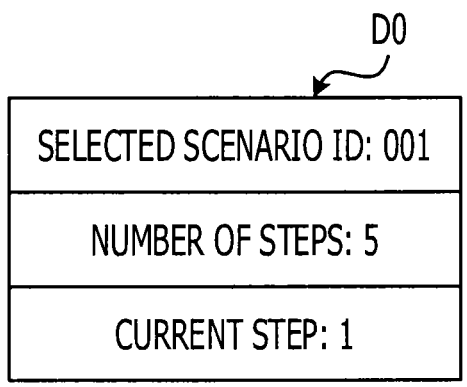
FIG. 29 illustrates an example of scenario status information.

FIG. 29 illustrates an example of status information of a scenario. The status information D0 illustrated in FIG. 29 indicates the progress situation of a scenario. The status information D0 is stored in a register or the like, for example. The status information D0 indicates the scenario ID of the scenario selected in S105, the number of steps included in the selected scenario, and the current step. Upon the step advancing or retreating according to detection of an event, the information of the current step of the status information D0 is updated.

Figure 30:
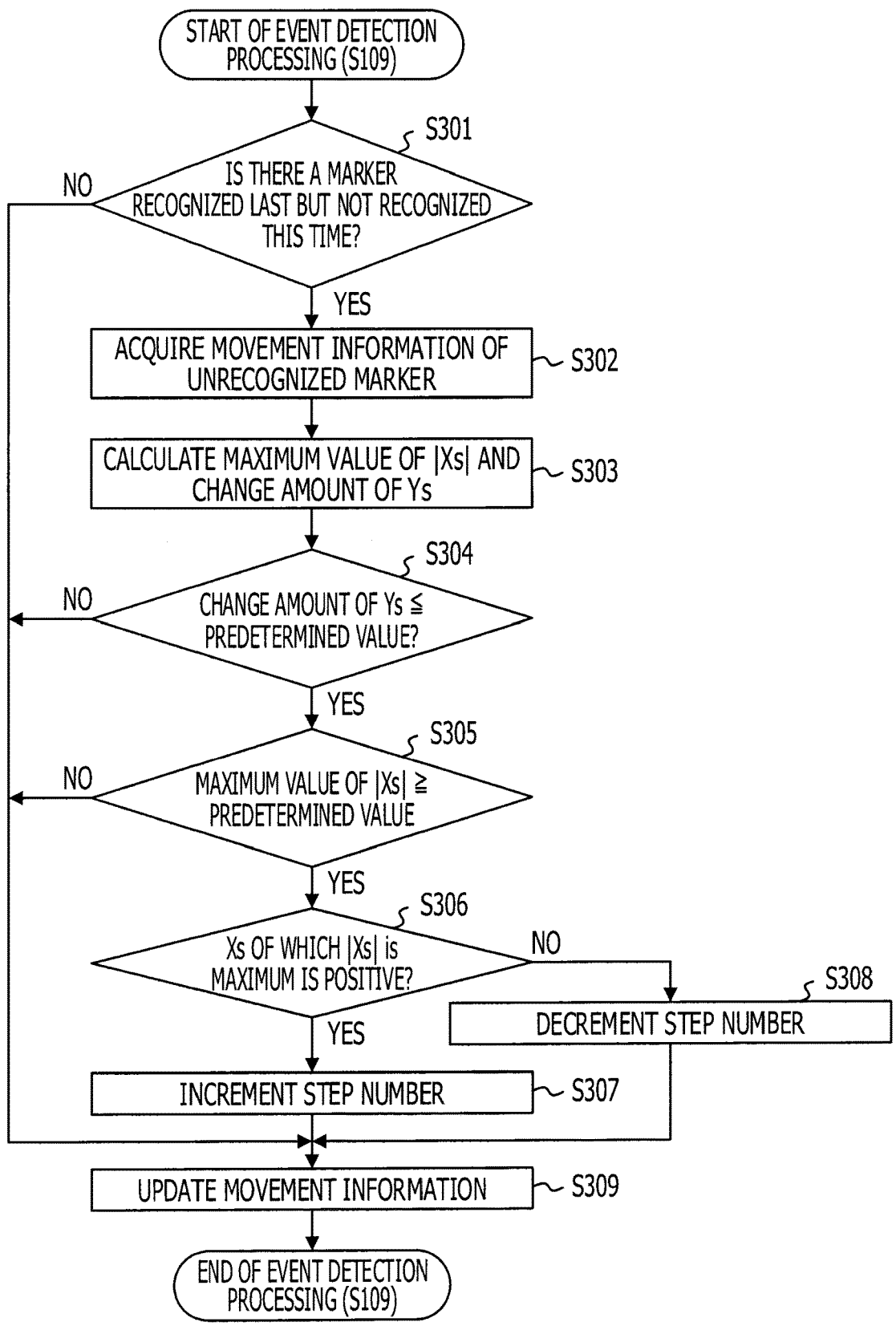
FIG. 30 illustrates an event detection processing procedure example.

FIG. 30 illustrates a processing procedure example of event detection. In the case of the event detection processing illustrated in FIG. 30, when the image of an AR marker moves in the lateral direction and is framed out, increment or decrement of the step number is performed. In the case that the image is framed out in the positive direction in the screen coordinate system, the step number is incremented, and in the case that the image is framed out in the negative direction, the step number is decremented.

Upon the event detection processing being started, the event detecting unit 102 references the recognition marker information D1 to determine whether or not there is an AR marker recognized until the last time but unrecognized in this marker recognition processing (S301). The result of the marker recognition processing (this marker recognition processing) performed immediately before the event detection processing in FIG. 30 is not reflected in the recognized marker information D1 to be referenced in S301. That is to say, the recognized marker information D1 to be referenced in S301 includes the results of the marker recognition processing up to one before the last marker recognition processing (this marker recognition processing). In the case that there is an unrecognized AR marker in S301 (YES in S301), the event detecting unit 102 acquires marker movement information of the unrecognized AR marker detected in S301 based on the recognized marker information (S302).

The event detecting unit 102 further calculates the absolute maximum value of the coordinates in the Xs direction, and change amount in the Ys direction (difference between the maximum value in Ys and the minimum value in Ys) based on the position coordinates included in the marker movement information acquired in S302 (S303). Next, the event detecting unit 102 determines whether or not the change amount in the Ys direction calculated in S303 is equal to or smaller than a predetermined value (S304). In the case that the change amount in the Ys direction calculated in S303 is equal to or smaller than a predetermined value, this determines that the camera of the computer 1 has not been moved much in the vertical direction. In the case that the change amount in the Ys direction calculated in S303 is equal to or smaller than a predetermined value (YES in S303), the event detecting unit 102 determines whether or not the maximum value of the absolute value in the Xs direction calculated in S303 is equal to or greater than a predetermined value (S305). In the case that the maximum value of the absolute value in the Xs direction calculated in S303 is equal to or greater than a predetermined value, this determines that the image of the AR marker exists in a right end region or left end region of the screen. The screen coordinate system is, as described above, configured of two dimensions of (Xs, Ys). For example, the center of an imaged image obtained by the imaging processing of the camera is the origin (origin Os). A smaller value than the maximum value of Xs (equivalent to the right end of the screen) but greater than 0 is employed as a predetermined value. For example, a value such as ¾ of the maximum value of Xs is employed. In the case that the maximum value of the absolute value in the Xs direction calculated in S303 is equal to or greater than a predetermined value (YES in S305), the event detecting unit 102 determines whether or not Xs with the absolute value in the Xs direction as the maximum is a positive value (S306).

In the case that Xs with the absolute value in the Xs direction as the maximum is a positive value (YES in S306), the event detecting unit 102 increments the current step number of the status information D0 (S307). Conversely, in the case that Xs with the absolute value in the Xs direction as the maximum is a negative value (NO in S306), the event detecting unit 102 decrements the current step number of the status information D0 (S308).

In the case that there is no AR marker recognized in the last marker recognition processing but unrecognized in this marker recognition processing (NO in S301), in the case that the change amount of Ys is greater than a predetermined value (NO in S304), in the case that the maximum value of the absolute value in the Xs direction calculated in S303 is smaller than a predetermined value (NO in S305), and in the case that the processing in S307 or S308 has been performed, when one of the above-described cases is applicable, the event detecting unit 102 reflects the recognition result of this marker recognition processing in S108 on the recognized marker information D1 and marker movement information D 2 (S309). Upon the processing in S309 being performed, the event detection processing is ended.

FIG. 31 illustrates an example of a marker to be displayed on the screen. The screen S(8) illustrated in FIG. 31 is an example of the display screen in step 1 of the scenario ID: 001. This is the status of step 1, so the AR content CA11 is displayed, and display of the AR contents CA12 and CA13 is suppressed (or only a portion is displayed). When the image of the AR marker M1 displayed on the screen S(8) moves in an arrow direction, and is framed out, the maximum value of Xs is a positive value, and accordingly, the step number is incremented.

The screen S(9) illustrated in FIG. 31 is an example of a screen at the time of the AR marker M1 being framed in again after being framed out as illustrated in the screen S(8). Upon the AR marker being framed in, the marker is recognized by the marker recognition processing, and display of the AR content corresponding to the recognized marker is performed. In this case, the step is advanced by one in comparison with the screen S(8), the AR content CA12 correspond to step 2 of scenario ID: 001 is displayed. Also, display of the AR content CA11 displayed on the screen S(8) is suppressed (or only a portion is displayed).

Switching of the step according to the event detection processing illustrated in FIG. 30 and FIG. 31 allows the user to switch the step just by changing the direction of the camera in a state holding the computer 1 (while maintaining the posture to browse display of an AR content). Also, according to the procedure in FIG. 30, determination of a frame-out direction is carried out only at timing when no AR marker is recognized.

For example, switching of the step may be performed according to a transition action such as tap of a button, or a tap or flick or the like of the display. However, in the case that the computer 1 is a tablet terminal or the like, in order to perform an operation such as a tap, flick, or the like, the user holds the tablet terminal in one hand. Increase in the size of the terminal makes it difficult for the user to hold the terminal in one hand in a stable manner.

Alternatively, switching of the step may be performed according to gesture of the computer 1 main unit. Decision according to gesture is performed according to a measured value by an acceleration sensor, analysis of an imaged image, or the like. However, in order to decide timing when gesture is started, steady numerical computation processing is performed.

According to the above description with reference to FIG. 31, in the case that the image of the AR marker M1 has been framed out to the right side of the screen, the step number is incremented, but conversely, the step number may be decremented. In this case, for example, in the case that the image of the AR marker M1 has been frame out to the left side of the screen, the step number is incremented.

Alternatively, a decision trigger may be frame-in instead of frame-out. For example, in S301 in FIG. 30, at the time of an AR marker unrecognized up to the last time being recognized, a flag is turned on, and the step number is incremented or decremented according to the movement direction of the image of the AR marker in a state in which the flag is on.

Upon the event detection processing (S109) being performed by the event detecting unit 102, the control unit 10 controls the computing unit 13 and generating unit 14 to execute projection image generation processing (S110).

Figure 32:
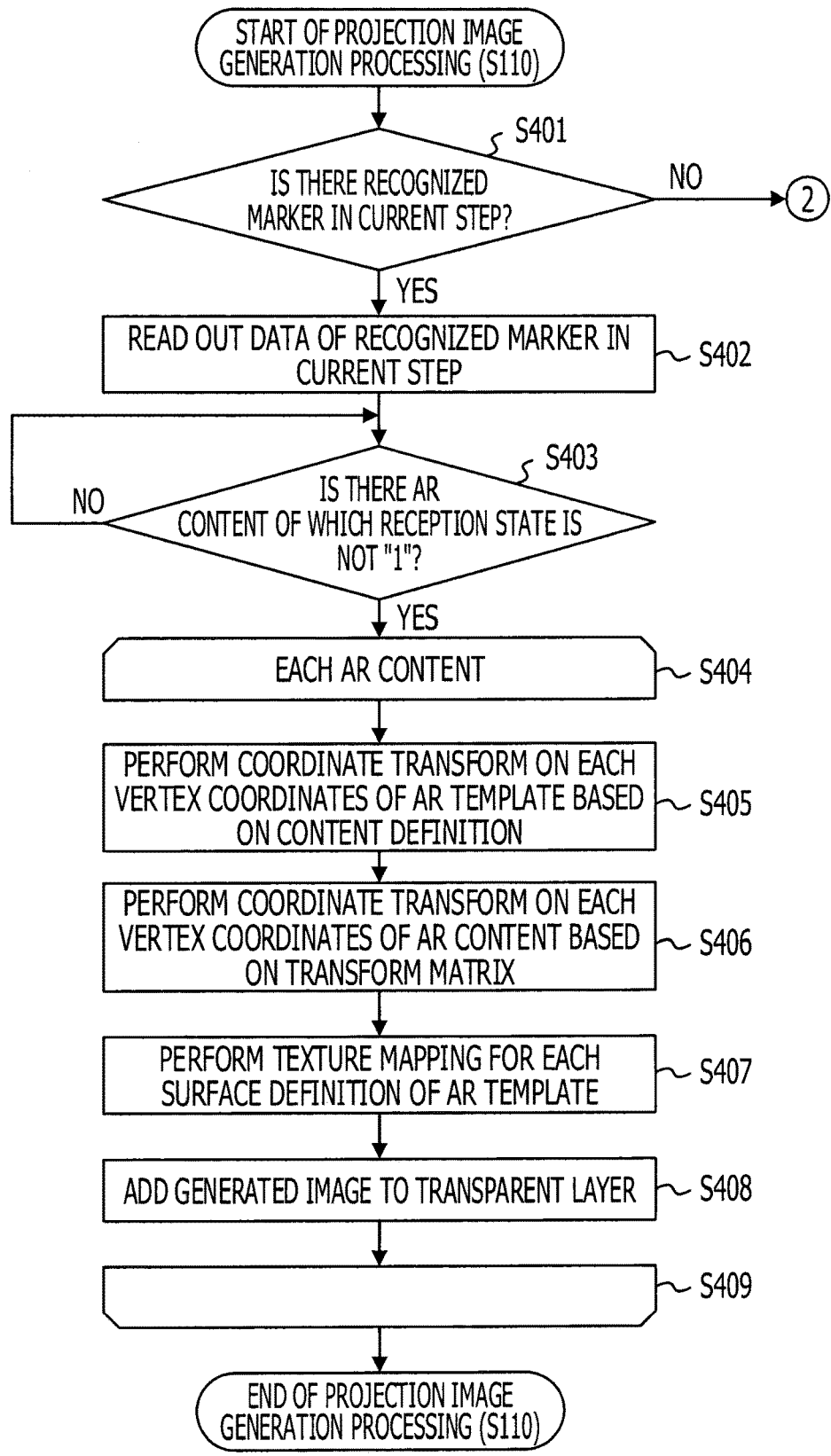
FIG. 32 illustrates a processing procedure example of projection image generation processing.

FIG. 32 illustrates a processing procedure example of projection image generation processing. The control unit 10 determines whether or not the AR marker to be recognized, defined in the step definition of the current step number indicated in the status information of a scenario exists in the recognized marker information (S401). When the AR marker to be recognized in the current step is not indicated in the recognized marker information this means that there is no AR content to be displayed in the current step. Therefore, in the case that the AR marker to be recognized is not indicated in the recognized marker information (NO in S401), the marker detection procedure in S107 is performed. At this time, the display control unit 103 may display guide information to the effect that the AR marker to be recognized differs, on the display unit 17.

In the case that there is the AR marker to be recognized in the current step (YES in S401), the control unit 10 reads out information of the AR marker to be recognized in the current step (marker definition, content definitions under the marker definition) (S402). The control unit 10 determines, of the AR contents corresponding to the content definitions read out in S402, whether or not there is an AR content of which the content data has not been received yet (S403). The control unit 10 confirms the received situation of the content regarding the current step number indicated in the status information of the scenario, with reference to the received status table T1, and performs the determination in S403. In the case that no AR content has been received (NO in S403), the control unit 10 stands by until the AR content is received, and performs the determination in S403 again. Alternatively, the marker detection procedure in S107 may be performed after the display control unit 103 controls the display unit 17 to display a message to the effect that the current state is a reception standby state.

In the case that the AR content to be displayed has been received (YES in S403), the control unit 10 performs processing in S405 to S407 regarding each AR content to be displayed (repetition by S404 and S408). The AR content to be displayed is an AR content defined in a content definition under the step definition of the current step.

Upon the AR content being selected in S404, the control unit 10 controls the computing unit 13 to perform coordinate transform on each vertex coordinates defined in the AR template indicated in the content definition of the selected AR content based on the content definition (S405). The computing unit 13 rotates each vertex coordinates based on the rotation coordinates (Pm, Qm, Rm) of the content definition, expands or reduces the rotated vertex coordinates according to the scale factor (Jx, Jy, Jz), and further translates the rotated vertex coordinates according to the position coordinates (Xm, Ym, Zm). The control unit 10 further controls the computing unit 13 to execute model-view transform and transparent transform on each vertex coordinates subjected to coordinate transform in S405 (S406). Each vertex coordinates of the AR content selected in S404 are expressed with the screen coordinate system by S405 and S406.

The control unit 10 controls the generating unit 14 to execute texture mapping for each surface definition defined in the AR template based on each vertex coordinates subjected to coordinate transform in S405 and S406 (S407). The generating unit 14 maps the image file (image specified by a texture ID) defined in the surface definition in a region where the coordinates in the screen coordinate system of each vertex defined in the surface definition are interpolated with a line.

Upon a surface image where the shape and position regarding each surface definition are specified being generated by the generating unit 14, the display control unit 103 disposes each surface image on a transparent image layer (S408). The transparent image layer is an image with a display screen size, and is transparent at the default setting. Therefore, an image on a layer existing on the back of the transparent image layer is displayed as is. The surface images disposed in S408 are displayed more front than the image on the back layer.

Upon processing in S405 to S408 being performed on each AR content to be displayed, the control unit 10 ends the projection image generation processing, and the display control unit 103 performs updating of the projection image (S111). The display control unit 103 controls the display unit 17 to display the transparent image layer where each surface image of each AR content is disposed in the processing in S110 on the front of the imaged image.

Thereafter, the control unit 10 determines whether to end the scenario (S112). The control unit 10 references the status information of the scenario, and in the case that the current step number is greater than the number of steps, determines to end the scenario. In the case that the current step number is equal to or smaller than the number of steps, the control unit 10 does not end the scenario. In the case that the scenario is not ended in S112 (NO in S112), the control unit 10 performs the marker detection processing in S107.

In the case of ending the scenario in S112, the display control unit 103 controls the display unit 17 to display a selection screen (S113). Choices of "END", "ANOTHER SCENARIO", and "ANOTHER MODE" are indicated on the selection screen displayed in S113. The control unit 10 determines which of the "END", "ANOTHER SCENARIO", and "ANOTHER MODE" the selected input received at the input unit 19 in a state in which the selection screen is displayed in S113 is (S114).

In the case that the selected input is "END" in S114 ("END" in S114), the control unit 10 ends the AR function. In the case that the selected input is "ANOTHER SCENARIO" in S114 ("ANOTHER SCENARIO" in S114), the display control unit 103 controls the display unit 17 to display the scenario selection screen in S104. Also, in the case that the selected input is "ANOTHER MODE" in S114 ("ANOTHER MODE" in S114), the display control unit 103 controls the display unit 17 to display the mode selection screen in S101.

[Another Method of Switching Event Detection]

A step switching event is detected in a frame-out direction of a marker in the event detection procedure in FIG. 30. Another procedure of step switching determination according to the mode of a recognized marker will be described.

For example, an indicator (index image) for step switching is displayed on the screen, and the step is switched in response to the image of a marker within the imaged image being superimposed on the indicator. The indicator is a figure with a square frame shape, for example.

Figure 33:
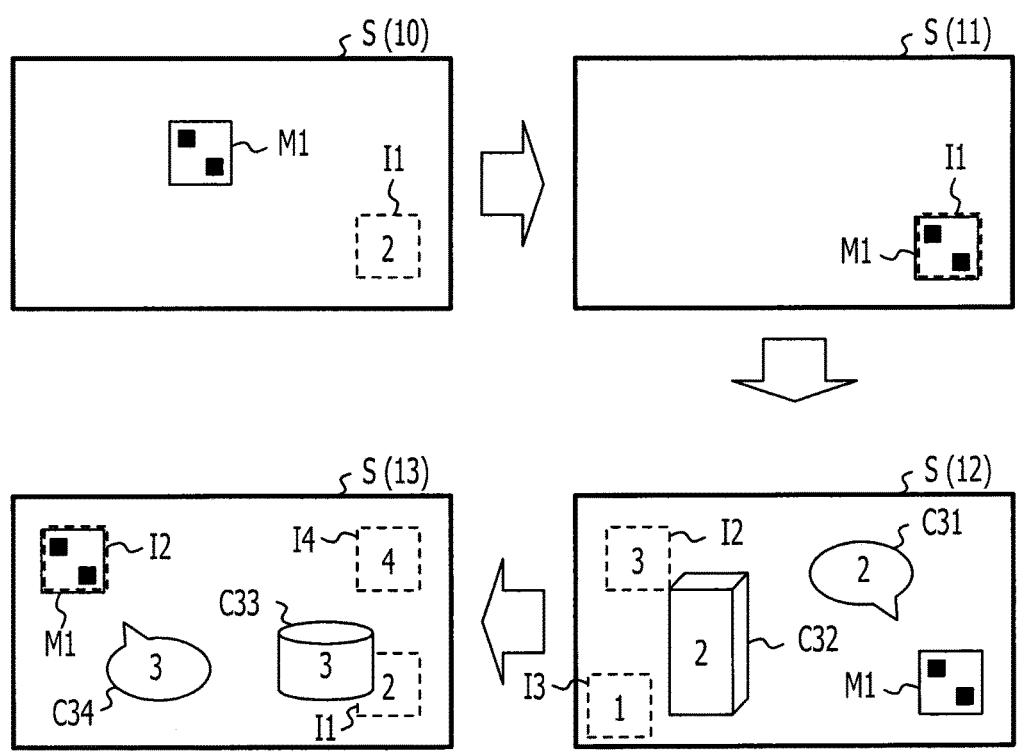
FIG. 33 illustrates an example of markers displayed on the screen.

FIG. 33 illustrates an example of markers to be displayed on the screen. The screen S(10) illustrated in FIG. 33 is an example of the screen in step 1 of a certain scenario. An indicator I1 is displayed on the screen S(10). The indicator I1 is a figure with a square frame shape, and indicates a number "2". Also, the image of the AR marker M1 is reflected in the screen S(10). The imaged image to be displayed is sequentially updated, and the marker recognition processing (S108) is performed on the updated imaged image.

The screen S(11) illustrates a screen in the case that the position within the screen of the AR marker M1 obtained by the marker recognition processing is superimposed on the display position of the indicator I1. At the time of the state of the screen S(11), switching from step 1 to step 2 is performed. Upon switching to step 2, display corresponding to step 2 is performed according to recognition of the AR marker 1.

A screen S(12) is an example of a screen where display corresponding to step 2 has been performed. The image of the AR marker 1, AR contents C31 and C32 to be displayed in step 2, and indicators I2 and I3 are displayed on the screen S(12). The indicators I2 and I3 are also figures with a square frame shape in the same way as with the indictor I1, and indicate numbers "3" and "1", respectively. Upon the image of the AR marker M1 being recognized in an intra-screen position of the indicator I2, advance of the step is performed (switching from step 2 to step 3), and upon the image of the AR marker M1 being recognized in an intra-screen position of the indicator I3, retreat of the step is performed (switching from step 2 to step 1).

Upon the image of the AR marker M1 being recognized in an intra-screen position of the indicator I2, a screen S(13) is displayed. The screen S(13) is an example of a screen where display corresponding to step 3 has been performed. AR contents C33 and C34 to be displayed in step 3, and indicators I4 and I1 are displayed on the screen S(13). The indicator I4 is the same figure with a square frame shape as with the indicator I1, and indicates a number "4". Upon the image of the AR marker M1 being recognized in an intra-screen position of the indicator I4, advance of the step is performed (switching from step 3 to step 4), and upon the image of the AR marker M1 being recognized in an intra-screen position of the indicator I1, retreat of the step is performed (switching from step 3 to step 2).

Figure 34:
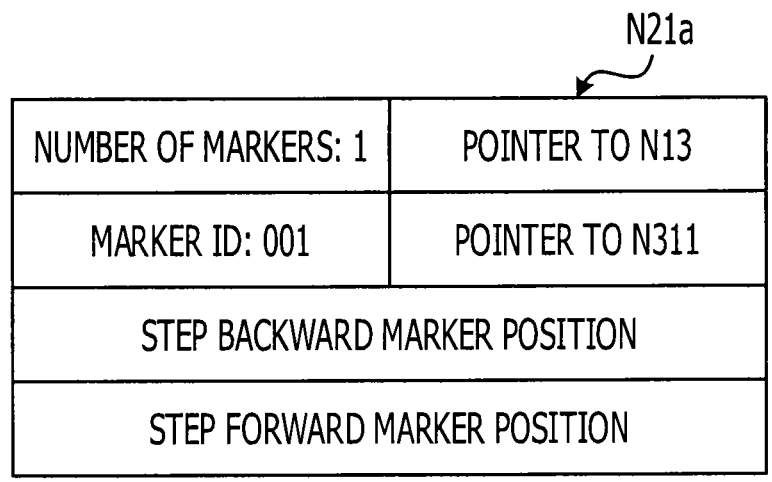
FIG. 34 illustrates a data structure example of step definitions.

FIG. 34 illustrates a data structure example of step definitions. The display position of an indicator is specified in each step in the case of step switching illustrated in FIG. 33. The display position of an indicator is defined in each step definition. A step definition N22 a corresponding to step 2 illustrated in FIG. 33 is configured of, in the same way as with the step definition N21, list of information (information units 1 to 4) with predetermined data length (for example, four bytes) as a unit.

The number of AR markers to be used for a reference of AR content display in step 2, and a pointer to a scenario definition are indicated in the information unit 1. The marker ID of an AR marker to be used for a reference of AR content display in step 2, and a pointer to a marker definition are indicated in the information unit 2. The display position (Xs, Ys) of an indicator to be used for decision to retreat the step from step 2 is indicated in the information unit 3. Also, the display position (Xs, Ys) of an indicator to be used for decision to advance the step from step 2 is indicated in the information unit 4. Upon the step being switched, an indicator is displayed according to the information units 3 and 4.

Figure 35:
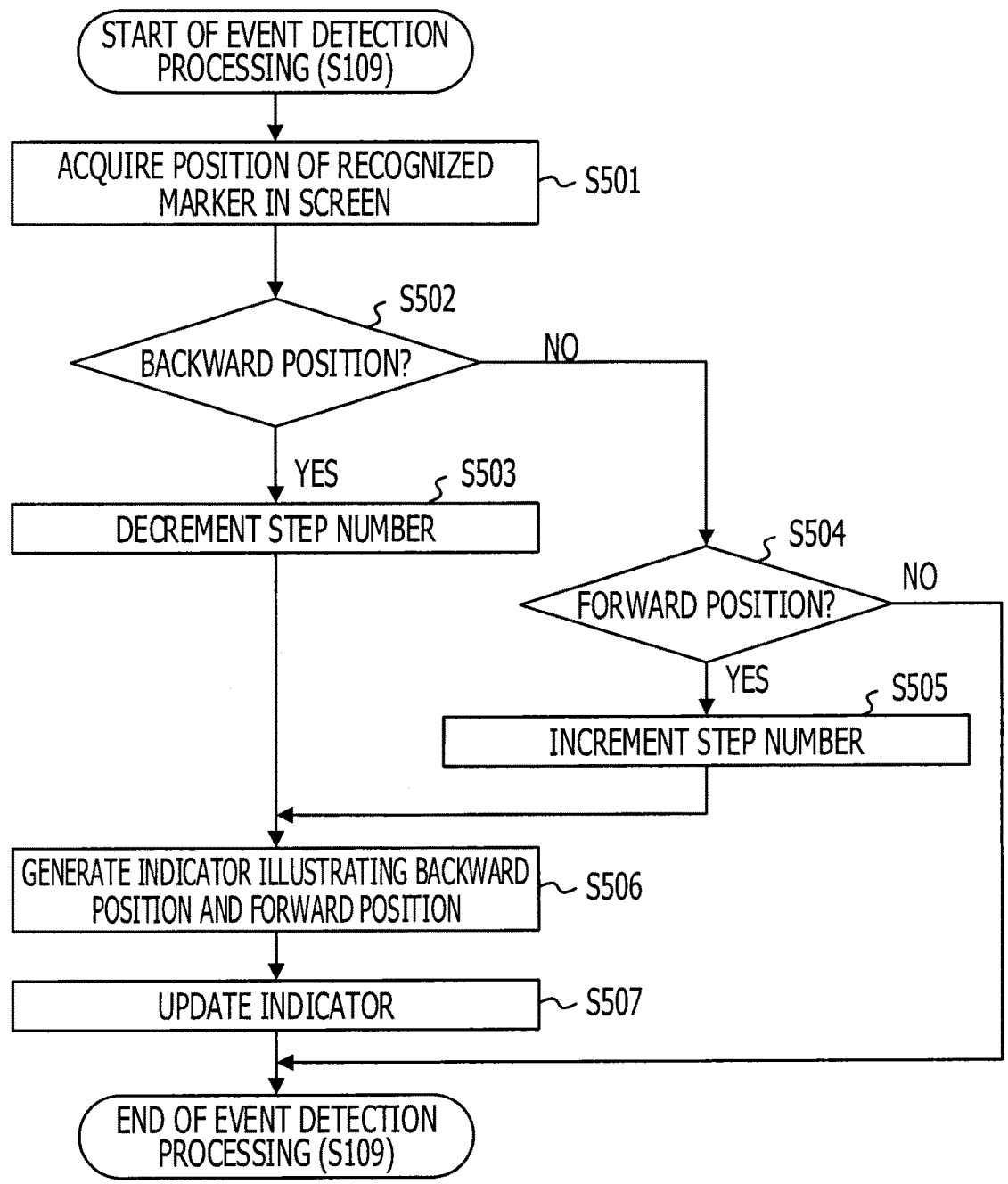
FIG. 35 illustrates an event detection processing procedure example.

FIG. 35 illustrates an event detection processing procedure example. In the case of the method for deciding step switching according to the display positions of an indicator and an AR marker, upon the event detection processing being started, the control unit 10 acquires the intra-screen position (Xs, Ys) of an AR marker recognized by the marker recognition processing (S501).

The control unit 10 references the step definition of the current step to determine whether or not the position of the AR marker acquired in S501 is a position for step retreat (S502). In the case determination is made that the position of the AR marker is a retreat position in the determination in S502 (YES in S502), the control unit 10 decrements the current step number of the status information D0 of the scenario (S503).

In the case determination is made that the position of the AR marker is not a retreat position in the determination in S502 (NO in S502), the control unit 10 references the step definition of the current step to determine whether or not the position of the AR marker acquired in S501 is a position for step advance (S504). In the case determination is made that the position of the AR marker is an advance position in the determination in S504 (YES in S504), the control unit 10 increments the current step number of the status information D0 of the scenario (S505).

Upon S503 or S505 being performed, the control unit 10 generates, based on the step definition of the current step number indicated in the status information D0, an indicator indicating a retreat position, and an indicator indicating an advance position (S506). Further, the display control unit 103 updates the indicator that the display unit 17 displays with the indicators generated in S506 (S507). In the case that S507 is performed, or in the case that the position of the AR marker is determined not to be an advance position (NO in S504), the control unit 10 ends the event detection processing.

In the case of an example of another event detection method, switching of the step is performed according to the rotation angle of the image of an AR marker to be displayed on the screen.

Figure 36:
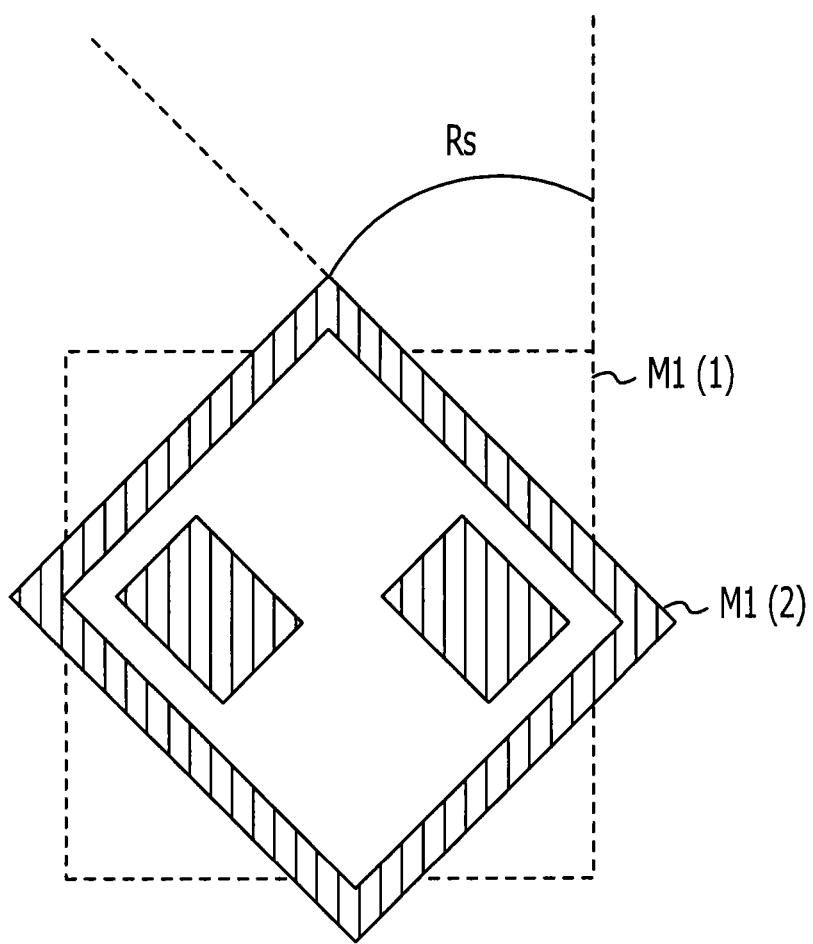
FIG. 36 illustrates an example of markers displayed on the screen.

FIG. 36 illustrates an example of markers to be displayed on the screen. Upon the AR marker M1 displayed in a square position indicated in M1 (1) being displayed in a square position indicated in M1 (2) at another timing, the AR marker M1 is recognized in a state rotated by an angle Rs. In the case that the rotation angle is greater than a predetermined value, determination of step switching according to the rotation direction may be made. Incidentally, rotation of an AR marker is also performed by the user rotating the camera as to a fixed AR marker.

Figure 37:
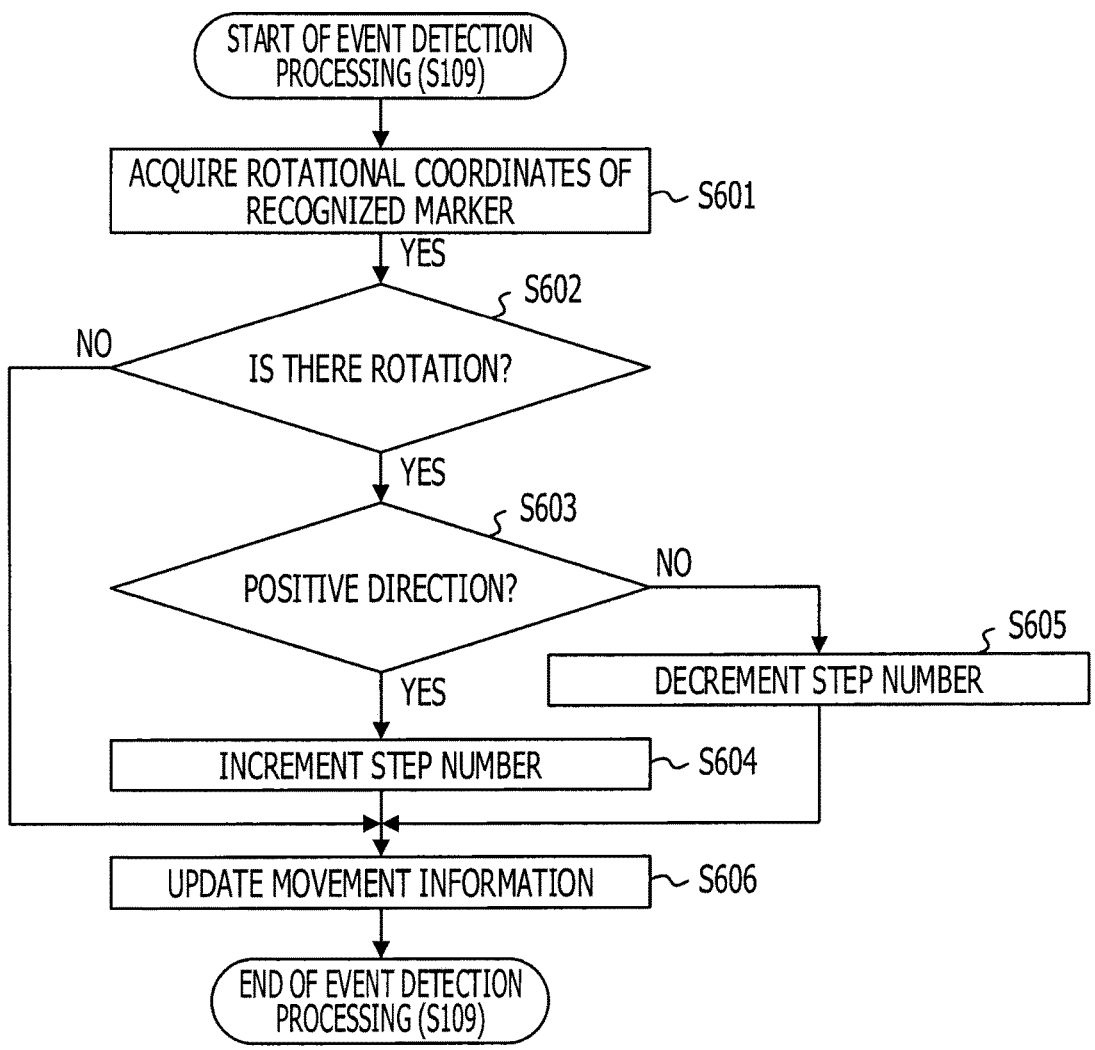
FIG. 37 illustrates an event detection processing procedure example.

FIG. 37 illustrates an event detection processing procedure. Upon the event detection processing being started, the control unit 10 acquires information of rotation coordinates from the marker movement information D1 of the recognized AR marker (S601). Next, the control unit 10 determines whether or not rotation has occurred on the recognized AR marker (S602). The determination in S602 is performed depending on whether or not the rotation angle Rs is equal to or greater than a predetermined value. A rotation angle R1c is calculated by the marker recognition processing, and accordingly, difference between the maximum value and minimum value of the rotation angle (R1c) included in the marker movement information may be employed instead of the rotation angle Rs, for example.

In the case that determination is made in S602 that rotation has occurred (YES in S602), the control unit 10 determines whether or not the direction of the rotation is a positive direction (S603). The direction of the rotation may be determined based on which of the maximum value and minimum value of the rotation angle (R1c) included in the marker movement information is a result of the former marker recognition processing. In the case that the minimum value is the previously recognized processing result, the AR marker has rotated in a direction where the rotation angle is increased, and accordingly, this rotation is determined to be rotation in the positive direction.

In the case that the rotation has been determined to be rotation in the positive direction in S603 (YES in S603), the control unit 10 increments the current step number of the status information D0 (S604). On the other hand, in the case that the rotation has been determined not to be rotation in the positive direction in S603 (NO in S603), the control unit 10 decrements the current step number of the status information D0 (S605).

In the case that the processing in S604 or S605 has been performed, or in the case that determination is made in S602 that no rotation has occurred (NO in S602), the control unit 10 updates the marker movement information based on the result of the marker recognition processing in S108 (S606). Upon S606 being performed, the event detection processing is ended.

The exemplary methods have been described regarding detection of an step switching event, but a step switching event may be detected by other methods. Also, any of the above three detection methods may be modified and implemented as appropriate. For example, the method for detecting a switching event in response to frame-out of a marker may perform event detection based on frame-in of a marker. Further, in the case of the above example, a step advance event may be detected when frame-out of a marker is performed at the right end of the screen, and a step retreat event may be detected when frame-out of a marker is performed at the left end of the screen, but the directions may be reversed. Further, determination may be made based on frame-out or frame-in at the upper end of the screen, or may be made based on frame-out or frame-in at the lower end of the screen.

Also, in the case of the event detection example according to the rotation of a marker, a step advance event has been detected using the rotation in the positive direction, but conversely, a step retreat event may be detected using the rotation in the positive direction. In this case, for example, a step advance event is detected using the rotation in the negative direction.

[Occurrence of Exception Scenario]

One scenario is selectively provided from multiple scenarios in the present embodiment, but a scenario may be changed to another scenario in the middle of progress. For example, an arrangement may be made in which a transition destination scenario and transition conditions are correlated beforehand, and upon the transition conditions being satisfied in the middle of progress of a scenario, the transition destination scenario is started.

Figure 38:
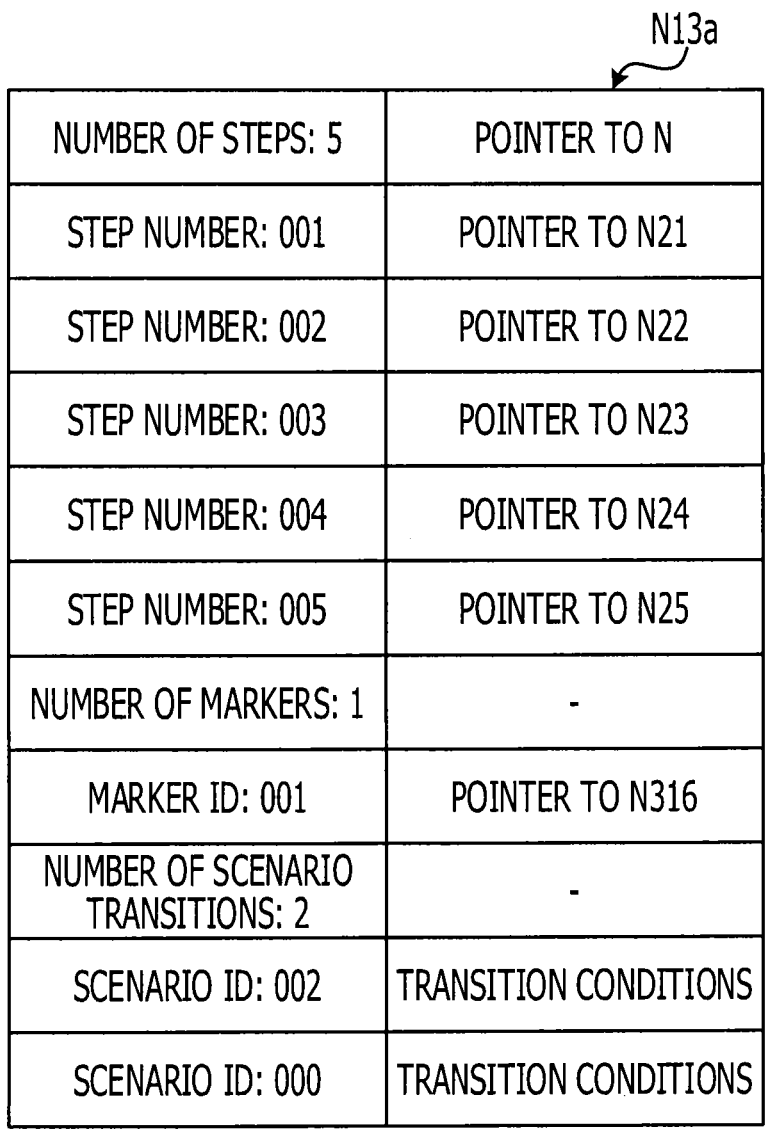
FIG. 38 illustrates a data structure example of scenario definitions.

FIG. 38 illustrates a data structure example of scenario definitions. The scenario definition N13 *a* illustrated in FIG. 38 includes a first information unit, a second information unit group, a third information unit, a fourth information unit (group), a fifth information unit, and a sixth information unit group.

The first information unit indicates the number of steps included in the scenario (the number of second information units), and a pointer to the root definition. The second information unit group is data following the first information unit. Each of the second information units indicates the step number of each step, and a pointer to the step definition. The third information unit is data following the second information unit group, and indicates the number of marker definitions under the scenario (the number of the fourth information units). The fourth information unit is data following the third information unit, and indicates the marker ID of a marker definition under the scenario, and a point to the marker definition. The fifth information unit is data following the fourth information unit, and indicates the number of scenario transition definitions (the number of the sixth information units). The sixth information unit is data following the fifth information unit, and indicates the scenario ID of a transition destination scenario, and transition conditions.

Detection of the transition conditions being satisfied is performed in any stage from S107 to S112 in FIG. 17. For example, when determination is made in S112 whether or not the scenario is ended, this determination may be made depending on whether or not particular input for satisfying the transition conditions has been input from the user, or depending on whether or not parameters within the computer 1 (remaining battery capacity and so forth) satisfy the transition conditions.

In the case that the transition conditions are satisfied, the control unit 10 changes the scenario ID of the status information D0 to the scenario ID of the transition destination scenario, and executes the procedure in S106 in FIG. 17. The AR content of the transition scenario is acquired by the processing in S106.

[AR Content Edit Processing Procedure]

In the case that the AR display mode has not been selected in S102 in FIG. 17 (NO in S102), the AR edit mode is called up. Editing of AR contents is performed for each scenario in the present embodiment.

Figure 39:
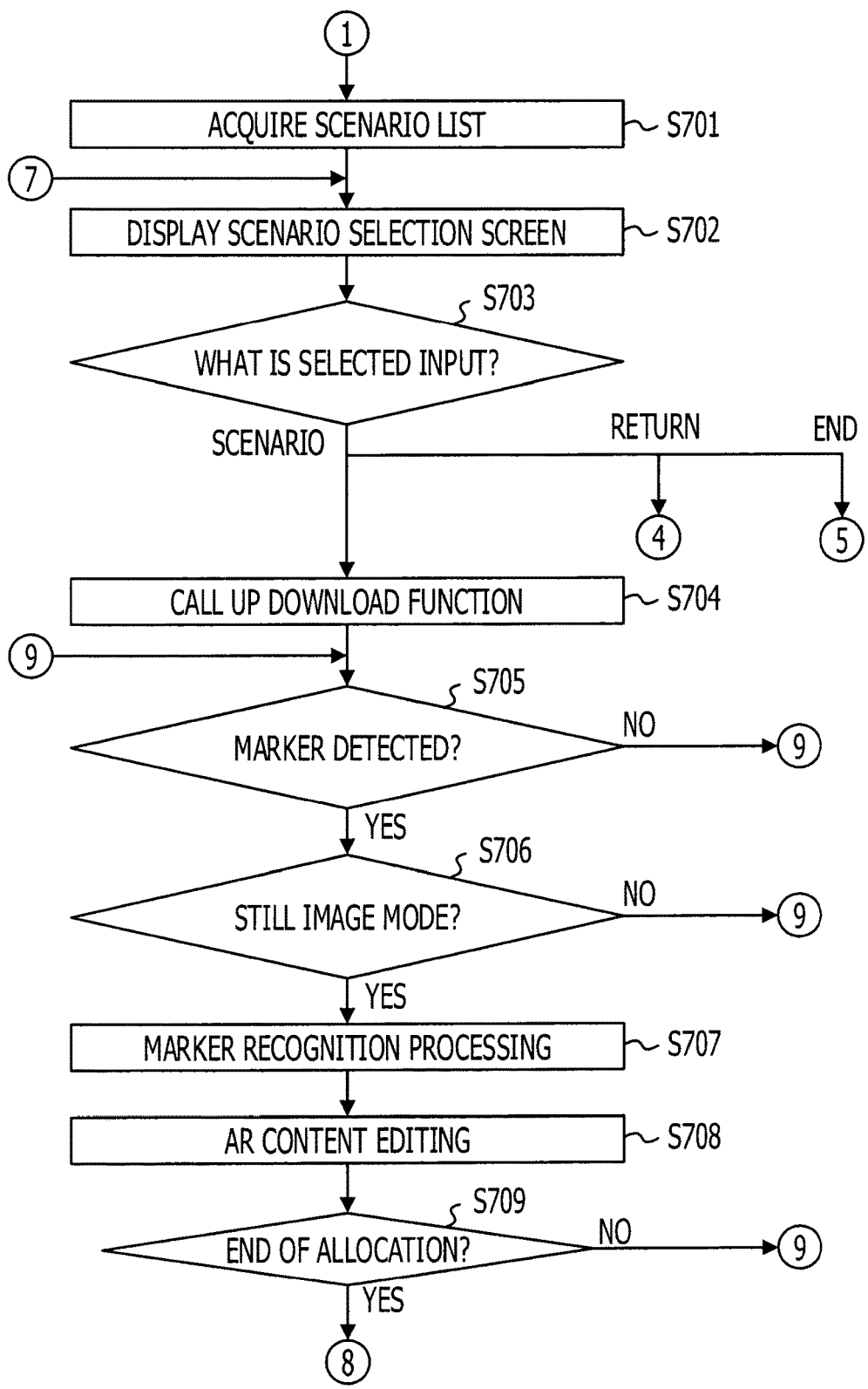
FIG. 39 illustrates a processing procedure example of an edit mode.
Figure 40:
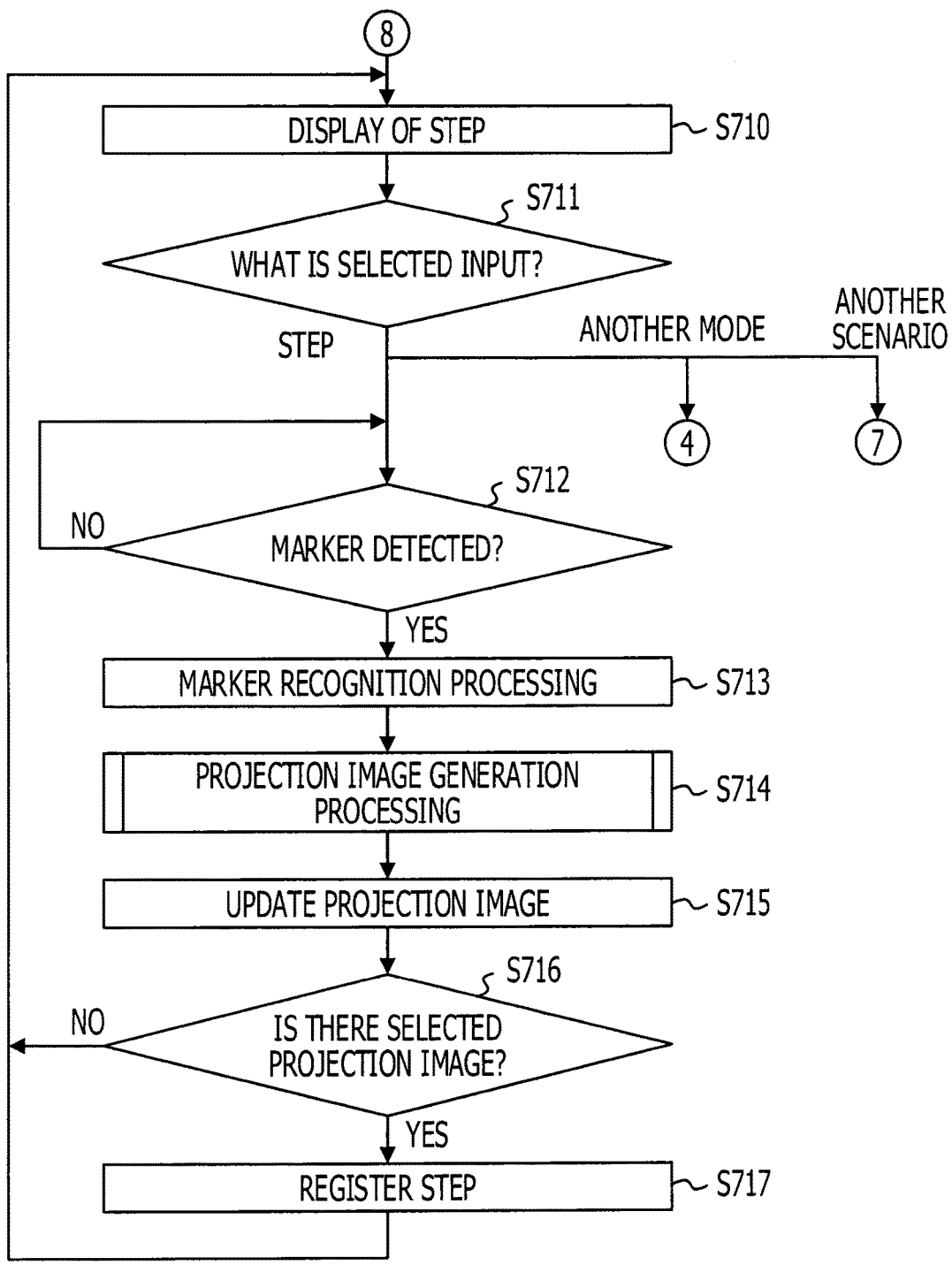
FIG. 40 illustrates a processing procedure example of the edit mode.

FIG. 39 and FIG. 40 illustrate an edit mode processing procedure example. Upon the AR edit mode being called up, the control unit 10 controls the acquisition unit 11 to acquire a scenario list (S701). The acquisition unit 11 acquires the scenario list generated according to the root definition N at the computer 2, via the communication unit 18. The display control unit 103 generates the scenario selection screen S(7) illustrated in FIG. 19 based on the acquired scenario list, and controls the display unit 17 to display the generated scenario selection screen S(7) (S702).

Upon the input unit 19 detecting an input operation in a state in which the scenario selection screen S(7) is displayed, the input unit 19 transmits the input of the user in the scenario selection screen S(7) to the control unit 10, and the control unit 10 determines the selection contents by the user's input (S703).

Upon the button B3 where "return" to the effect that display returns to the mode selection screen S(5), is displayed being selected in S703 ("return" in S703), the processing in S101 in FIG. 17 is performed again. Also, upon the button B4 where "end" to the effect that the AR function is ended, is displayed being selected in S703 ("end" in S703), the AR function is ended. Also, upon one of the scenarios indicated in the button group B6 being selected in S703 ("scenario" in S703), the control unit 10 controls the acquisition unit 11 to start download processing of the AR content group provided by the scenario selected in S703 (S704). In S704, the acquisition unit 11 performs the processing in FIG. 21 to download the AR content group of the selected scenario. In the case that "scenario" in S703 to the effect that a new scenario is created has been selected, a new scenario ID is downloaded.

After controlling the acquisition unit 11 to start download processing in S704, the control unit 10 controls the recognition unit 12 to determine whether or not an AR marker has been detected (S705). In the case that no AR marker has been detected by the recognition unit 12 (NO in S705), the control unit 10 executes the processing in S705 again after elapse of a predetermined amount of time. In the case that an AR marker has been detected (YES in S705), the control unit 10 determines whether or not user input for switching to a still image mode has been transmitted from the input unit 19 (S706). In the case that switching input to the still image mode has not been performed (NO in S706), the control unit 10 executes the processing in S705 again after elapse of a predetermined amount of time.

Upon input to the still image mode being detected (YES in S706), the display control unit 103 switches the screen display of the display unit 17 to the still image mode, and the control unit 10 controls the recognition unit 12 to execute marker recognition processing regarding a still image displayed on the display unit 17 (S707). The marker recognition processing in S707 is processing similar to that in S108. Upon the marker recognition processing by the recognition unit 12 being performed, the control unit 10 performs AR content editing with the recognized AR marker as a reference (S708).

The AR content editing is performed by selection of an AR template, and displacement of the AR template. Selection of an AR template is performed by an AR template being selected from the edit pallet displayed on the display unit 17. Displacement of the AR template is performed by specifications of the display position, size, and direction of the selected AR template, and input of text. Selection of an AR template and editing of the AR template are performed in response to input to the display screen in the edit mode.

Figure 41:
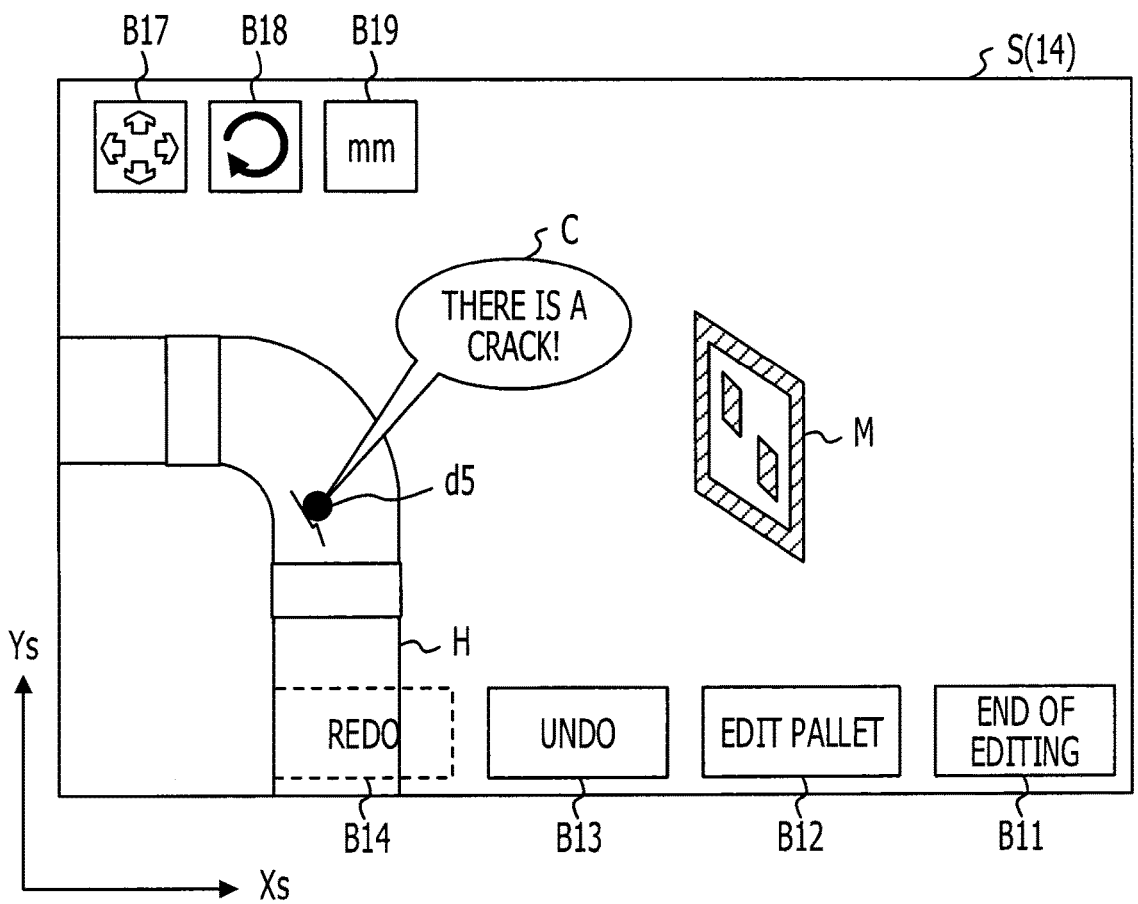
FIG. 41 illustrates a display screen example in the edit mode.

FIG. 41 illustrates a display screen example in the edit mode. The imaged image imaged by the imaging unit 16, and further menu groups B11 to B14, and B17 to B19 are displayed on a display screen S(14). The menu groups B11 to B14 include an end-of-editing button B11, an edit pallet button B12, an undo button B13, and a redo button 14. The imaged image on the screen S(14) includes the images of a marker M and an object H. Also, the projection image of an AR object C is further displayer on the screen S(14). The menu groups B17 to B19 include an expansion/reduction movement mode button B17, a rotation mode button B18, and a numeric value specification mode button B19.

The end-of-editing button B11 is a display element indicating the input position of an operation instruction to confirm editing of the AR object C. The edit pallet button B12 is a display element indicating the input position of an operation instruction to call up an edit pallet so an AR template will be selectable. The undo button B13 is a display element indicating the input position of an operation instruction to return to a state immediately before operation. The redo button B14 is displayed in the case that an operation to the undo button B13 has been performed, and is a display element indicating the input position of an operation instruction to execute the cancelled operation again.

The expansion/reduction movement mode button B17 is a display element indicating the input position of an operation instruction to specify an operation mode. Upon input to the display position of the expansion/reduction movement mode button B17 being performed, the operation mode is switched to an expansion/reduction movement mode. The rotation mode button B18 is a display element indicating the input position of an operation instruction to specify the operation mode. Upon input to the display position of the rotation mode button B18 being performed, the operation mode is switched to a rotation mode. The numeric value specification mode button B19 is a display element indicating the input position of an operation instruction to specify the operation mode. Upon input to the display position of the numeric value specification mode button B19 being performed, the operation mode is switched to a numeric value specification mode.

The position coordinates and scale factor of the AR content C are adjusted according to an input operation in the expansion/reduction movement mode. For example, the expansion/reduction movement mode is automatically set as the operation mode at the time of starting displacement of the AR content C. For example, position coordinates are specified according to a position within the screen where an operation such as tap, double tap, or the like has been performed, and the position of the AR content C is adjusted by a drag operation. Also, the scale factor of the AR content C is adjusted according to an operation such as pinch-out or pinch-in. The rotation coordinates of the AR content C are adjusted according to an input operation in the rotation mode. For example, the rotation coordinates are adjusted according to a flick operation or the like. A numeric value input screen is displayed in the numeric value specification mode. For example, the position of a reference point, rotation coordinates, and scale factor of the AR content C are set by an input numeric value as to the numeric value input screen.

For example, each time position specification is performed, display of the projection image of an AR content disposed in the specified position is performed, in the AR content editing in S708.

Upon position specification being performed by the user's input to the screen S(14), inverse transform of the above-described transparent transform is performed on the specified position coordinates within the screen. The position coordinates in the camera coordinate system on which the inverse transform of transparent transform has been performed is subjected to further the inverse transform of the model-view transform based on the recognized AR marker, whereby the position coordinates in the marker coordinate system is obtained.

Upon the position coordinates in the marker coordinate system being obtained, the AR content disposed in the specified position is displayed by the processing in S110 and S111 in FIG. 18. For example, upon specification of a position being performed before input to the end-of-edit button B11 is performed, again the inverse transform of the position coordinates, and generation and display processing of a projection image are performed.

Figure 42:
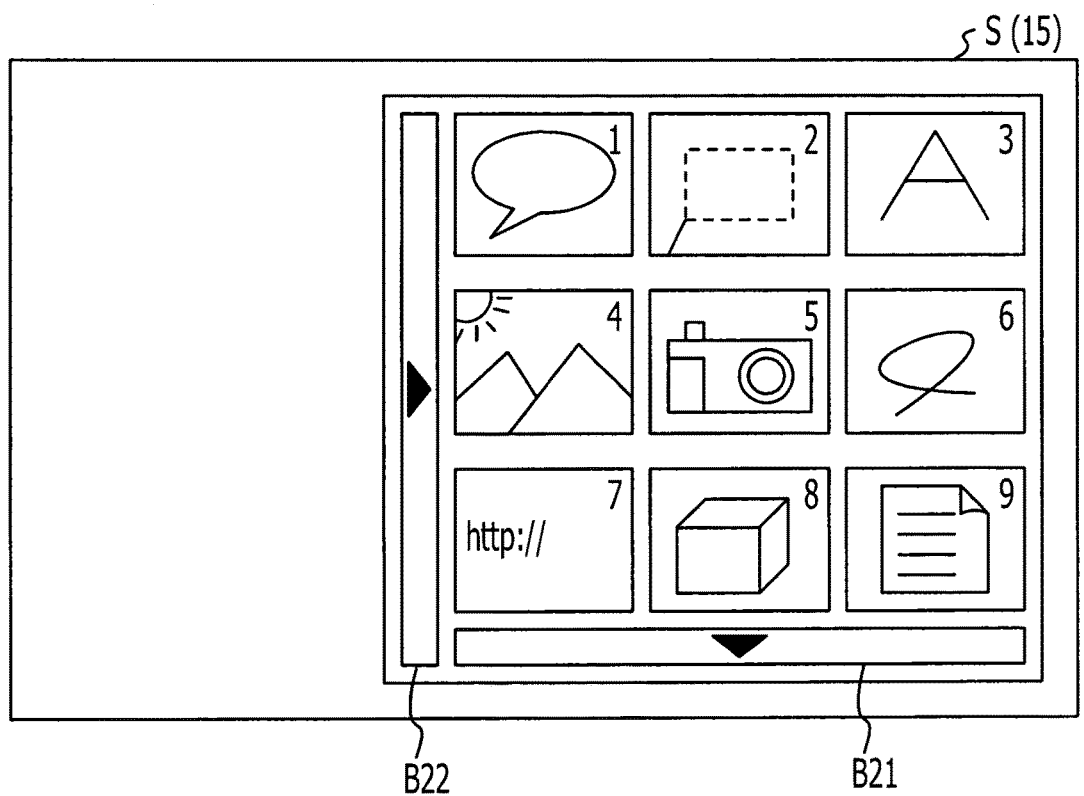
FIG. 42 illustrates an edit pallet example.

FIG. 42 illustrates an example of edit pallets. An edit pallet is displayed in the AR template selection in S708 illustrated in FIG. 39. The display screen S(15) exemplified in FIG. 42 is a display screen in a state in which the edit pallet is called up. A button group (buttons 1 to 9) whereby the type of an AR template is selectable is displayed on the edit pallet exemplified in FIG. 42. In the following description of an AR template menu, description will be made by identifying the button based on the number indicated in a button region. For example, a square button indicated with a number of "1" is "button 1". Also, the edit pallet also includes, for example, a selectable button group other than the button group illustrated in FIG. 42, and includes a scroll button B21 which allows the user to perform a scroll operation for displaying these button groups. Also, the edit pallet includes a close button B22 for ending the AR template selection.

Each of the buttons 1 to 9 corresponds to an individual template ID. Upon input being performed to one of the buttons, the template ID corresponding to the button thereof is selected, and the AR template of the selected template ID is called up.

A speech balloon type AR template is correlated with the button 1. Text information is added to the inside of the speech-balloon shaped figure at the speech balloon type AR template. A drawer box type AR template is correlated with the button 2. The drawer box type AR template includes a lead line and a square figure connected to the tip of the lead line. Text information is added to the inside of the square figure. A text box type AR template is correlated with the button 3. Text information is added to the square-shaped figure at the text box type AR template. A photo type AR template is correlated with the button 4. Image data is mapped in the square frame shaped figure at the photo type AR template. As this image data, an image file stored in the storage unit 15 is employed. An imaged type AR template is correlated with the button 5. The imaged type AR template is also an AR template similar to the photo type AR template, but has a different acquisition destination for image data. Upon the imaged type AR template being used, an imaging mode is called up, and imaging processing by the imaging unit 16 is performed. Upon the imaged type AR template being used, image data imaged by the imaging processing is mapped in the square frame shaped figure. Image data to be mapped by the photo type or imaged type may be a still image or moving image. The button 6 is a handwriting type AR template. The handwriting type AR template is a square transparent figure object of which the figure pattern is edited by a handwriting operation. The button 7 is a link type AR template, and is a template similar to the text box type AR template. Upon the link type AR template being selected, a web page list is displayed, access information to the web page selected from the list is added to the AR template. The web page list is acquired from a book mark or access history of a web browser. The button 8 is correlated with a figure type AR template. A three-dimensional solid model figure is defined in the figure type AR template. For example, screen display for selecting a solid model figure shape may be performed in response to input to the button 8. Examples of the solid model figure shape include a cube, rectangular parallelepiped, cylinder, sphere, cone, and triangular prism. Also, call-up of CAD data may be performed in response to input to the button 8. As the CAD data, the file of CAD data stored in the storage unit 15 is selected. The button 9 is correlated with a file type AR template. The file type AR template is a square figure where an icon image indicating a file is mapped. Upon the file type AR template being selected, the user is prompted to select a file within the storage unit 15, and a link to the selected file is added to the AR template.

Upon AR templates being sequentially selected from the edit pallet, and positions within the screen being specified by S708, whereby editing of multiple AR contents is performed. Upon a position within the screen being specified, the computing unit 13 performs the inverse transform of transparent transform, and the inverse transform of model-view transform on the specified position within the screen (screen coordinate system), and calculates the position coordinates in the marker coordinate system. The calculated position coordinates are set as a reference point of an AR content. According to the AR content editing in S708, an AR content is added. Upon input to the end-of-edit button B11 being performed, the processing in S708 is ended.

Upon S708 being ended, the display control unit 103 deactivates the still image mode, and the control unit 10 determines whether or not displacement of AR contents is ended (S709). S709 is determined in response to whether or not input to the end-of-edit button B11 has been performed again, for example. In the case of other end of displacement (NO in S709), the marker detection processing in S705 is executed again. Thus, AR content editing regarding multiple markers may be performed.

In the case of end of displacement in S709 (YES in S709), the control unit 10 performs setting processing of steps included in the scenario. For example, as illustrated in FIG. 12, the control unit 10 displays information of each step included in the scenario, and performs insertion, addition, deletion, or the like of a step in response to the user's input. In the case of new scenario creation, information of steps are not displayed at the beginning, so display of information of a step is performed in response to step addition input by the user.

Upon setting of a step being performed, the display control unit 103 controls the display unit 17 to display a step selection screen (S710). The step group set in S709, a button indicating transition to the mode selection screen S(5), and a button indicating transition to the scenario selection screen S(7) are indicated in the step selection screen. In a state in which the step selection screen is displayed, the control unit 10 determines which of selection of a step, the button indicating transition to the mode selection screen S(5), and the button indicating transition to the scenario selection screen S(7) the user's input transmitted from the input unit 19 is (S711).

Upon input to the button indicating transition to the mode selection screen S(5) being performed ("another mode" in S711), the display control unit 103 performs the processing in S101 to display the mode selection screen S(5). Upon input to the button indicating transition to the scenario selection screen S(7) being performed ("another scenario" in S711), the display control unit 103 performs the processing in S702 to display the scenario selection screen S(7).

Upon a step being specified on the step selection screen ("step" in S711), marker detection processing is performed (S712). The marker detection processing in S712 is processing similar to the processing in S705. In the case that no AR marker has been detected by the recognition unit 12 in S712 (NO in S712), the processing in S712 is executed again after elapse of a predetermined amount of time. In the case that an AR marker has been detected by the recognition unit 12 in S712 (YES in S712), the control unit 10 controls the recognition unit 12 to execute marker recognition processing (S713). The marker recognition processing in S713 is processing similar to the processing in S707.

The control unit 10 executes projection image generation processing based on the result of the marker recognition processing in S713 (S714). The projection image generation processing in S714 is processing similar to the processing in S110. The display control unit 103 controls the display unit 17 to display the projection image generated in S714 (S715).

Further, in a state in which the projection image is displayed on the screen by the processing in S714, the control unit 10 determines whether or not a projection image has been selected by input to the screen (S716). Upon a projection image being selected (YES in S716), the setting management unit 104 registers the AR content corresponding to the projection image selected in S716 in a manner correlated with the step selected in S711 (S717).

In the case that S717 has been executed, or in the case that a projection image has not been selected in S716 (NO in S716), the processing in S710 is performed again.

Further, description will be made regarding a method for the selection of a step in S711, and the selection of a projection image in S715.

Figure 43:
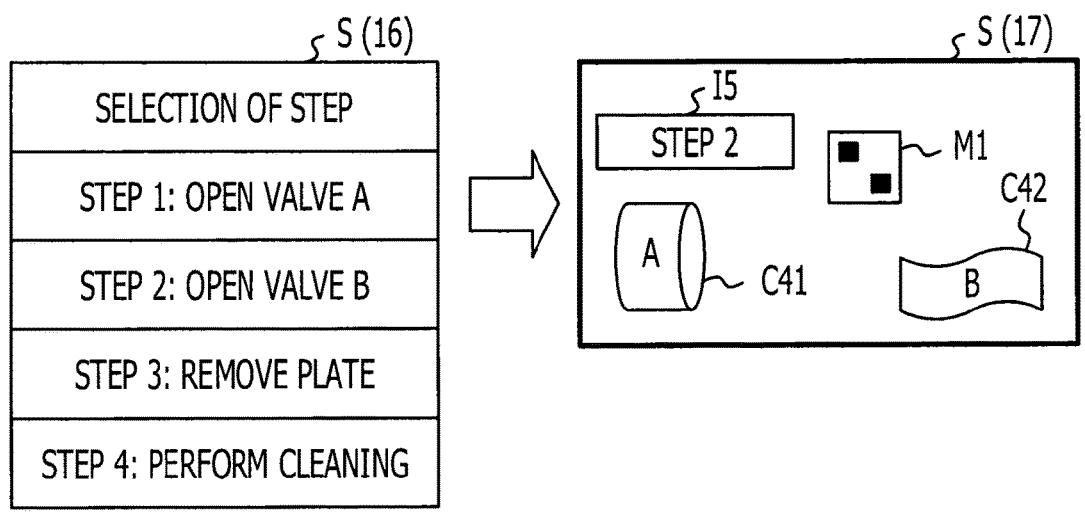
FIG. 43 illustrates a step selection example.

FIG. 43 illustrates an example of step selection. For example, in S711, the display control unit 103 displays a screen S(16) to make the user choose a step. Information regarding the steps are listed on the screen S16). Upon "step 2" being selected, the display control unit 103 displays a screen S(17) in S715, for example. The image of the recognized AR marker M1, projection images C41 and C42 of the AR contents disposed in S708, and the step number I5 selected on the screen S(16) are displayed on the screen S(17). Upon a projection image within the screen S(17) being selected, the AR content corresponding to the selected projection image is correlated with the step number 2.

Figure 44:
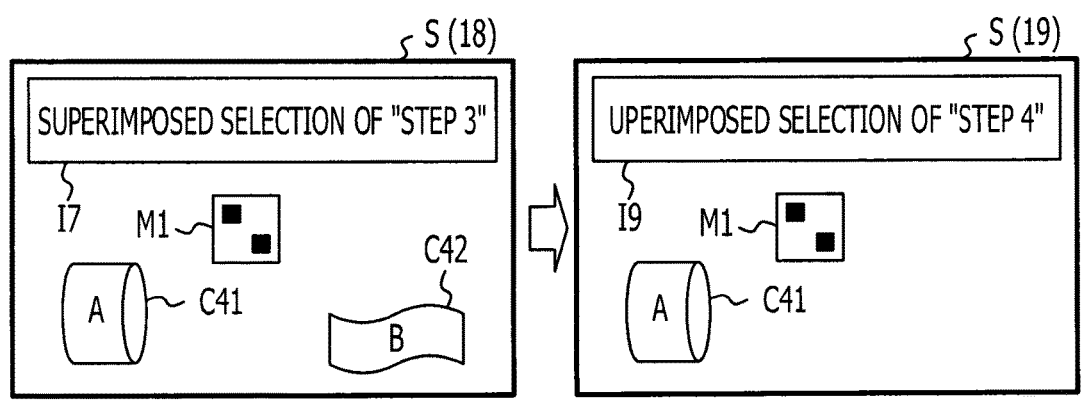
FIG. 44 illustrates a step selection example.

FIG. 44 illustrates an example of step selection. For example, in S710 and S711, the step number is automatically selected. Specifically, the step number to be selected is sequentially incremented from 1 each time a step is selected. A screen S(18) in the projection image selection in S716 includes a display I7 of the automatically selected step number. Also, the image of the recognized AR marker M1, the projection images C41 and C42 of the AR contents disposed in S708 are indicated on the screen S(18). For example, upon the projection image C42 being selected, the AR content corresponding to the selected projection image C42 is correlated with a step number 3.

A screen S(19) in the projection image selection in S716 after the step number is automatically selected again includes a display I9 of the automatically selected step number. The step number indicated in the display I9 is a number incremented from the step number indicated in the display I7. Also, the image of the recognized AR marker M1, and the projection image C41 of the AR content disposed in S708 are indicated in the screen S(19). The projection image C42 of the AR content is previously correlated with the step number 3, and accordingly does not have to be displayed on the screen S(19).

Figure 45:
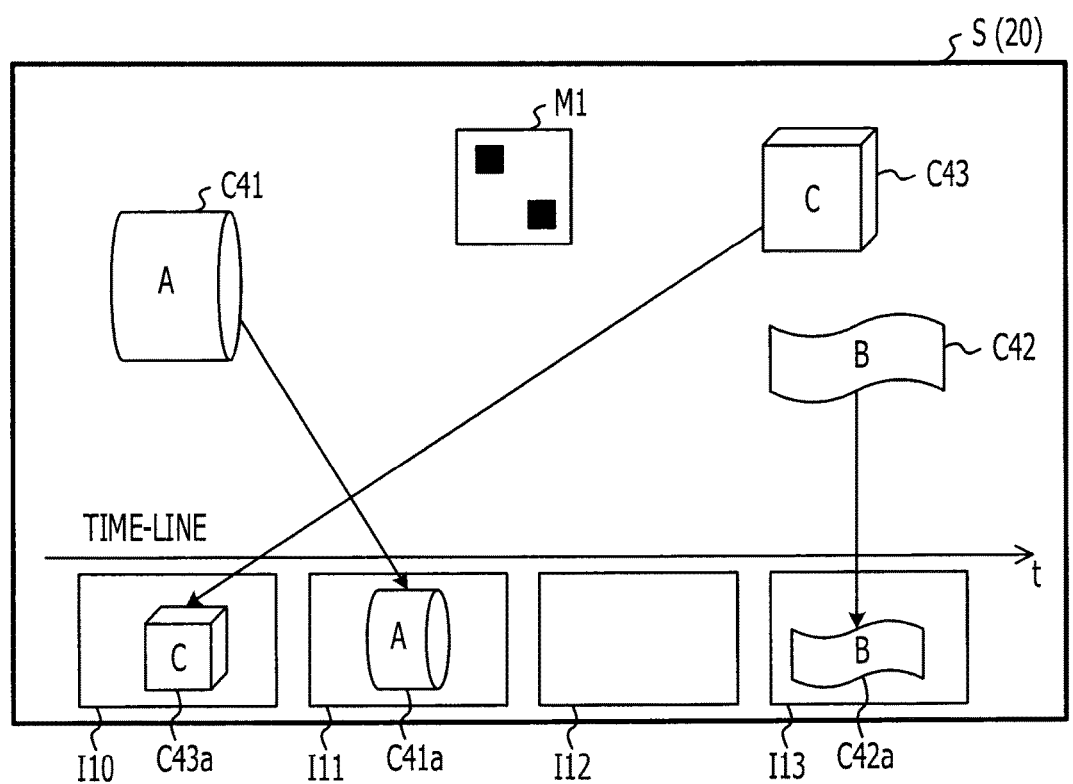
FIG. 45 illustrates a step selection example.

FIG. 45 illustrates an example of step selection. For example, there may be employed a screen S(20) including both of display of a projection image, and display of a timeline. The image of the recognized AR marker M1, the projection images C41, C42, and C43 of the AR contents disposed in S708, the steps corresponding to time zones I10 to I13 are displayed on the screen S(20). The time zones I10 to I13 are the time zone I10 corresponding to the step number 1, the time zone I11 corresponding to the step number 2, the time zone I12 corresponding to the step number 3, and the time zone I13 corresponding to the step number 4.

For example, in the case that a projection image has been dragged and dropped to a time zone, control is performed such as correlating the AR content corresponding to the projection image with the step number corresponding to the time zone, and so forth. In the case of the example of the screen S(20), the projection image C41 is dragged and dropped to the time zone I11, the projection image C42 is dragged and dropped to the time zone I13, and the projection image C43 is dragged and dropped to the time zone I10.

For example, an arrangement may be made in which upon dragged and dropped, a projection image is displayed on a time zone. The display mode of a projection image to be displayed on a time zone may be changed. For example, the projection image C41 is displayed by its display mode being changed to an image C41 a at the time zone I11. The projection image C42 is displayed by its display mode being changed to an image C42a at the time zone I13. The projection image C43 is displayed by its display mode being changed to an image C43 a at the time zone I10.

Figure 46:
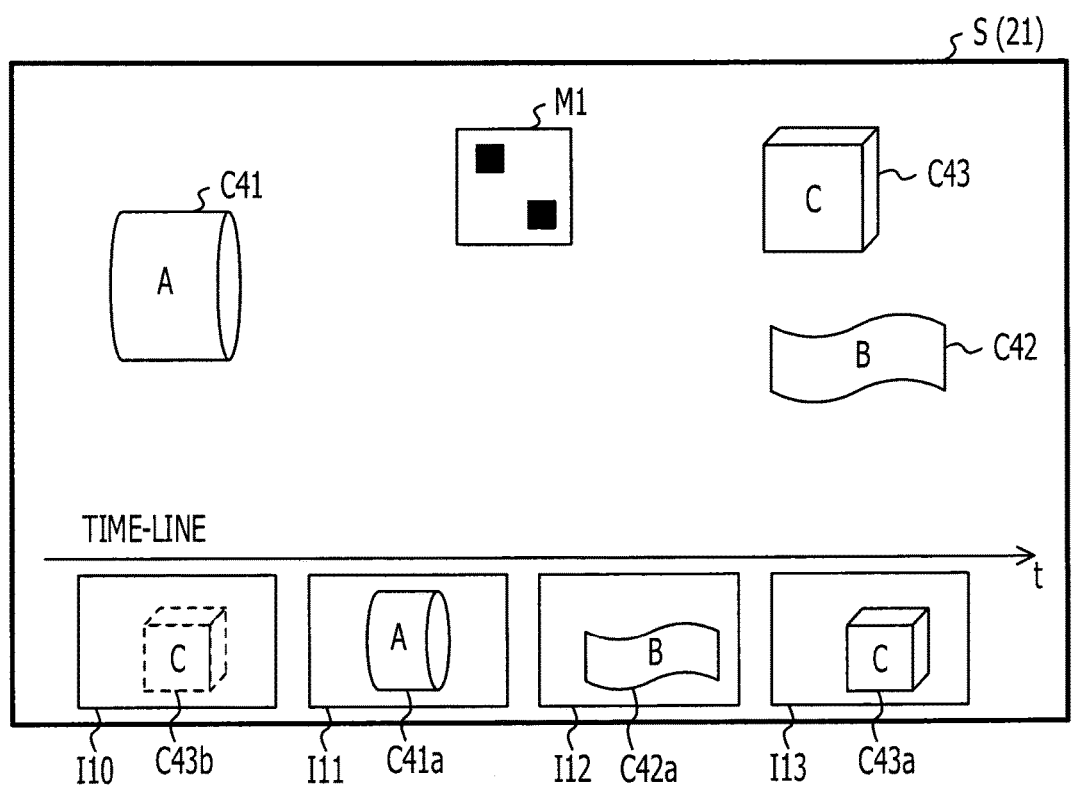
FIG. 46 illustrates a step selection example.

FIG. 46 illustrates an example of step selection. For example, there may be employed a screen S(21) including both of display of a projection image, and display of a timeline. The image of the recognized AR marker M1, the projection images C41, C42, and C43 of the AR contents disposed in S708, the steps corresponding to time zones I10 to I13 are displayed on the screen S(21). The time zones I10 to I13 are the time zone I10 corresponding to the step number 1, the time zone I11corresponding to the step number 2, the time zone I12 corresponding to the step number 3, and the time zone I13 corresponding to the step number 4.

Further, the projection images of AR contents are displayed at time zones according to the order disposed in S708. The example of the screen S(21) exemplifies a case where the projection images C43, C41, and C42 of the AR contents are disposed in this order in S708. In this case, the projection image C43 b corresponding to the projection image C43 disposed first in the disposed order in S708 is displayed on the time zone I10. Also, the projection image C41 a corresponding to the projection image C41 disposed next is displayed on the time zone I11. Further, the projection image C42a corresponding to the projection image C42 disposed next thereof is displayed on the time zone I12. The projection images C41a, C42a, and C43a initially disposed on the screen S(21) are moved to another time zone by a dragged and dropped operation by the user's input, for example. The example illustrated in the screen S(21) illustrates a situation in which the projection image C43b initially disposed on the time zone I10 has been moved to the time zone I13.

[Data Structure of AR-Defined Data]

A data structure with a tree format is exemplified in FIG. 10 and FIG. 13. As illustrated in FIG. 10 and FIG. 13, an AR content regarding a particular scenario may be extracted with reference to data under the scenario definition of the particular scenario. As illustrated in FIG. 13, an AR content regarding a particular step may be extracted with reference to data under the step definition of the particular step.

Another data structure which enables an AR content regarding a particular scenario or particular step to be extracted may be employed instead of the tree structures illustrated in FIG. 10 and FIG. 13.

Figure 47:
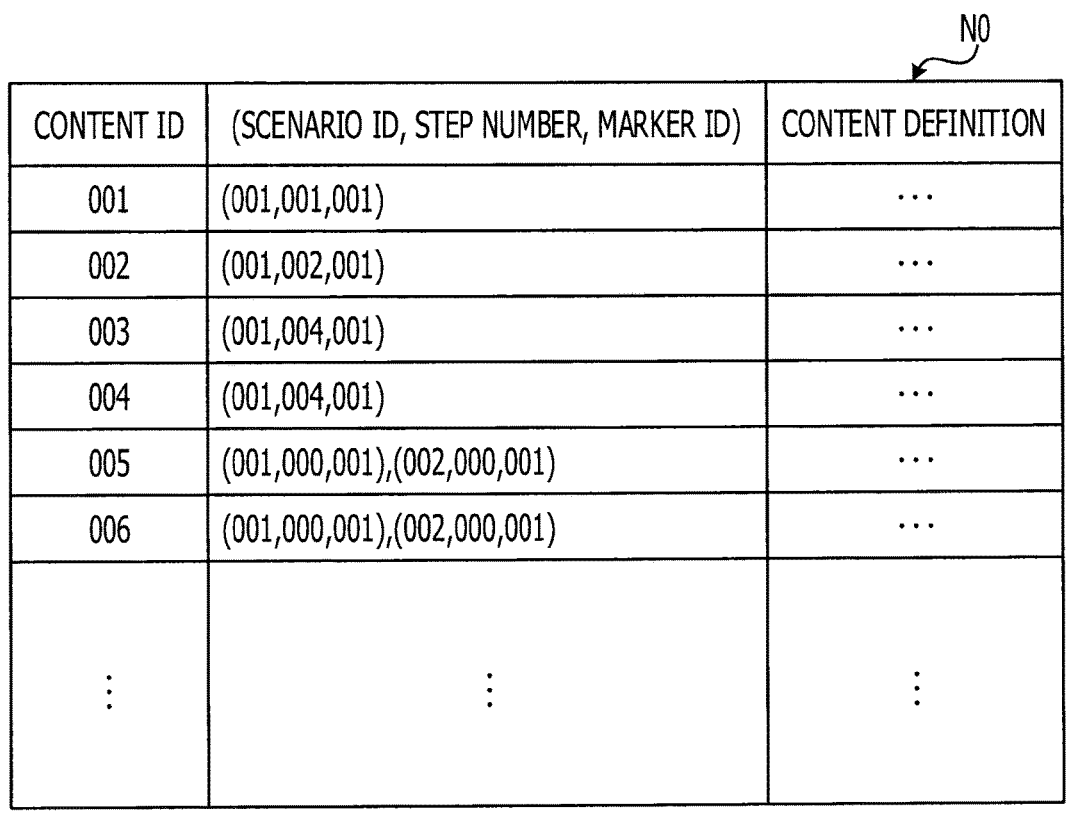
FIG. 47 illustrates an example of AR-defined data.

FIG. 47 illustrates an example of AR-defined data. Attribute information indicating a work situation (scenario ID, step number, and marker ID), and a content definition are correlated with the content ID of each AR content in the data structure of the AR-defined data N0 exemplified in FIG. 47. The content definition is the content definition of each AR contents, and is structure data similar to the data structure illustrated in FIG. 25. The AR contents with the content IDs: 004 and 005 are correlated with a plurality of attribute information.

Each AR contents included in the AR-defined data N0 exemplified in FIG. 47 is extracted and displayed in the case that attribute information agreeing with the status information D0 and recognized marker information D1 of the user is appended to the AR content. An AR content correlated with a plurality of attribute information is extracted in the case that any one of the plurality of attribute information is satisfied. Also, an AR content having the same scenario ID and same marker ID but having a different step number is hidden or displayed after changing its display mode.

[Realizing Configuration of Present Embodiment]

Figure 48:
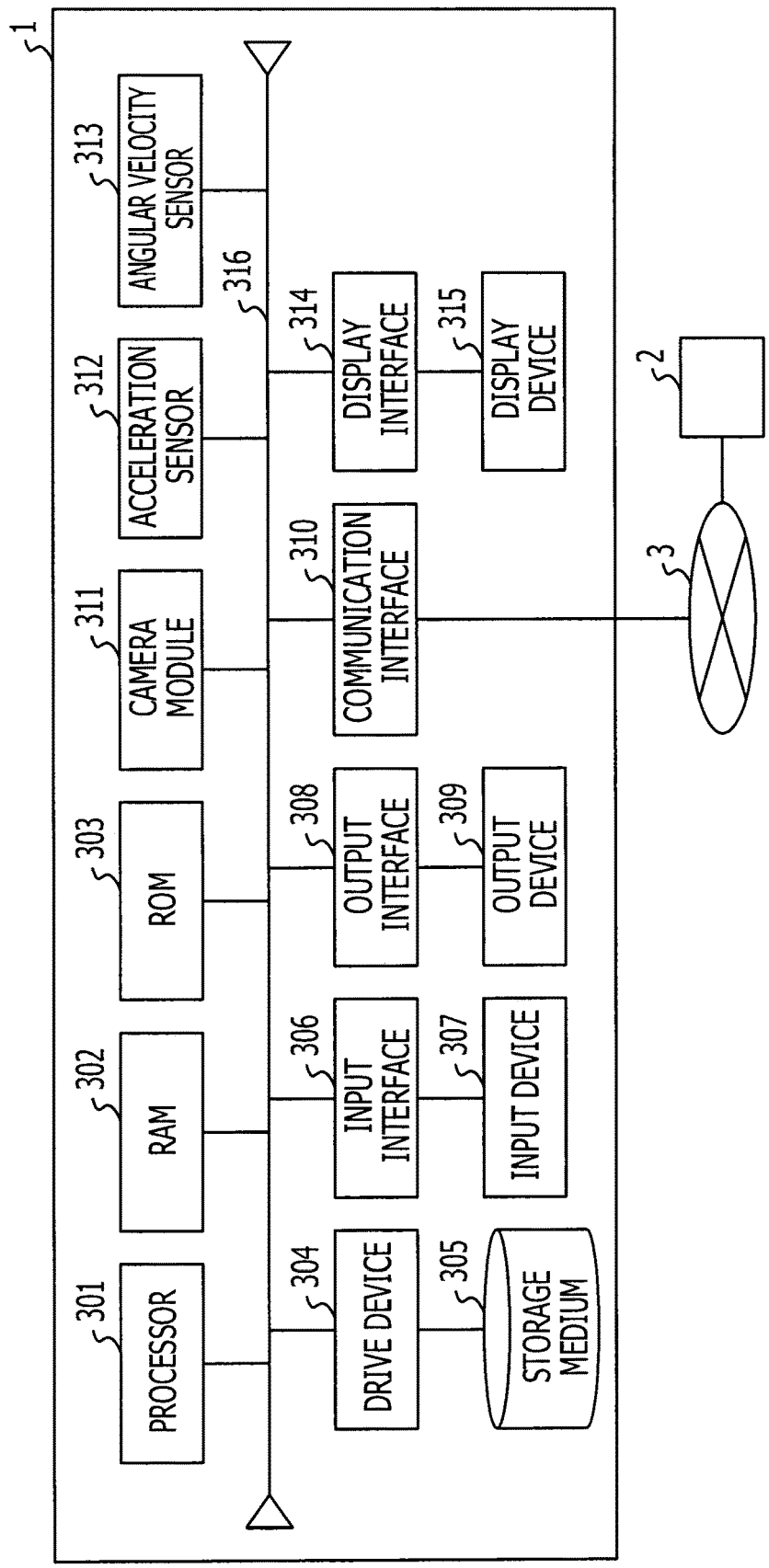
FIG. 48 illustrates a hardware configuration example of the computer 1.

FIG. 48 illustrates a hardware configuration example of the computer 1. The function blocks illustrated in FIG. 16 are realized by the hardware configuration illustrated in FIG. 48, for example. The computer 1 includes, for example, a processor 301, RAM (Random Access Memory) 302, ROM (Read Only Memory) 303, a drive device 304, a storage medium 305, an input interface (input I/F) 306, an input device 307, an output interface (output I/F) 308, an output device 309, a communication interface (communication I/F) 310, a camera module 311, an acceleration sensor 312, an angular velocity sensor 313, a display interface 314, a display device 315, a bus 316, and so forth. Each piece of hardware is connected via the bus 316.

The communication interface 310 performs communication control via a network 3. Communication that the communication interface 310 controls may have a mode to access the network 3 via a wireless base station 4 (see FIG. 50) using wireless communication, or may have a mode to access the network 3 by cable. The input interface 306 is connected with the input device 307, and transmits input signals received from the input device 307 to the processor 301. The output interface 308 is connected with the output device 309, and causes the output device 309 to execute output in response to the instructions of the processor 301. The input device 307 is a device configured to transmit an input signal in response to an operation. Examples of the input device 307 include a keyboard, a key device such as buttons attached to the main unit of the computer 1, a pointing device such as a mouse, touch panel, or the like. The output device 309 is a device configured to output information in response to the control of the processor 301. Examples of the output device 309 include an audio output device such as speakers and so forth. The display interface 314 is connected with the display device 315. The display interface 314 controls the display device 315 to display image information written in a display buffer provided to the display interface 314 by the processor 301. The display device 315 is a device configured to output information in response to the control of the processor 301. An image output device such as a display or the like, a transparent display, or the like is employed as the display device 315. In the case of employing the transparent display, control may be made so as to display the projection image of an AR content in a suitable position within the transparent display without being composed with an imaged image, for example. Thus, the user obtains vision in a state in which real space and an AR content are fitted together. Also, for example, an input and output device such a touch screen or the like is employed as the input device 307 and display device 315. Also, instead of the input device 307 and display device 315 being built in the computer 1, the input device 307 and display device 315 may externally be connected to the computer 1 , for example.

The RAM 302 is a readable and writable memory device. Examples of the RAM 302 include semiconductor memory such as SRAM (Static Random Access Memory), DRAM (Dynamic Random Access Memory), or the like, and flash memory. The ROM 303 also includes PROM (Programmable Read Only Memory) and so forth. The drive device 304 is a device configured to perform at least either one of readout and writing of information stored in the storage medium 305. The storage medium 305 stores information written in the drive device 304. The storage medium 305 is at least one of a hard disk, a SSD (Solid State Drive), a CD (Compact Disc), a DVD (Digital Versatile Disc), and a Blu-ray Disc (registered trademark), for example. Also, for example, the computer 1 includes the drive device 304 compatible with the kinds of the storage medium 305 within the computer 1.

The camera module 311 includes an imaging device (image sensor). The camera module 311 reads out a value measured by the imaging device, and writes this in an image buffer for input image included in the camera module 311, for example. The acceleration sensor 312 measure acceleration applied to the acceleration sensor 312. The angular velocity sensor 313 measures the angular velocity of operation of the angular velocity sensor 313.

The processor 301 reads a program stored in the ROM 303 or storage medium 305 (for example, program exemplified in FIG. 49 or the like) to the RAM 302, and performs processing in accordance with the procedure of the read program.

Figure 49:
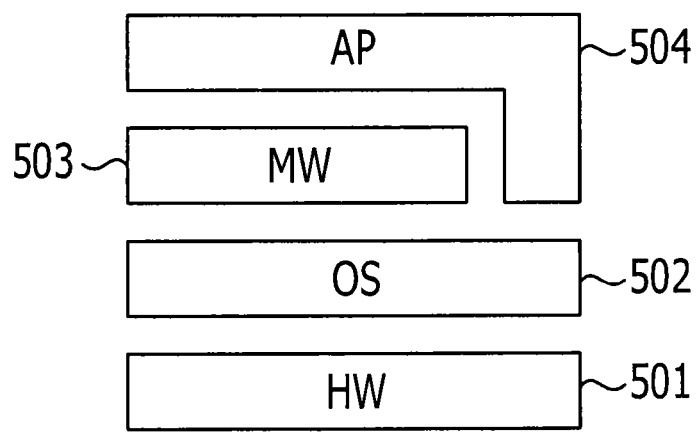
FIG. 49 illustrates a configuration example of a program which runs on the computer 1.

For example, the functions of the control unit 10 are realized by the processor 301 performing control of other hardware based on an AR control program (display control program and information generating program) which is part of the program illustrated in FIG. 49. The functions of the acquisition unit 11 are realized by the processor 301 controlling the communication interface 310 to execute data communication, and storing received data in the storage medium 305. The functions of the recognition unit 12 are realized by the processor 301 performing computation processing based on image data stored in the image buffer for input images of the camera module 311. The functions of the computing unit 13 are realized by the processor 301 performing computation based on data such as coordinates and transform matrices stored in the RAM 302. The functions of the generating unit 14 are realized by the processor 301 writing image data generated from data (including image data) stored in the storage medium 305, in a display buffer.

The functions of the storage unit 15 are realized by the ROM 303 and storage medium 305 storing a program file and a data file, and the RAM 302 being employed as a work area of the processor 301. For example, AR-defined data and so forth are stored in the RAM 302. The functions of the imaging unit 16 are realized by the camera module 311 writing image data in the image buffer for input images, and the processor 301 reading out image data within the image buffer for input images. The image data is, in a monitoring mode, for example, written in the image buffer for input images, and also written in the display buffer of the display device 315 in parallel. Also, the functions of the display unit 17 are realized by the processor 301 writing the generated image data in the display buffer provided to the display interface 314, and the display device 315 performing display of the image data within the display buffer. The functions of the communication unit 18 are realized by the processor 301 performing the control of the communication interface 310. The functions of the input unit 19 are realized by the input interface 306 transmitting input signals from the input device 307 to the processor 301.

The functions of the selection control unit 101, event detecting unit 102, display control unit 103, and setting management unit 104 are realized by the processor 301 controlling the hardware of the RAM 302 and so forth based on the AR control program.

FIG. 49 illustrates a configuration example of a program which runs on the computer 1. An OS (operating system) 502 configured to perform control of a hardware group 501 (hardware illustrated in FIG. 48) runs on the computer 1. Processing by an application program 504 or middleware 503 is executed on the hardware 501 by the processor 301 operating in procedures in accordance with the OS 502 to perform control and management of the hardware 501. The programs such as the OS 502, middleware 503, and application program 504 are read to the RAM 302 and executed by the processor 301 at the computer 1, for example. Also, the AR control program is a program to be called up from the application program 504 as the middleware 503, for example. Alternatively, the AR control program is a program for realizing the AR function as the application program 504, for example. The AR function program is stored in the storage medium 305. The storage medium 305 may be circulated separately from the computer 1main unit in a state in which the AR control program is stored.

Figure 50:
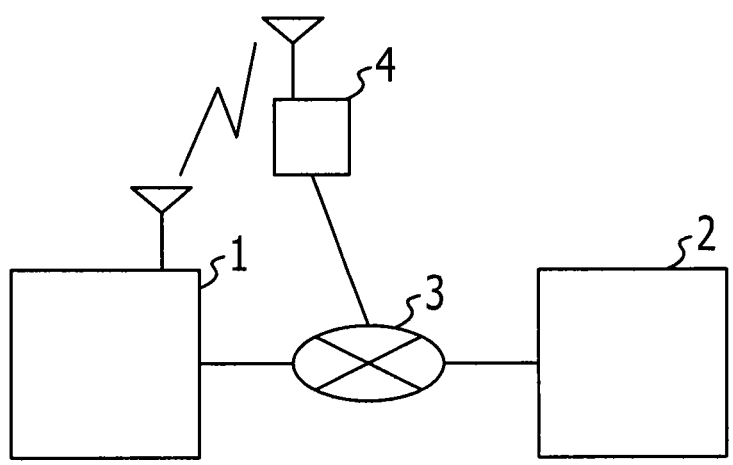
FIG. 50 illustrates an example of a system including the computer 1.

FIG. 50 illustrates an example of a system including the computer 1. The system illustrated in FIG. 50 includes the computer 1, computer 2, network 3, and wireless base station 4. The computer 1 and computer 2 are communicable by at least either one of cable and wireless communication methods.

Figure 51:
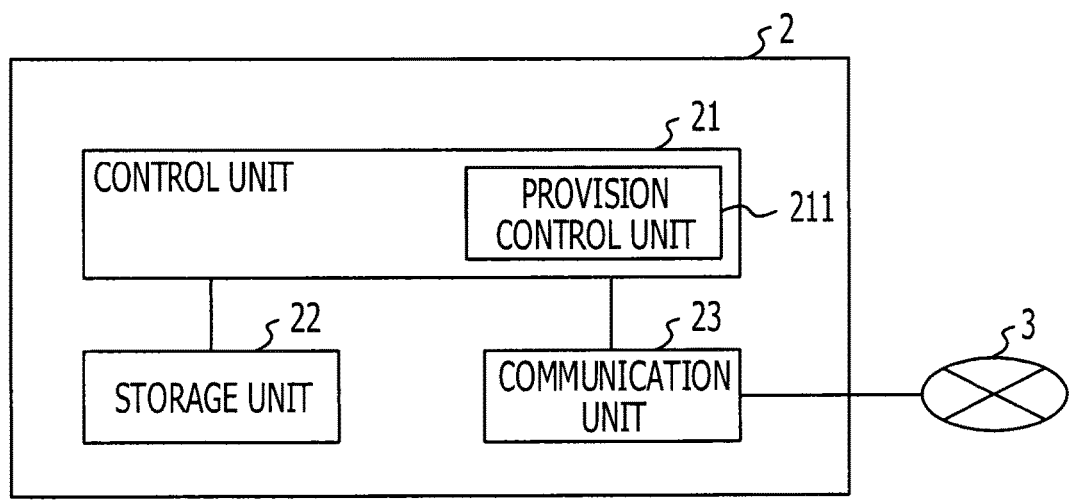
FIG. 51 illustrates a function configuration example of a computer 2.

FIG. 51 illustrates a function configuration example of the computer 2. The computer 2includes a control unit 21, a storage unit 22, and a communication unit 23. The control unit 21 performs control of the storage unit 22 and communication unit 23. The communication unit 23 performs communication with the communication unit 18 of the computer 1. The storage unit 22 stores AR-defined data and content data. The control unit 21 includes a provision control unit 211. Upon a scenario list being requested from the computer 1 via the communication unit 23, the provision control unit 211 generates a scenario list based on the AR-defined data, and controls the communication unit 23 to send back this scenario list to the computer 1. In the case of having received a scenario ID from the computer 1, the provision control unit 211 controls the communication unit 23 to transmit content data to be used for the AR-defined data and scenario under the scenario definition of the received scenario ID, to the computer 1.

Figure 52:
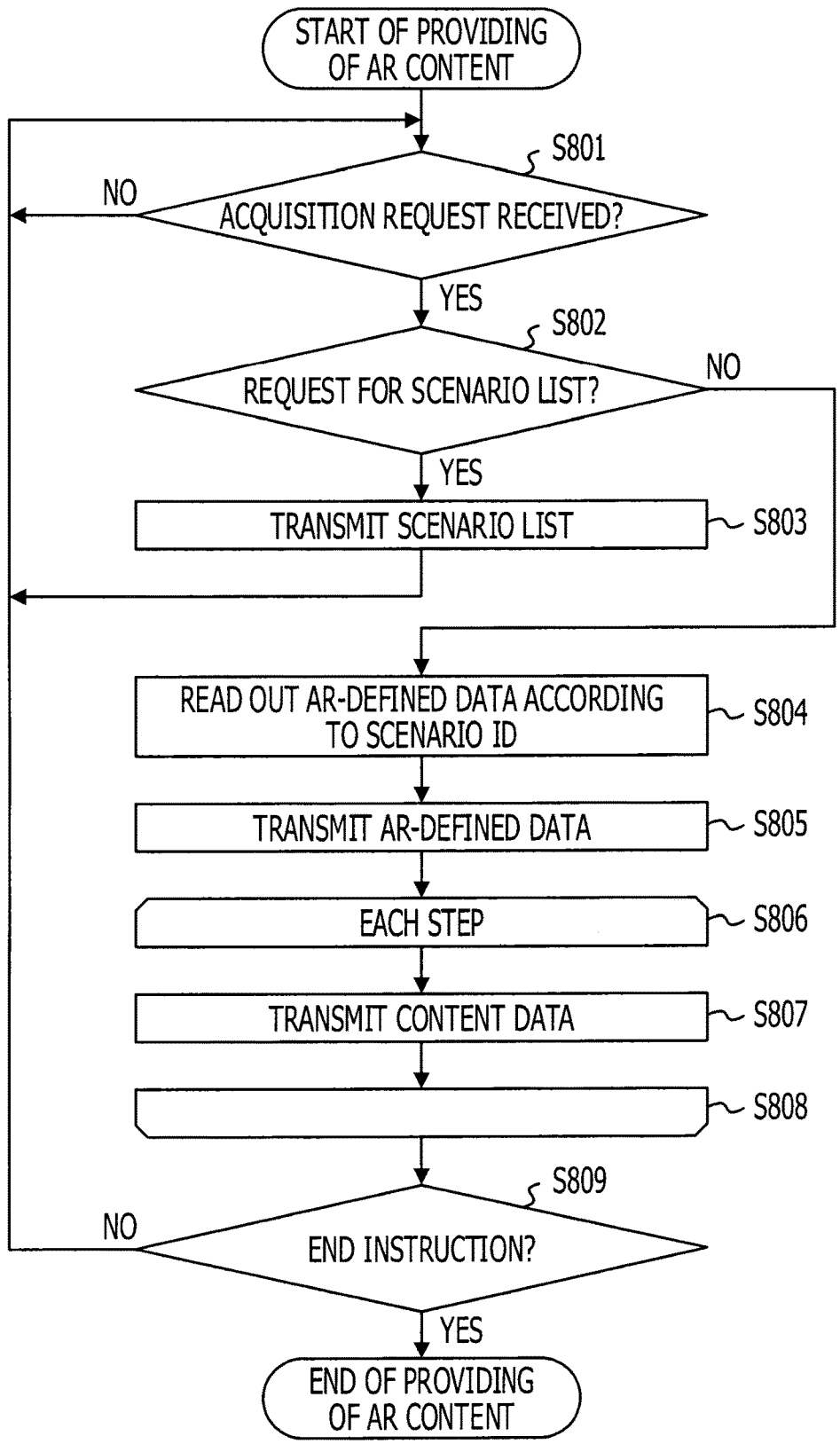
FIG. 52 is an AR content providing processing procedure example.

FIG. 52 illustrates AR content provision processing procedure example. Upon provision of an AR content being started at the computer 2, the provision control unit 211 determines whether or not an acquisition request has been received from the computer 1 (S801). In the case of having received no acquisition request (NO in S801), the provision control unit 211 performs the processing in S801 again after elapse of a predetermined amount of time. In the case of having received an acquisition request from the computer 1 (YES in S801), the provision control unit 211 determines whether or not the acquisition request from the computer 1 is a scenario list request (S802). In the case that a scenario list having been requested from the computer 1 (YES in S802), the provision control unit 211 generates a scenario list based on the root definition N of the AR-defined data stored in the storage unit 22, and causes the communication unit 23 to transmit the scenario list to the computer 1 (S803). Upon the scenario list being transmitted, the provision control unit 211 performs the processing in S801 again.

In the case that the acquisition request from the computer 1 is not a scenario list request (NO in S802), the provision control unit 211 determines that this request is a request for the AR content regarding a particular scenario, and reads out the AR-defined data from the storage unit 22 in response to the scenario ID specified in the acquisition request (S804). The AR-defined data to be read out in S804 is AR-defined data (step definition, marker definition, and content definition) under the scenario definition of the specified scenario ID. Also, in the case that a particular scenario has not been selected in S804, the provision control unit 211 determines that this request is new scenario generation, generates a scenario ID which competes with neither of the scenario IDs indicated in the scenario list, and transmits this to the request source of the acquisition request (S805).

Next, the provision control unit 211 controls the communication unit 23 to execute transmission of an AR content displayed in each step (S807). For example, in S807, each time the provision control unit 211 transmits each content data, the provision control unit 211 controls the communication unit 23 to transmit information to the effect that transmission of the content ID and content data has been completed, along with the content data. The provision control unit 211 performs repetition processing for each step included in the specified scenario (S806 and S808).

Upon content data in each step being transmitted, the control unit 21 determines whether or not end instructions for AR content provision have been issued (S809). In the case that end instructions have not been issued (NO in S809), the provision control unit 211 performs the processing in S801 again. Also, in the case that end instructions have been issued (YES in S809), the control unit 21 ends provision of AR contents.

FIG. 53 illustrates a hardware configuration example of the computer 2. The function blocks illustrated in FIG. 29 are realized by the hardware configuration illustrated in FIG. 30, for example. The management server 2 includes, for example, a processor 401, RAM 402, ROM 403, a drive device 404, a storage medium 405, an input interface (input I/F) 406, an input device 407, an output interface (output I/F) 408, an output device 409, a communication interface (communication I/F) 410, a SAN (Storage Area Network) interface (SAN I/F) 411, a bus 412, and so forth. Each hardware is connected via the bus 412.

For example, the processor 401 is hardware similar to the processor 301. The RAM 402 is hardware similar to the RAM 302, for example. The ROM 403 is hardware similar to the ROM 303, for example. The drive device 404 is hardware similar to the drive device 304, for example. The storage medium 405 is hardware similar to the storage medium 305, for example. The input interface (input I/F) 406 is hardware similar to the input interface 306, for example. The input device 407 is hardware similar to the input device 307, for example. The output interface (output I/F) 408 is hardware similar to the output interface 308, for example. The output device 409 is hardware similar to the output device 309, for example. The communication interface (communication I/F) 410 is hardware similar to the communication interface 310, for example. The Storage Area Network (SAN) interface (SAN I/F) 411 is an interface for connecting the management server 2 to the SAN, and includes an HBA (Host Bus Adapter).

The processor 401 reads a management program stored in the ROM 403 or storage medium 405 to the RAM 402, and performs the processing of the control unit 21 in accordance with the procedure of the read management program. At this time, the RAM 402 is employed as a work area of the processor 401. The functions of the storage unit 22 are realized by the ROM 403 and storage medium 405 storing a program file and a data file (management table T3 or the like), or the RAM 402 being employed as a work area of the processor 401. Also, the functions of the communication unit 23 are realized by the processor 401 controlling the communication interface 410 to perform communication processing.

[Utilization of Entertainment Content]

A business process has been exemplified as a situation in which a series of AR contents (scenarios) are provided in the above embodiment. Provision of AR contents according to a scenario indicated in the above embodiment may be performed in another situation in which a series of AR contents are provided, as well.

For example, game contents in which a game event is advanced by a user's actions also include one kind of scenario. For example, it is expected to individually provide AR contents included in a game content to each of multiple users who advance different game contents via a common AR marker in conjunction. This arrangement is used for an experience-based game content which is individually played by multiple users at this attraction facility. To this end, a scenario ID is allocated to each game content, and the arrangement of the above embodiment is employed, whereby AR contents are individually provided to each user.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A display control method executed by a computer, the display method comprising:
  receiving input data designating a first work content included in a plurality of work contents;
  acquiring an input image captured by a camera;
  recognizing a first reference object in the input image, the first reference object being a marker positioned in an environment included in the input image;
  acquiring, from a storage storing a display data group, at least one item of display data associated with a pair of the first reference object and the first work content, the display data group including the at least one item of display data and another item of display data associated with a pair of the first reference object and a second work content included in the plurality of work contents; and
  displaying the at least one item of display data by superimposing the at least one item of display data on the input image in accordance with a shape of the first reference object in the input image without superimposing the other item of display data on the input image.

2. The display control method according to claim 1, wherein the input data is input by user operation.

3. The display control method according to claim 1, wherein the displaying is executed after a start of the acquisition of the at least one item of display data and after the first reference object is recognized in the image.

4. The display control method according to claim 1, further comprising:
  recognizing a second reference object in the input image;
  acquiring, from the display data group in the storage, a second item of display data associated with a pair of the second reference object and the first work content; and
  displaying the second item of display data by superimposing the second item of display data on the input image, on which the at least one item of display data is superimposed, in accordance with a shape of the second reference object in the input image.

5. The display control method according to claim 1, wherein
  the first work content includes a plurality of processes including ordinal properties,
  the at least one item display data is associated with a first process of the plurality of processes, and in the displaying, the at least one item display data is displayed only when the first process is under execution.

6. The display control method according to claim 5, wherein
the at least one item of display data includes first display data corresponding to the first reference object,
the first display data is associated with a second process of the plurality of processes, and
in the displaying, the first display data is not displayed when the first process is under execution.

7. The display control method according to claim 5, further comprising:
displaying, when there is no display data associated with a process which is under execution in the at least one item of display data, a message indicating that there is no display data to be displayed.

8. The display control method according to claim 5, further comprising:
determining an advance or a retreat of a process in the first work content based on the first reference object recognized by the recognizing.

9. The display control method according to claim 8, further comprising:
determining the advance or the retreat of the process in response to a movement direction of the first reference object at a time of switching between a recognition state and unrecognition state of the first reference object.

10. The display control method according to claim 9, wherein the recognition state of the first reference object is switched by framing in or framing out the first reference object in images to be subjected to image recognition.

11. The display control method according to claim 8, further comprising:
displaying an index image, wherein
the advance or the retreat of the process is performed when the first reference object is recognized at a display position of the index image.

12. The display control method according to claim 8, wherein the advance and the retreat of the process is determined according to detection of a rotation of the first reference object to an angle equal to or greater than a predetermined angle.

13. A display control device, comprising:
a memory; and
a processor coupled to the memory and configured to:
receive input data designating a first work content included in a plurality of work contents:
acquire an input image captured by a camera;
recognize a first reference object in the input image, the first reference object being a marker positioned in an environment included in the input image;
acquire, from a storage storing a display data group, at least on display data associated with a pair of the first reference object and the first work content, the display data group including the at least one item of display data and another item of display data associated with a pair of the first reference object and a second work content included in the plurality of work contents; and
display the at least one item of display data by superimposing the at least one item of display data on the input image in accordance with a shape of the first reference object in the input image without superimposing the other item of display data on the input image.

14. The display control device according to claim 13, further comprising:
a communication circuit configured to acquire the at least one item of display data from an external source, wherein
the processor is further configured to store the at least one item of display data in the memory.

15. The display control device according to claim 14, wherein the communication circuit acquires the at least one item of display data from the external source via a wired network.

16. The display control device according to claim 14, wherein the communication circuit acquires the at least one item of display data from the external source via a wireless connection.

17. The display control device according to claim 13, wherein the at least one item of display data is superimposed on the input image at a location of the first reference object.

18. An image control system, comprising:
circuitry configured to
receive input data designating a first work content included in a plurality of work contents:
control a camera to capture an image;
identify a first reference object in the captured image by performing an image recognition process on the captured image, the first reference object being a marker positioned in an environment included in the captured image;
acquire, from a storage storing a display data group, at least one display item associated with a pair of the first reference object and the first work content, the display data group including the at least one item display item and another display item associated with a pair of the first reference object and a second work content included in the plurality of work contents;
superimpose the at least one display item on the captured image on the captured image, in accordance with a shape of the first reference object included in the captured image and without superimposing the other display item on the captured image, to generate a modified image; and
display the modified image.

19. The display control method according to claim 1, further comprising:
performing a texture mapping process for each surface in the input image according to a surface definition in an augmented reality (AR) template.

20. The display control method according to claim 1, wherein the at least one item of display data is rotated in the displaying according to acquired rotational coordinates of the first reference object.

* * * * *